(12) United States Patent
Kishimoto

(10) Patent No.: US 8,733,996 B2
(45) Date of Patent: May 27, 2014

(54) LIGHT EMITTING DEVICE, ILLUMINATING DEVICE, AND VEHICLE HEADLAMP

(75) Inventor: Katsuhiko Kishimoto, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 176 days.

(21) Appl. No.: 13/108,770

(22) Filed: May 16, 2011

(65) Prior Publication Data

US 2011/0280039 A1 Nov. 17, 2011

(30) Foreign Application Priority Data

May 17, 2010 (JP) ................................. 2010-113475
May 17, 2010 (JP) ................................. 2010-113479
May 17, 2010 (JP) ................................. 2010-113480

(51) Int. Cl.
*G02B 6/32* (2006.01)
*F21V 7/04* (2006.01)

(52) U.S. Cl.
USPC .......................................... 362/554; 362/553

(58) Field of Classification Search
USPC .................................................. 362/553–555
See application file for complete search history.

(56) References Cited

U.S. PATENT DOCUMENTS

| | | | |
|---|---|---|---|
| 3,701,895 A | 10/1972 | Sweetser | |
| 4,688,884 A | 8/1987 | Scifres et al. | |
| 4,723,198 A | 2/1988 | Levin et al. | |
| 5,278,731 A | 1/1994 | Davenport et al. | |
| 5,535,230 A | 7/1996 | Abe | |
| 5,647,662 A | 7/1997 | Ziegler et al. | |
| 5,857,768 A | 1/1999 | Ziegler et al. | |
| 5,947,592 A | 9/1999 | Barlow | |
| 6,055,154 A | 4/2000 | Azar | |
| 6,114,715 A | 9/2000 | Hamada | |
| 6,272,269 B1 * | 8/2001 | Naum | 385/43 |
| 6,398,366 B1 | 6/2002 | Hara et al. | |
| 6,439,751 B1 | 8/2002 | Jones et al. | |
| 6,509,674 B1 | 1/2003 | Nakagawa | |
| 6,771,236 B1 | 8/2004 | Konishi et al. | |
| 6,981,782 B2 | 1/2006 | Kai et al. | |
| 7,108,400 B2 | 9/2006 | Yamada et al. | |

(Continued)

FOREIGN PATENT DOCUMENTS

| | | |
|---|---|---|
| CN | 1499125 | 5/2004 |
| CN | 1824728 | 8/2006 |

(Continued)

OTHER PUBLICATIONS

Sasaki, Masaru. (2005). "Applications of White LED Lighting to Automobile Onboard Devices," *Oyo Buturi* 74(11):1463-1466.

(Continued)

*Primary Examiner* — Joseph L Williams
(74) *Attorney, Agent, or Firm* — Morrison & Foerster LLP

(57) ABSTRACT

Disclosed is a light emitting device including: a single or a plurality of laser diode(s) configured to emit a laser beam; a light emitting body configured to emit light upon irradiation with the laser beam(s); and an optical fiber guiding the single or plurality of laser beam(s) emitted from the single or plurality of laser diode(s) to a vicinity of the light emitting body and irradiating the guided single or plurality of laser beam(s) to a predetermined laser beam irradiation plane of the light emitting body, in a dispersed manner. This allows for achieving a high-luminance and a long life.

18 Claims, 23 Drawing Sheets

(56) References Cited

U.S. PATENT DOCUMENTS

| | | | |
|---|---|---|---|
| 7,147,918 B2 | 12/2006 | Nishibayashi et al. | |
| 7,275,848 B2 | 10/2007 | Chinniah et al. | |
| 7,309,145 B2 | 12/2007 | Nagata et al. | |
| 7,367,679 B2 | 5/2008 | Emery | |
| 7,422,356 B2 | 9/2008 | Hama et al. | |
| 7,478,932 B2 | 1/2009 | Chinniah et al. | |
| 7,510,284 B2 | 3/2009 | Plut | |
| 7,628,492 B2 | 12/2009 | Yoshii et al. | |
| 2002/0044455 A1 | 4/2002 | Ozawa et al. | |
| 2002/0053868 A1 | 5/2002 | Shimizu et al. | |
| 2002/0187571 A1 | 12/2002 | Collins et al. | |
| 2003/0052595 A1 | 3/2003 | Ellens et al. | |
| 2003/0174509 A1 | 9/2003 | Futami | |
| 2003/0186475 A1 | 10/2003 | Ueda et al. | |
| 2004/0062699 A1 | 4/2004 | Oshio | |
| 2004/0085768 A1 | 5/2004 | Kai et al. | |
| 2004/0090790 A1 | 5/2004 | Ishida et al. | |
| 2004/0207306 A1 | 10/2004 | Horiuchi et al. | |
| 2004/0228130 A1 | 11/2004 | Kato et al. | |
| 2005/0051790 A1 | 3/2005 | Ueda | |
| 2005/0063169 A1 | 3/2005 | Erber | |
| 2005/0094397 A1 | 5/2005 | Yamada et al. | |
| 2005/0105301 A1 | 5/2005 | Takeda et al. | |
| 2005/0116176 A1 | 6/2005 | Aguirre et al. | |
| 2005/0116177 A1 | 6/2005 | Aguirre et al. | |
| 2005/0116178 A1 | 6/2005 | Aguirre et al. | |
| 2005/0116179 A1 | 6/2005 | Aguirre et al. | |
| 2005/0127383 A1 | 6/2005 | Kikawa et al. | |
| 2005/0243570 A1 | 11/2005 | Chaves et al. | |
| 2005/0253153 A1 | 11/2005 | Harada | |
| 2006/0050512 A1 | 3/2006 | Nakagawa et al. | |
| 2006/0054656 A1 | 3/2006 | Narita et al. | |
| 2006/0118775 A1 | 6/2006 | Nagai et al. | |
| 2006/0121695 A1 | 6/2006 | Ueda et al. | |
| 2006/0170332 A1 | 8/2006 | Tamaki et al. | |
| 2006/0181894 A1 | 8/2006 | Chinniah et al. | |
| 2006/0186377 A1 | 8/2006 | Takahashi et al. | |
| 2006/0203349 A1 | 9/2006 | Kamijima | |
| 2006/0232973 A1 | 10/2006 | Haga et al. | |
| 2006/0238103 A1 | 10/2006 | Choi et al. | |
| 2006/0239006 A1 | 10/2006 | Chaves et al. | |
| 2006/0255711 A1 | 11/2006 | Dejima et al. | |
| 2006/0285341 A1 | 12/2006 | Yatsuda et al. | |
| 2007/0007494 A1 | 1/2007 | Hirosaki et al. | |
| 2007/0008734 A1 | 1/2007 | Bogner et al. | |
| 2007/0041197 A1 | 2/2007 | Saito et al. | |
| 2007/0057269 A1 | 3/2007 | Ueda | |
| 2007/0127240 A1 | 6/2007 | Inamoto | |
| 2007/0131954 A1 | 6/2007 | Murayama et al. | |
| 2007/0185261 A1 | 8/2007 | Lee et al. | |
| 2007/0189352 A1 | 8/2007 | Nagahama et al. | |
| 2008/0013316 A1 | 1/2008 | Chiang | |
| 2008/0037268 A1 | 2/2008 | Tendo et al. | |
| 2008/0051632 A1 | 2/2008 | Ito et al. | |
| 2008/0074752 A1 | 3/2008 | Chaves et al. | |
| 2008/0089089 A1 | 4/2008 | Hama et al. | |
| 2008/0117620 A1 | 5/2008 | Hama et al. | |
| 2008/0169752 A1 | 7/2008 | Hattori et al. | |
| 2008/0170296 A1 | 7/2008 | Chaves et al. | |
| 2008/0173884 A1 | 7/2008 | Chitnis et al. | |
| 2008/0175008 A1 | 7/2008 | Hu et al. | |
| 2008/0179611 A1 | 7/2008 | Chitnis et al. | |
| 2008/0198603 A1 | 8/2008 | Sormani et al. | |
| 2008/0205062 A1 | 8/2008 | Dahm et al. | |
| 2008/0225550 A1 | 9/2008 | Sakurada | |
| 2008/0237569 A1 | 10/2008 | Nago et al. | |
| 2008/0239725 A1 | 10/2008 | Ishikura et al. | |
| 2008/0262316 A1 | 10/2008 | Ajima et al. | |
| 2008/0278460 A1* | 11/2008 | Arnett et al. | 345/175 |
| 2009/0008655 A1 | 1/2009 | Peeters et al. | |
| 2009/0052189 A1 | 2/2009 | Kon | |
| 2009/0057690 A1 | 3/2009 | Chakraborty | |
| 2009/0059594 A1 | 3/2009 | Lin | |
| 2009/0065790 A1 | 3/2009 | Chitnis et al. | |
| 2009/0067179 A1 | 3/2009 | Chaves et al. | |
| 2009/0073710 A1 | 3/2009 | Sormani et al. | |
| 2009/0095960 A1 | 4/2009 | Murayama | |
| 2009/0128781 A1 | 5/2009 | Li | |
| 2009/0201577 A1 | 8/2009 | LaPlante et al. | |
| 2009/0231874 A1 | 9/2009 | Kishimoto et al. | |
| 2009/0257463 A1 | 10/2009 | Kusukame et al. | |
| 2009/0273921 A1 | 11/2009 | Chiang | |
| 2009/0273924 A1 | 11/2009 | Chiang | |
| 2009/0296018 A1 | 12/2009 | Harle et al. | |
| 2009/0296367 A1 | 12/2009 | Sekine et al. | |
| 2009/0322208 A1 | 12/2009 | Shaikevitch et al. | |
| 2010/0046234 A1 | 2/2010 | Abu-Ageel | |
| 2010/0046245 A1 | 2/2010 | Ansari et al. | |
| 2010/0073600 A1 | 3/2010 | Itoh et al. | |
| 2010/0091516 A1* | 4/2010 | Harle et al. | 362/554 |
| 2010/0096067 A1 | 4/2010 | Marinus et al. | |
| 2010/0102250 A1 | 4/2010 | Li et al. | |
| 2010/0103966 A1 | 4/2010 | Mizushima et al. | |
| 2010/0164365 A1 | 7/2010 | Yoshino et al. | |
| 2010/0171440 A1 | 7/2010 | Satou et al. | |
| 2010/0202152 A1 | 8/2010 | Nakada | |
| 2010/0254153 A1 | 10/2010 | Hama et al. | |
| 2011/0044070 A1 | 2/2011 | Takahashi | |
| 2011/0068360 A1 | 3/2011 | Nago et al. | |
| 2011/0068679 A1 | 3/2011 | Sawamura et al. | |
| 2011/0148280 A1 | 6/2011 | Kishimoto et al. | |
| 2011/0176305 A1 | 7/2011 | Schallmoser | |
| 2011/0182072 A1 | 7/2011 | Shimizu et al. | |
| 2011/0194302 A1 | 8/2011 | Kishimoto et al. | |
| 2011/0248624 A1 | 10/2011 | Kishimoto et al. | |
| 2011/0279007 A1 | 11/2011 | Kishimoto | |
| 2011/0279039 A1 | 11/2011 | Kishimoto | |
| 2011/0280032 A1 | 11/2011 | Kishimoto | |
| 2011/0280033 A1 | 11/2011 | Kishimoto et al. | |
| 2012/0026503 A1 | 2/2012 | Lewandowski et al. | |
| 2012/0106178 A1 | 5/2012 | Takahashi et al. | |

FOREIGN PATENT DOCUMENTS

| | | |
|---|---|---|
| CN | 101226978 | 7/2008 |
| CN | 101627481 | 1/2010 |
| EP | 2 280 214 | 2/2011 |
| JP | 60-186076 | 9/1985 |
| JP | 62-254355 | 11/1987 |
| JP | 4-43529 | 2/1992 |
| JP | 4-73801 | 3/1992 |
| JP | 6-203606 | 7/1994 |
| JP | 7-282609 | 10/1995 |
| JP | 7-318998 | 12/1995 |
| JP | 7-335016 | 12/1995 |
| JP | 8-185703 | 7/1996 |
| JP | 8-264885 | 10/1996 |
| JP | 9-10238 | 1/1997 |
| JP | 10-326520 | 12/1998 |
| JP | 11-195303 | 7/1999 |
| JP | 2000-81516 | 3/2000 |
| JP | 2000-231905 | 8/2000 |
| JP | 2001-15839 | 1/2001 |
| JP | 2001-127002 | 5/2001 |
| JP | 2001-264832 | 9/2001 |
| JP | 2002-100214 | 4/2002 |
| JP | 2002-323726 | 11/2002 |
| JP | 2003-69086 | 3/2003 |
| JP | 2003-509821 | 3/2003 |
| JP | 2003-295319 | 10/2003 |
| JP | 2003-332237 | 11/2003 |
| JP | 2004-87435 | 3/2004 |
| JP | 2004-87925 | 3/2004 |
| JP | 2004-115304 | 4/2004 |
| JP | 2004-200531 | 7/2004 |
| JP | 2004-241142 | 8/2004 |
| JP | 2004-301977 | 10/2004 |
| JP | 2004-327361 | 11/2004 |
| JP | 2005-19981 | 1/2005 |
| JP | 2005-055199 | 3/2005 |
| JP | 2005-56852 | 3/2005 |
| JP | 2005-56952 | 3/2005 |
| JP | 2005-109402 | 4/2005 |
| JP | 2005-150041 | 6/2005 |

(56) References Cited

FOREIGN PATENT DOCUMENTS

| | | |
|---|---|---|
| JP | 2005-157251 | 6/2005 |
| JP | 2005-175111 | 6/2005 |
| JP | 2005-294185 | 10/2005 |
| JP | 2005-311170 | 11/2005 |
| JP | 2005-347223 | 12/2005 |
| JP | 2006-40843 | 2/2006 |
| JP | 2006-61685 | 3/2006 |
| JP | 2006-100287 | 4/2006 |
| JP | 2006-154408 | 6/2006 |
| JP | 2006-164796 | 6/2006 |
| JP | 2006-521667 | 9/2006 |
| JP | 2006-296498 | 11/2006 |
| JP | 2006-351369 | 12/2006 |
| JP | 2007-65600 | 3/2007 |
| JP | 2007-66911 | 3/2007 |
| JP | 2007-88078 | 4/2007 |
| JP | 2007-95931 | 4/2007 |
| JP | 2007-142452 | 6/2007 |
| JP | 2007-157548 | 6/2007 |
| JP | 2007-515270 | 6/2007 |
| JP | 2007-173177 | 7/2007 |
| JP | 2007-173595 | 7/2007 |
| JP | 2007-196224 | 8/2007 |
| JP | 2007-258019 | 10/2007 |
| JP | 2007-294754 | 11/2007 |
| JP | 2007-323858 | 12/2007 |
| JP | 2008-10518 | 1/2008 |
| JP | 2008-27910 | 2/2008 |
| JP | 2008-66297 | 3/2008 |
| JP | 2008-124504 | 5/2008 |
| JP | 2008-129683 | 6/2008 |
| JP | 2008-135261 | 6/2008 |
| JP | 2008-135411 | 6/2008 |
| JP | 2008-145838 | 6/2008 |
| JP | 2008-150518 | 7/2008 |
| JP | 2008-234908 | 10/2008 |
| JP | 2008-243714 | 10/2008 |
| JP | 2008-243904 | 10/2008 |
| JP | 2008-262910 | 10/2008 |
| JP | 2008-270229 | 11/2008 |
| JP | 2008-277447 | 11/2008 |
| JP | 2009-19573 | 1/2009 |
| JP | 2009-21506 | 1/2009 |
| JP | 2009-70766 | 4/2009 |
| JP | 2009-104913 | 5/2009 |
| JP | 2009-104933 | 5/2009 |
| JP | 2009-108327 | 5/2009 |
| JP | 2009-129590 | 6/2009 |
| JP | 2009-129683 | 6/2009 |
| JP | 2009-140874 | 6/2009 |
| JP | 2009-523308 | 6/2009 |
| JP | 2009-176443 | 8/2009 |
| JP | 2009-180935 | 8/2009 |
| JP | 2009-224053 | 10/2009 |
| JP | 2009-266437 | 11/2009 |
| JP | 2009-541950 | 11/2009 |
| JP | 2009-289537 | 12/2009 |
| JP | 2009-289976 | 12/2009 |
| JP | 2010-15902 | 1/2010 |
| JP | 2010-62108 | 3/2010 |
| JP | 2010-80306 | 4/2010 |
| JP | 2010-102913 | 5/2010 |
| JP | 2010-182574 | 8/2010 |
| JP | 2010-186886 | 8/2010 |
| JP | 2011-65979 | 3/2011 |
| JP | 2011-108961 | 6/2011 |
| KR | 10-665221 | 12/2006 |
| WO | WO-2004/081140 | 9/2004 |
| WO | WO-2006/038502 | 4/2006 |
| WO | WO-2006/098267 | 9/2006 |
| WO | WO-2008/117211 | 10/2008 |
| WO | WO-2009/031289 | 3/2009 |
| WO | WO-2009/145141 | 12/2009 |
| WO | WO-2010/003763 | 1/2010 |
| WO | WO-2010/047882 | 4/2010 |
| WO | WO-2010/116305 | 10/2010 |

OTHER PUBLICATIONS

Kishimoto et al., U.S. Advisory Action dated Nov. 30, 2012, directed to U.S. Appl. No. 12/957,998; 3 pages.

Kishimoto et al., Office Action mailed Apr. 17, 2012, directed to U.S. Appl. No. 12/957,998; 7 pages.

Kishimoto et al., U.S. Office Action mailed Sep. 21, 2012, directed to U.S. Appl. No. 12/957,998; 8 pages.

Kishimoto et al., U.S. Office Action mailed Sep. 25, 2012, directed to U.S. Appl. No. 13/023,300; 9 pages.

Public Notice Specifying Details of Safety Standards for Road Vehicle, Appendix 51 (Specified Standards for Style of Headlamp), Sep. 26, 2003; pp. 1-17 with Partial English translation of relevant portions (5 pages).

Kishimoto et al., U.S. Office Action mailed Dec. 4, 2012, directed to U.S. Appl. No. 13/081,295; 11 pages.

Kishimoto, U.S. Office Action mailed Dec. 21, 2012, directed to U.S. Appl. No. 13/108,764; 13 pages.

Kishimoto et al., U.S. Office Action mailed Jan. 17, 2013, directed to U.S. Appl. No. 13/023,300; 8 pages.

Kishimoto et al., U.S. Office Action mailed Feb. 20, 2013, directed to U.S. Appl. No. 13/107,440; 11 pages.

Kishimoto et al., U.S. Office Action mailed Jun. 18, 2012, directed to U.S. Appl. No. 13/081,295; 9 pages.

Kishimoto et al., U.S. Office Action mailed Mar. 19, 2013, directed to U.S. Appl. No. 13/107,449; 10 pages.

Kishimoto, U.S. Advisory Action mailed Feb. 25, 2013, directed to U.S. Appl. No. 13/081,295; 4 pages.

Kishimoto, U.S. Office Action mailed Jul. 3, 2013, directed to U.S. Appl. No. 13/107,440; 13 pages.

Xie, R. et al. (2007). "Silicon-based Oxynitride and Nitride Phosphors for White LEDs—A Review," *Science and Technology of Advanced Materials* 8: 588-600.

Kishimoto, U.S. Office Action mailed Jul. 22, 2013, directed to U.S. Appl. No. 13/104,517; 11 pages.

Kishimoto et al., U.S. Notice of Allowance mailed Nov. 19, 2013, directed to U.S. Appl. No. 13/023,300; 8 pages.

Kishimoto et al., U.S. Advisory Action mailed Nov. 5, 2013, directed to U.S. Appl. No. 13/107,449; 4 pages.

Kishimoto, U.S. Office Action mailed Aug. 30, 2013, directed to U.S. Appl. 13/108,764; 16 pages.

Kishimoto et al., U.S. Office Action mailed Sep. 6, 2013, directed to U.S. Appl. No. 13/945,673; 9 pages.

Kishimoto, U.S. Office Action mailed Jun. 7, 2013, directed to U.S. Appl. No. 13/108,764; 13 Pages.

Kishimoto et al., U.S. Office Action mailed May 17, 2013, directed to U.S. Appl. No. 13/023,300; 10 pages.

Kishimoto et al., U.S. Office Action mailed Aug. 14, 2013, directed to U.S. Appl. No. 13/107,449; 12 pages.

Kishimoto et al., U.S. Office Action mailed Feb. 10, 2014, directed to U.S. Appl. No. 13/945,673; 7 pages.

Kishimoto, U.S. Office Action mailed Feb. 20, 2014, directed to U.S. Appl. No. 14/091,980; 6 pages.

Kishimoto, U.S. Office Action mailed Jan. 3, 2014, directed to U.S. Appl. No. 13/107,440; 11 pages.

Takahashi et al., U.S. Restriction Requirement mailed Mar. 20, 2014, directed to U.S. Appl. No. 13/238,995 (6 pages).

\* cited by examiner

| | LED DOWNLIGHT 500 | LASER DOWNLIGHT 400A~400C |
|---|---|---|
| OUTSIDE DIMENSION | DIAMETER 117×91mm | DIAMETER 60×20mm |
| EMBEDDING HOLE DIMENSION | DIAMETER 100mm | 50mm |
| EMBEDDING EQUIPMENT HEIGHT | 85mm | 15mm |
| MASS | 0.7Kg | 0.1Kg |

(a)

|  | ELECTRICITY CONSUMPTION (W) | LUMINOUS FLUX (lm) | LUMINANCE (Mcd/m$^2$) | LIFE (HOUR) |
|---|---|---|---|---|
| LASER ILLUMINATION | <35 | >2000 | 100 | >10000 |
| WHITE LED | 45 | 400~500×5 | 25 | 10000 |
| HALOGEN LAMP | 55 | 700~1500 | 25 | 1000 |
| HID | 43 (INCLUDING BALLAST) | 3200 | 80 | 2000 |

(b)

LOW BEAM (WHITE LED)
LOW BEAM (WHITE LED)
HIGH BEAM (HALOGEN LAMP)

(c)

LOW BEAM
HIGH BEAM

LIGHT EMITTING DEVICE, ILLUMINATING DEVICE, AND VEHICLE HEADLAMP

This Nonvisional application claims priority under 35 U.S.C. §119(a) on Patent Application No. 2010-113475 filed in Japan on May 17, 2010, on Patent Application No. 2010-113479 filed in Japan on May 17, 2010, and on Patent Application No. 2010-113480 filed in Japan on May 17, 2010, the entire contents of which are hereby incorporated by reference.

TECHNICAL FIELD

The present invention relates to a light emitting device functioning as a high-luminance light source, an illuminating device including such a light emitting device, and a vehicle headlamp including the light emitting device or the illuminating device.

BACKGROUND ART

In recent years, studies have been intensively carried out for a light emitting device that uses, as illumination light, fluorescence emitted from a light emitting section which includes fluorescent material. The light emitting section emits the fluorescence upon irradiation with excitation light, which excitation light is emitted from an excitation light source. A semiconductor light emitting element is used as the excitation light source, such as a light emitting diode (LED), a laser diode (LD), or the like.

Patent Literatures 1 and 2 each disclose a lamp as examples of techniques related to such a light emitting device. In order to achieve a high-luminance light source, the lamps disclosed in Patent Literatures 1 and 2 employ a laser diode as the excitation light source. Laser beams emitted from the laser diode are coherent light; these laser beams have strong directivity, and therefore can be converged and used as the excitation light without waste. A light emitting device using such a laser diode as the excitation light source is suitably applicable for vehicle headlamps.

Meanwhile, Non Patent Literature 1 discloses a vehicle headlamp as an example of a technique for achieving a vehicle headlamp that employs an incoherent white LED.

CITATION LIST

Patent Literatures

Patent Literature 1
Japanese Patent Application Publication, Tokukai, No. 2005-150041 A (Publication Date: Jun. 9, 2005)
Patent Literature 2
Japanese Patent Application Publication, Tokukai, No. 2003-295319 A (Publication Date: Oct. 15, 2003)

Non Patent Literature

Non Patent Literature 1
Masaru Sasaki Hakushoku LED no Jidoushashoumei eno ouyou (Applications of white LEDs to automobile lighting devices), OYO BUTURI, Vol. 74, No. 11, pp. 1463-1466 (2005)

SUMMARY OF INVENTION

Technical Problem

In the conventional lamps disclosed in Patent Literatures 1 and 2, a plurality of beams of excitation light are guided to a single point on the fluorescent material, to cause an increase in power of the excitation light with which a minute light emitting section including the fluorescent material is irradiated.

However, as a result of study by the inventor of the present invention, it was found that if the minute light emitting section including the fluorescent material is excited with high-powered excitation light as like in the conventional lamps (namely, if the light emitting section is excited with an extremely high excitation power and with an extremely high power density), the light emitting section remarkably deteriorates. It was further revealed that if such high-powered excitation light also has a high output and has a high power density, this high-powered excitation light includes not only coherent laser beams having strong directivity but also incoherent excitation light.

The present invention is accomplished in view of the conventional problems, and its object is to provide a light emitting device and like device which allows for achieving high luminance and a long life.

Solution to Problem

In order to attain the object, a light emitting device of the present invention includes: a single or a plurality of excitation light source(s), configured to emit excitation light; a light emitting section configured to emit light upon irradiation with the excitation light; and an optical system configured to (i) guide to a vicinity of the light emitting section a single beam or a plurality of beams of the excitation light emitted from the single or the plurality of excitation light source(s) and (ii) irradiate a predetermined light receiving plane of the light emitting section with the single beam or the plurality of beams of the excitation light, in a dispersed manner.

According to the configuration, a single or a plurality of excitation light source(s) emit(s) a single beam or a plurality of beams of excitation light.

Moreover, the light emitting section is caused to emit light upon irradiation with the excitation light. Accordingly, the light emitting section at least includes fluorescent material that emits light upon irradiation with the excitation light.

Moreover, the optical system guides the single beam or the plurality of beams of excitation light emitted from the single or the plurality of excitation light source(s) to the vicinity of the light emitting section.

By thus adjusting a distance in the optical system from where the single beam or the plurality of beams of excitation light is entered to where the single beam or the plurality of beams of excitation light is guided, the single or the plurality of excitation light source(s) is spatially separated apart from the light emitting section with an arbitrary interval provided between the single or the plurality of excitation light source(s) and the light emitting section. This allows for preventing deterioration of the light emitting section due to the light emitting section being effected by heat, which heat is generated at the single or the plurality of excitation light source(s).

Moreover, according to the configuration, the optical system irradiates a predetermined light receiving plane of the light emitting section with the guided single beam or the plurality of beams of the excitation light, in a dispersed manner.

This allows for reducing a possibility that the light emitting section remarkably deteriorates caused by the light receiving plane of the light emitting section being irradiated at one focused position with a single beam or a plurality of beams of the excitation light, and thus can achieve a long-life light source without reducing a luminous flux of the emitted light.

Since there is no need to reduce the intensity of the excitation light with which the light emitting section is irradiated, it is possible to increase the luminance and luminous flux of the light emitting device.

According to the above, it is possible to provide a light emitting device which can achieve a high luminance and a long life.

In the present invention, the "optical system" may be made up of, for example, a single optical component in which a single beam or a plurality of beams of excitation light is entered via one end of the single optical component and is guided to the other end of the single optical component. Alternatively, the "optical system" may be made up of a plurality of optical components, as like a combination of a first optical component and a second optical component: a single beam or a plurality of beams of excitation light enters the first optical component via one end of the first optical component and is guided to the other end of the first optical component, thereafter the guided single beam or plurality of beams is emitted via the other end of the first optical component; subsequently, the single beam or plurality of beams of the excitation light emitted via the other end of the first optical component enters the second optical component via one end of the second optical component, and then is guided to the other end of the second optical component.

The "optical system" may be any optical system as long as the "optical system" is a member that is capable of irradiating the light receiving plane with the guided single beam or plurality of beams of the excitation light in a dispersed manner. For instance, the optical system may be a single optical component which irradiates the light receiving plane with the guided single beam or plurality of beams of the excitation light in a dispersed manner, or may be made up of a plurality of optical components such as an optical system in which the light receiving plane is irradiated with the guided single beam or plurality of beams of the excitation light in a dispersed manner, by use of two lenses.

Moreover, as in the example described above, the first optical system and the second optical system may be made up of two or more independent optical components, or may be configured as one integrated optical component such as a "light guiding member" later described.

Moreover, the excitation light source may be one which emits a coherent laser beam, such as an LD. Alternatively, the excitation light source may be one which emits incoherent excitation light, such as an LED.

The plurality of excitation light sources may include just either of the LDs or LEDs, or may include a mixture of the LDs and LEDs.

As described above, the "light emitting section" at least includes fluorescent material. The "light emitting section" can include just a single type of fluorescent material or can include a plurality of types of fluorescent material. Alternatively, the light emitting section may be made up by dispersing a single type or a plurality of types of fluorescent material in an appropriate dispersion medium.

The "fluorescent material" is a substance which emits fluorescence that has a different wavelength from that of the excitation light. The fluorescence is emitted upon transition of electrons in a high-energy state to a low-energy state, which electrons are excited to the high-energy state from the low-energy state upon irradiation with the excitation light.

Moreover, "irradiate in a dispersed manner" denotes irradiating the light receiving plane with the excitation light in a broad range of the light receiving plane and not on a specific one point of the light receiving plane.

In other words, "irradiate in a dispersed manner" denotes irradiating the light receiving plane in a broad range so that the light emitting section is not caused to be excited at a pinpoint, with excitation light having an intensity that does not cause deterioration of the light emitting section. As long as the intensity is of a degree that does not cause deterioration of the light emitting section, the strength of the light intensity distribution when the excitation light is emitted may be of a certain degree.

At times, "dispersion of light" may denote a separation of a beam to a plurality of beams having a plurality of hues, by use of a prism or the like. However, in the specification of the present application, "dispersion" is not used to express this meaning.

Moreover, the term "irradiate in a dispersed manner" encompasses any of the following cases: (i) a case where the light receiving plane is irradiated with the excitation light while a light irradiated area is kept substantially constant, (ii) a case where the light receiving plane is irradiated with the excitation light while the light irradiated area is expanded, and (iii) a case where the light receiving plane is irradiated with the excitation light while the light irradiated area is reduced.

Advantageous Effects of Invention

As described above, the light emitting device of the present invention includes: a single or a plurality of excitation light source(s), configured to emit excitation light; a light emitting section configured to emit light upon irradiation with the excitation light; and an optical system configured to (i) guide to a vicinity of the light emitting section a single beam or a plurality of beams of the excitation light emitted from the single or the plurality of excitation light source(s) and (ii) irradiate a predetermined light receiving plane of the light emitting section with the single beam or the plurality of beams of the excitation light, in a dispersed manner.

This allows for attaining an effect of achieving a high luminance and a long life.

For a fuller understanding of the nature and advantages of the invention, reference should be made to the ensuing detailed description taken in conjunction with the accompanying drawings.

DESCRIPTION OF EMBODIMENTS

Figure 1:
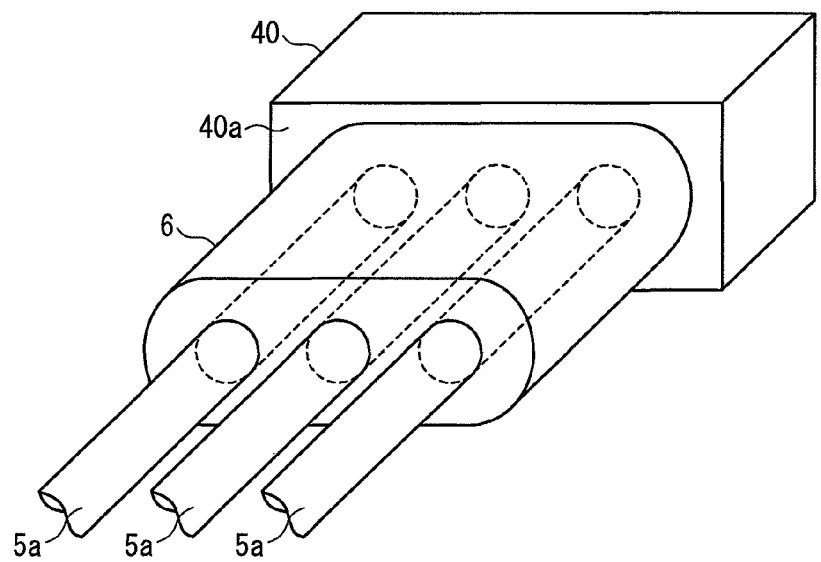
FIG. 1 is a view illustrating a positional relationship between emitting ends of optical fibers and a light emitting section, each of which is included in a headlamp that serves as an embodiment of the present invention.

The following describes an embodiment of the present invention with reference to FIG. 1 through FIG. 32. In the embodiment, a car headlamp (light emitting device, illuminating device, vehicle headlamp) 1 is described as an example of an illuminating device of the present invention. However, the illuminating device of the present invention may be accomplished as a headlamp for a vehicle or a moving object other than a car (e.g., human, ship, aircraft, submarine, rocket), or as other illuminating devices. The other illuminating devices encompass, for example, a searchlight, a projector, home illuminating devices and like devices.

The headlamp 1 may comply with light distribution characteristic standards of a running headlamp (high beam) or may comply with light distribution characteristic standards of a dipped headlamp (low beam).

Configurations that are not described in specific items below are at times omitted in description as necessary. Note however, that such configurations are identical to those described in other sections. For convenience, same reference numerals are provided for members having functions identical to those described in the sections, and descriptions of these members are omitted as appropriate.

Configuration of Headlamp 1

Figure 2:
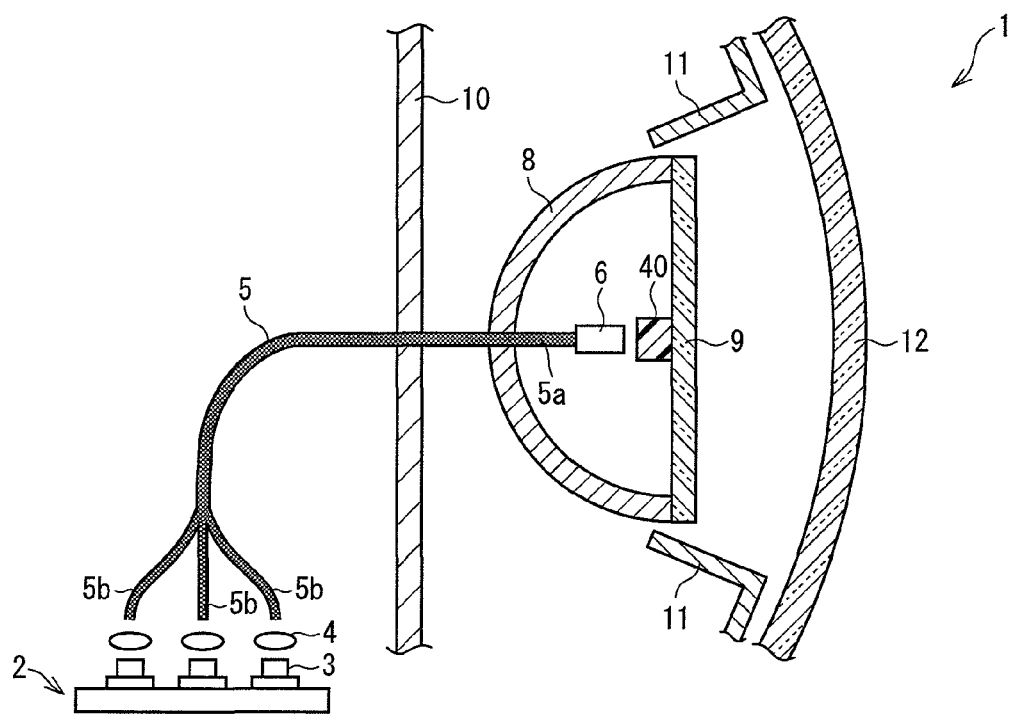
FIG. 2 is a cross sectional view illustrating a configuration of a headlamp that serves as an embodiment of the present invention.

FIG. 2 is a cross sectional view illustrating a configuration of the headlamp 1. As illustrated in FIG. 2, the headlamp 1 includes a laser diode array (excitation light source) 2, an aspherical lens (optical system) 4, an optical fiber (optical system, light guiding member) 5, a ferrule (supporting section) 6, a light emitting body (light emitting section) 40, a reflecting mirror 8, a transparent plate 9, a housing 10, an extension 11, and a lens 12. A basic configuration of the light emitting device is made up by the laser diode array 2, the optical fiber 5, the ferrule 6, and the light emitting body 40.

The laser diode array 2 functions as an excitation light source which emits excitation light, and includes a plurality of laser diodes (excitation light source) 3 that are provided on a substrate. Each of the laser diodes 3 emits a laser beam (excitation light). It is not always necessary to use a plurality of the laser diodes 3 as the excitation light source, and the number of the laser diode 3 used may be just one. However, it is easier to use a multiple number of the laser diodes 3 in order to obtain a high-output laser beam.

The laser diode 3 has one light emitting point per chip, and for example emits a laser beam of 405 nm (blue violet), has an output of 1.0 W, an operating voltage of 5 V and an operating current of 0.6 A, and is sealed in a package that has a diameter of 5.6 mm. The laser beam emitted from the laser diode 3 is not limited to 405 nm, and may be any laser beam as long as the laser beam has a peak wavelength in a wavelength range of not less than 380 nm but not more than 470 nm. If it is possible to manufacture a good-quality laser diode for a short wavelength that can emit a laser beam having a wavelength smaller than 380 nm, it is also possible to use a laser diode which is designed to emit a laser beam having a wavelength smaller than 380 nm as the laser diode 3 of the present embodiment.

An aspherical lens 4 is a lens for causing the laser beam emitted from the laser diode 3 to enter an entering end 5b, which entering end 5b is one end of the optical fiber 5. For example, FLKN1 405 manufactured by ALPS ELECTRIC CO., LTD. may be used as the aspherical lens 4. As long as the lens has the foregoing function, the aspherical lens 4 is not particularly limited in its shape and material. However, it is preferable that the material has high transmittance for a wavelength in the vicinity of 405 nm, and has good heat resistance.

The optical fiber 5 is a light guiding member which guides the laser beam emitted by the laser diode 3 to the light emitting body 40, and is a bundle of a plurality of optical fibers. The optical fiber 5 has a plurality of entering ends 5b, each of which receives a laser beam, and has a plurality of emitting ends 5a, each of which emits the laser beam entered via the entering ends 5b. Each of the plurality of emitting ends 5a emits the laser beam to a region different from each other, on a laser beam irradiation plane (light receiving plane) 40a (see FIG. 1) of the light emitting body 40. More specifically, each of a part strongest in light intensity in a light intensity distribution (see (a) of FIG. 5) of the laser beams emitted from the plurality of emitting ends 5a is emitted to different portions of the light emitting body 40. The emitting ends 5a may be in contact with the laser beam irradiation plane 40a, or may be disposed so that a gap is slightly provided between the emitting ends 5a and the light emitting body 40.

The optical fiber 5 is of a double-layered structure in which a center core is covered with a clad having a lower refractive index than that of the core. The core includes quartz glass (silicon oxide) as its main component, which quartz glass hardly has any absorption loss of the laser beam. The clad includes, as its main component, quartz glass or synthetic resin material which has a refractive index lower than that of the core. The optical fiber 5 is for example made of quartz having a core diameter of 200 μm, a clad diameter of 240 μm, and a numerical aperture NA of 0.22. However, a configuration, thickness and material of the optical fiber 5 are not limited to the foregoing values. Further, a cross section perpendicular to a long axis direction of the optical fiber 5 may be of a rectangular shape.

A member other than the optical fibers or a combination of the optical fibers and another member may also be used as the light guiding member. The light guiding member may be any member as long as the light guiding member has (i) at least one entering end that receives a laser beam emitted by the laser diode 3 and (ii) a plurality of emitting ends that emit the laser beam entered via the entering end. For instance, an entering section including at least one entering end and an emitting section including a plurality of emitting ends may be formed as members separate from the optical fibers, and the entering section and the emitting section may be connected to either end of the optical fibers.

FIG. 1 is a view illustrating a positional relationship between the emitting ends 5a and the light emitting body 40. As illustrated in FIG. 1, the ferrule 6 supports the plurality of emitting ends 5a of the optical fiber 5 as a set pattern with respect to the laser beam irradiation plane 40a of the light emitting body 40. The ferrule 6 may be formed so that holes to insert the emitting ends 5a are opened as a set pattern, or may be formed so that the ferrule 6 can be split into an upper part and a lower part, and the emitting ends 5a are sandwiched between grooves respectively formed on bonding planes of the upper part and lower part of the ferrule 6.

The ferrule 6 is to be fixed with respect to the reflecting mirror 8 by use of a stick or a tubular member that extends out from the reflecting mirror 8. The material of the ferrule 6 is not particularly limited, and for example may be stainless steel. Moreover, a multiple number of the ferrule 6 may be provided per light emitting body 40. For convenience, FIG. 1 illustrates three emitting ends 5a, however the number of the emitting ends 5a is not limited to three. Details of the number and disposition of the emitting ends 5a are later described.

The light emitting body 40 emits light upon receiving the laser beams emitted via the emitting ends 5a, and includes fluorescent material which is caused to emit light upon receiving the laser beam. More specifically, the light emitting body 40 is a member in which fluorescent material is dispersed inside silicone resin that serves as a fluorescent material retention substance (dispersion medium). The dispersion medium is preferably a light-transmitting material, and the foregoing silicone resin is an example of the dispersion medium. A ratio of the silicone resin with the fluorescent material is around 10:1 by weight ratio. Moreover, the light emitting body 40 may be made up by pressing the fluorescent material together into a solid. The fluorescent material retention substance is not limited to the silicone resin, and may be glass material such as what is called organic or inorganic hybrid glass and inorganic glass material, or also may be organic or inorganic hybrid material.

Moreover, as described above, the light emitting body 40 includes at least the fluorescent material; the light emitting body 40 may include just a single type of fluorescent material, or may include a plurality of types of fluorescent material.

Moreover, the light emitting body 40 may be made up by dispersing a single type or a plurality of types of fluorescent material into an appropriate dispersion medium. The dispersion medium is preferably solid; however, in a case where the fluorescent material is to be sealed inside an optically-transparent rectangular parallelepiped-shaped container, the dispersion medium may be liquid.

The fluorescent material is of an oxynitride and/or a nitride; the fluorescent material of blue, green, and red are dispersed into silicone resin. The laser diode 3 emits a laser beam of 405 nm (blue violet), thereby causing generation of white light upon irradiation of the light emitting body 40 with the laser beam. On this account, it can be said that the light emitting body 40 is a wavelength conversion material.

The laser diode 3 may emit a laser beam of 450 nm (blue) (or a laser beam close to what is called "blue" having a peak wavelength in a wavelength range from not less than 440 nm to not more than 490 nm), and in this case, the fluorescent material is yellow fluorescent material, or a mixture of green fluorescent material and red fluorescent material. In other words, the laser diode 3 may emit excitation light having a peak wavelength in a wavelength range from not less than 440 nm to not more than 490 nm. In this case, it is easy to select and manufacture material of the light emitting section (fluorescent material), for generating white light. The yellow fluorescent material is fluorescent material which emits light having a peak wavelength in a wavelength range of not less than 560 nm to not more than 590 nm. The green fluorescent material is fluorescent material which emits light having a peak wavelength in a wavelength range of not less than 510 nm to not more than 560 nm. The red fluorescent material is fluorescent material which emits light having a peak wavelength in a wavelength range of not less than 600 nm to not more than 680 nm.

The fluorescent material is preferably what is commonly called oxynitride fluorescent material or nitride fluorescent material. An example of the oxynitride fluorescent material is sialon fluorescent material. Sialon is a substance in which a portion of silicon atoms of silicon nitride is substituted with aluminum atoms, and a portion of nitrogen atoms of the silicon nitride is substituted with oxygen atoms. The sialon fluorescent material may be prepared as a solid solution in which alumina ($Al_2O_3$), silica ($SiO_2$), rare earth elements and the like are combined into silicon nitride ($Si_3N_4$).

Moreover, another preferable example of the fluorescent material is to use semiconductor nanoparticle fluorescent material using III-V compound semiconductor nanometer-sized particles. One of features of the semiconductor nanoparticle fluorescent material is that even in a case where just a single type of compound semiconductor (e.g., indium phosphide: InP) is used, it is possible to change its luminous color by quantum size effect, by changing its particle diameter. For instance, InP emits red light when the particle size is around 3 nm to 4 nm. In the embodiment, the particle size is evaluated with a transmission electron microscope (TEM).

Moreover, since the fluorescent material is semiconductor-based, the fluorescence duration is short. However, power of the excitation light can be emitted rapidly as fluorescence, so therefore the fluorescent material is highly resistant against high power excitation light. This is because the light emission duration of the semiconductor nanoparticle fluorescent material is around 10 nanoseconds, which duration is five digits smaller than that of regular fluorescent material which has the rare earths serve as a luminescence center. Since the light emission duration is short, it is possible to rapidly repeat absorption of excitation light and light emission of fluorescence.

As a result, a high efficiency is maintained with respect to strong excitation light, and generation of heat from the fluorescent material is held down. This allows for further preventing the light converting member from deteriorating (discoloring or deformation) caused by heat. Accordingly, in a case where a light emitting element having high optical output is used as a light source, it is possible to prevent the life of the light emitting device from shortening.

The shape and size of the light emitting body 40 is, for example, a rectangular parallelepiped shape having a dimension of 3 mm×1 mm×1 mm. In this case, an area of the laser beam irradiation plane 40*a* which receives the laser beam from the laser diode 3 is 3 $mm^2$. A light distribution pattern (light distribution) of a vehicle headlamp lawfully stipulated domestically in Japan is narrow in a vertical direction and broad in a horizontal direction; hence, in order to easily achieve the light distribution pattern, the shape of the light emitting body 40 is made wide in the horizontal direction (cross section being substantially rectangular shaped). The light emitting body 40 can be not just of a rectangular parallelepiped shape, but also can be of a tubular shape whose laser beam irradiation plane 40*a* is of an ellipse. Moreover, the laser beam irradiation plane 40*a* does not necessarily need to be a flat plane, and may be a curved plane. However, in order to control reflection of the laser beam, the laser beam irradiation plane 40*a* is preferably a flat plane perpendicular to an optical axis of the laser beam.

Moreover, as illustrated in FIG. 2, the light emitting body 40 is fixed at a position facing the emitting ends 5*a*, on a surface of an inner side of the transparent plate 9 (side on which the emitting ends 5*a* are disposed). How the position of the light emitting body 40 is fixed is not limited to this method, and the position of the light emitting body 40 may be fixed by use of a stick-shaped or tubular-shaped member extending out from the reflecting mirror 8.

Figure 3:
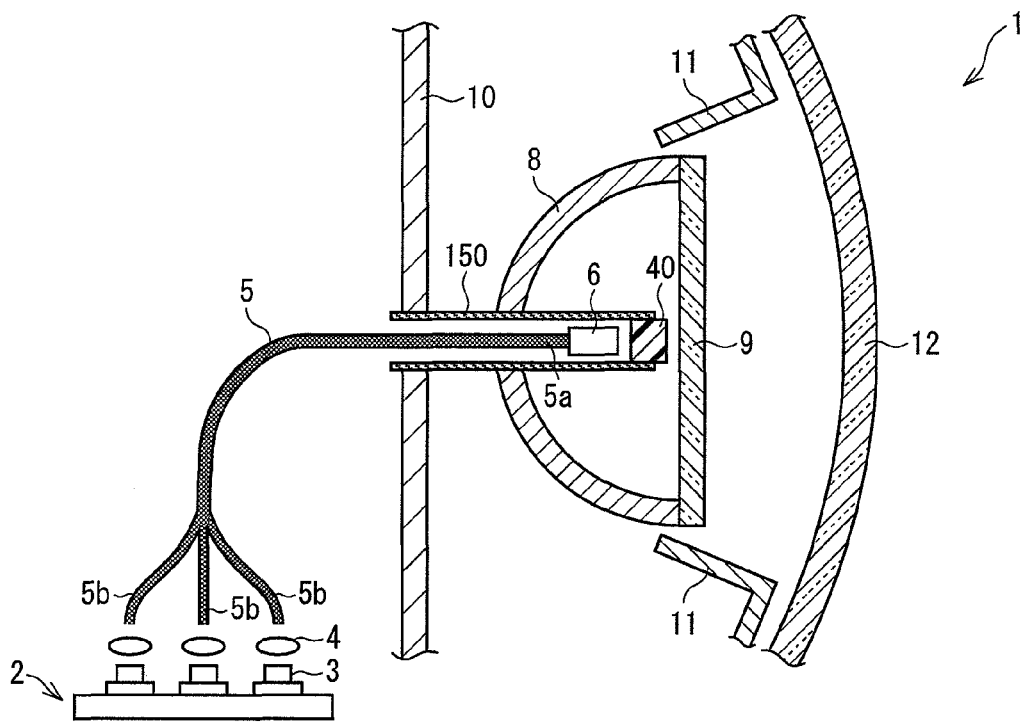
FIG. 3 is a cross sectional view illustrating a modification of how a position of a light emitting section is determined.

FIG. 3 is a cross sectional view illustrating a modification of a how to determine the position of the light emitting body 40. As illustrated in FIG. 3, the light emitting body 40 may be fixed to an end of a tubular section 150 which is extended penetrating through a center part of the reflecting mirror 8. In this case, the emitting ends 5*a* of the optical fiber 5 can be passed through inside the tubular section 150.

The reflecting mirror 8 reflects the light emitted from the light emitting body 40, thereby forming a pencil of rays which travels within a predetermined solid angle. Namely, the reflecting mirror 8 forms a pencil of rays which travels forwards of the headlamp 1, by reflecting the light emitted from the light emitting body 40. The reflecting mirror 8 is, for example, a curved plane shaped (cup-shaped) member on which surface a metal thin film is formed.

The transparent plate 9 is a transparent resin plate covering an opening of the reflecting mirror 8, and supports the light emitting body 40. The transparent plate 9 is preferably formed of material which (i) blocks the laser beam emitted from the laser diode 3, and (ii) transmits fluorescence that is generated by converting the laser beam with the light emitting body 40. Other than the resin plate, an inorganic glass plate or the like may also be used as the transparent plate 9. With the light emitting body 40, most of the coherent laser beam is converted to incoherent fluorescence. However, there may be cases where a portion of the laser beam is not converted due to some kind of cause. Even in such a case, it is possible to prevent the laser beam from leaking outside by blocking the laser beam with the transparent plate 9. In a case where such an effect is not expected and the light emitting body 40 is to be supported by a member other than the transparent plate 9, the transparent plate 9 may be omitted from the configuration.

The housing 10 forms the body of the headlamp 1, and stores the reflecting mirror 8 and like members therein. The optical fiber 5 penetrates through the housing 10, and the laser diode array 2 is disposed outside the housing 10. Although the laser diode array 2 generates heat when the laser beam is emitted, since the laser diode array 2 is provided outside the housing 10, it is possible to efficiently cool the laser diode array 2. Moreover, the laser diode 3 may possibly break down, so it is preferable to dispose the laser diode 3 at a position where the laser diode 3 may be easily replaced. If these points can be ignored, the laser diode array 2 may be stored inside the housing 10.

The extension 11 is disposed on side parts of a front part of the reflecting mirror 8. The extension 11 conceals the inner configuration of the headlamp 1 which allows for improving appearance of the headlamp 1, and further enhances a sense of unity between the reflecting mirror 8 and the vehicle body. This extension 11 also has a metal thin film formed on its surface, as with the reflecting mirror 8.

The lens 12 is disposed on the opening of the housing 10, and seals the headlamp 1. Light emitted from the light emitting body 40 and reflected off the reflecting mirror 8 is emitted towards the front of the headlamp 1 through the lens 12.

(Disposition of Emitting Ends 5a)

Figure 4:
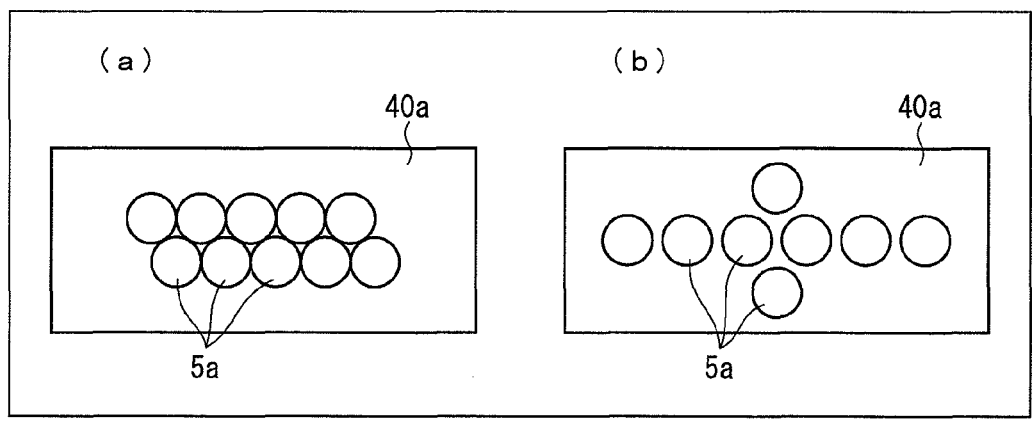
FIG. 4 is a view illustrating examples of disposition patterns of a plurality of emitting ends of optical fibers, with respect to a laser beam irradiation plane of a light emitting section; (a) illustrates one example of the disposition patterns, and (b) illustrates another example of the disposition patterns.

In FIG. 4, (a) and (b) are views each illustrating an example of a disposition pattern of the plurality of emitting ends 5a of the optical fiber 5, with respect to the laser beam irradiation plane 40a of the light emitting body 40. The views of (a) and (b) of FIG. 4 illustrate positions where the emitting ends 5a are in contact with (or is facing) the laser beam irradiation plane 40a, as circles. As illustrated in (a) of FIG. 4, the laser beam irradiation plane 40a of the light emitting body 40 has a long axis, and at least a part of the plurality of the emitting ends 5a may be arranged along the long axis. More specifically, the emitting ends 5a may be arranged closely together, having two rows of five aligned emitting ends. Such a configuration allows efficient excitation of the light emitting body 40 that is long in the horizontal direction.

Moreover, as illustrated in (b) of FIG. 4, the emitting ends 5a may be disposed so as to form three rows just at a center part of the laser beam irradiation plane 40a. Namely, the plurality of emitting ends 5a disposed with respect to the laser beam irradiation plane 40a of the light emitting body 40 are disposed so as to be unbalanced in density on the laser beam irradiation plane 40a. This configuration causes a center part of the light emitting body 40 (part of the light emitting body 40 in which density of the emitting ends 5a is high) to emit light more strongly than other parts of the light emitting body. This allows for improving illumination intensity of the center part of the region that is irradiated with the headlamp 1.

Moreover, the plurality of the emitting ends 5a may be disposed so as to form a matrix throughout an entire laser beam irradiation plane 40a of the light emitting body 40. This configuration allows for efficiently and evenly exciting the light emitting body 40.

(Positional Relationship of Laser Beam Irradiation Region)

Figure 5:
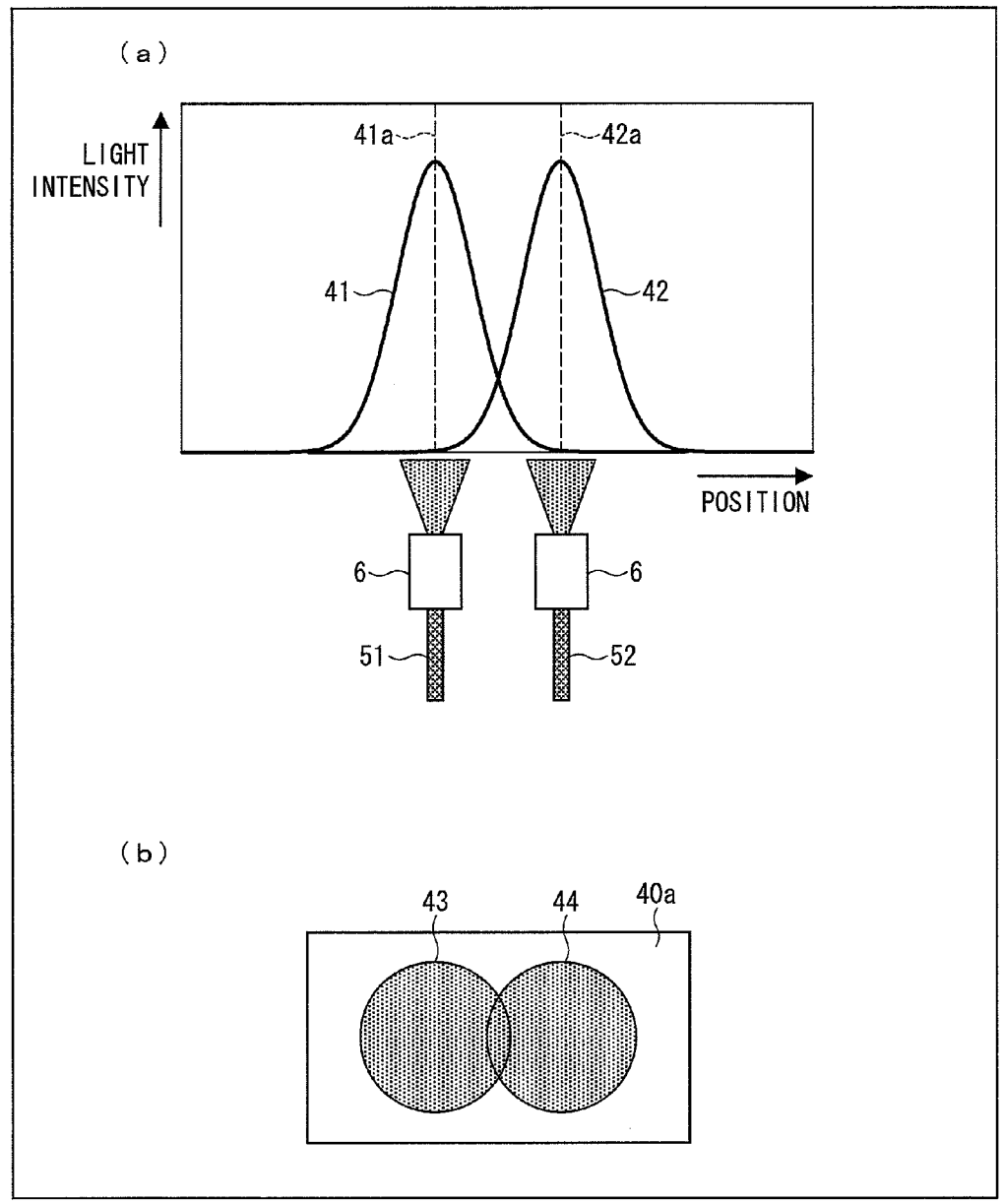
FIG. 5 is a view illustrating light intensity distributions of laser beams emitted from emitting ends of optical fibers and a positional relationship of a plurality of laser beam irradiation regions; (a) illustrates the light intensity distributions of the laser beams, and (b) illustrates the positional relationship of the plurality of laser beam irradiation regions.

A "laser beam irradiation region" denotes a region on the laser beam irradiation plane 40a of the light emitting body 40 which is irradiated with a laser beam emitted from one of the emitting ends 5a. The optical fiber 5 includes a plurality of the emitting ends 5a; therefore, a plurality of the laser beam irradiation regions are also formed. Illustrated in (a) of FIG. 5 are light intensity distributions of the laser beams emitted from the emitting ends 5a of the optical fiber 5, and (b) of FIG. 5 illustrates a positional relationship of the plurality of the laser beam irradiation regions. In the graph in (a) of FIG. 5, curved line 41 indicates a light intensity distribution of a laser beam emitted from an emitting end 5a of an optical fiber 51 which makes up the optical fiber 5, and curved line 42 indicates a light intensity distribution of an emitting end 5a emitted from an emitting end 5a of an optical fiber 52 which also makes up the optical fiber 5. In the graph of (a) of FIG. 5, the horizontal axis indicates a position of the optical fiber 5, and the vertical axis indicates a light intensity of the laser beam that is emitted to the laser beam irradiation plane 40a.

As illustrated in (a) of FIG. 5, the laser beam emitted from one of the emitting ends 5a reaches the laser beam irradiation plane 40a while the laser beam spreads in a predetermined angle. Hence, even if the emitting ends 5a of the optical fibers 51 and 52 were disposed aligned on a flat plane that is parallel to the laser beam irradiation plane 40a, laser beam irradiation regions 43 and 44 formed respectively by these laser beams emitted from the emitting ends 5a possibly overlap each other, as illustrated in FIG. (b) of FIG. 5.

Even in such a case, the laser beam irradiation plane 40a can be irradiated with the laser beams in a two-dimensional planar dispersed manner, as long as the laser beam irradiation plane 40a of the light emitting body 40 is irradiated with the laser beams emitted via the light emitting parts 5a so that a part having a strongest light intensity in their light intensity distribution (in the vicinity of central axes 41a and 42a illustrated in (a) of FIG. 5) of each of the laser beams are emitted to different portions of the laser beam irradiation plane 40a.

In other words, a cast image is formed by having the light emitting body 40 be irradiated with a laser beam emitted from one of the plurality of emitting ends 5a. This cast image has a maximum light intensity part (center part of laser beam irradiation region), which is a part having the strongest light intensity in the cast image. The laser beam irradiation light 40a is sufficiently irradiated with light as long as a position of the maximum light intensity part is different from a position of a maximum light intensity part of a cast image originated from another emitting end 5a. Hence, it is not always necessary to completely separate the laser beam irradiation regions from each other.

(Configuration of Excitation Light Source)

Figure 6:
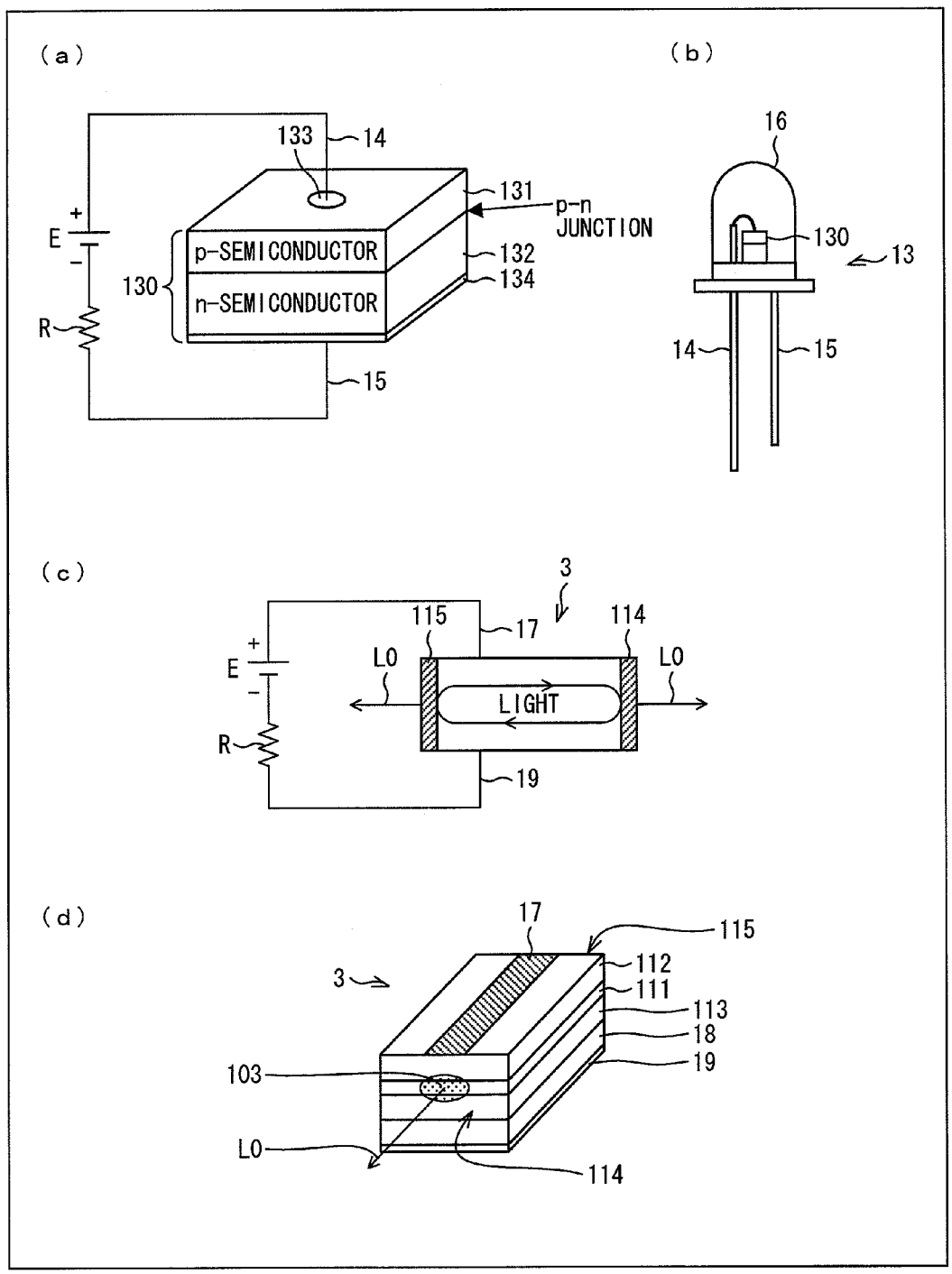
FIG. 6 is a view illustrating a specific example of an excitation light source; (a) illustrates a circuit diagram of an example (LED) of the excitation light source, (b) illustrates an overview of the LED, (c) illustrates a circuit diagram of another example (LD) of the excitation light source, and (d) illustrates an overview of the LD.

The following description explains a specific example of an excitation light source, with reference to (a) to (d) of FIG. 6.

Illustrated in (a) of FIG. 6 is a circuit of a LED lamp (excitation light source) 13, as an example of the excitation light source, and (b) of FIG. 6 illustrates an overview of the LED lamp 13. Illustrated in (c) of FIG. 6 is a circuit of a laser diode 3 as another example of the excitation light source, and (d) of FIG. 6 illustrates an overview of the laser diode 3.

As illustrated in (b) of FIG. 6, the LED lamp 13 is configured in such a manner that an LED chip (excitation light source) 130 is sealed in an epoxy resin cap 16, which LED chip 130 is connected to an anode 14 and a cathode 15.

As illustrated in (a) of FIG. 6, the LED chip 130 has a p-n junction of a p-type semiconductor 131 and an n-type semiconductor 132. The cathode 15 is connected to a p-type electrode 133 and the anode 14 is connected to an n-type electrode 134. Note that the LD chip 101 is connected to a power source E via a resistance R.

The connection of the anode 14 and the cathode 15 with the power source E forms a circuit. This allows for supplying electricity from the power source E to the LED chip 130, thereby allowing emission of incoherent excitation light from the surroundings of the p-n junction.

Materials that may be used for the LED chip 130 encompass compound semiconductors such as: GaP, AlGaAs, GaAsP, and the like whose luminous color is red; GaAsP whose luminous color is orange; GaAsP and GaP whose luminous color is yellow; GaP whose luminous color is green; and SiC and GaN whose luminous color is blue.

The LED chip 130 has features in which it is driven at a low voltage of approximately 2 V to 4 V, is small and lightweight, is quick in response speed, has a long life, and is available at low cost.

Next described is a basic configuration of the laser diode 3. Illustrated in (c) of FIG. 6 is a circuit of the laser diode 3, and (d) of FIG. 6 illustrates a basic configuration of the laser diode 3. As illustrated in (d) of FIG. 6, the laser diode 3 is made up by stacking a cathode electrode 19, a substrate 18, a clad layer 113, an active layer 111, a clad layer 112, and an anode electrode 17 in this order.

The substrate 18 is a semiconductor substrate, and in order to obtain a blue to ultraviolet excitation light for exciting fluorescent material as in the present application, it is preferable to use GaN, sapphire, or SiC as the substrate 18. Generally, other examples of a substrate for use as a laser diode encompass substrates made of material such as: IV semiconductors such as Si, Ge, and SiC; III-V compound semiconductors represented by GaAs, GaP, InP, AlAs, GaN, InN, InSb, GaSb, and AlN; II-VI compound semiconductors such as ZnTe, ZeSe, ZnS, and ZnO; oxide insulators such as ZnO, $Al_2O_3$, $SiO_2$, $TiO_2$, $CrO_2$, and $CeO_2$; and nitride insulators such as SiN.

The anode electrode 17 is provided for injecting current into the active layer 111 via the clad layer 112.

The cathode electrode 19 is provided for injecting current into the active layer 111 via the clad layer 113 from under the substrate 18. The current is injected by applying a forward bias to the anode electrode 17 and the cathode electrode 19.

The active layer 111 is sandwiched between the clad layer 113 and the clad layer 112.

In order to obtain a blue to ultraviolet excitation light, a mixed crystal semiconductor including AlInGaN is used as material of the active layer 111 and the clad layers 112 and 113. Generally, a mixed crystal semiconductor whose main component is Al, Ga, In, As, P, N, or Sb is used as the active layer 111 and clad layers 112 and 113 of the laser diode, and the configuration may be as such. Moreover, the active layer 111 and the clad layers 112 and 113 may be made up of a II-VI compound semiconductor such as Zn, Mg, S, Se, Te, or ZnO.

The active layer 111 is a region which emits light upon the injection of the current. The light emitted is trapped within the active layer 111 due to the difference in refractive index between the clad layer 112 and the clad layer 113.

Furthermore, the active layer 111 is formed so as to have a front cleaved plane 114 and a rear cleaved plane 115 which are disposed facing each other to trap the light amplified by stimulated emission. The front cleaved plane 114 and rear cleaved plane 115 serve as mirrors.

However, different from a mirror which completely reflects light, a portion of the light amplified by the stimulated emission is emitted from the front cleaved plane 114 and the rear cleaved plane 115 (in the embodiment, referred to as front cleaved plane 114 for convenience) of the active layer 111, and this emitted light serves as the laser beam L0. Note that the active layer 111 may be of a multilayer quantum well structure.

The rear cleaved plane 115 facing the front cleaved plane 114 has a reflective film (not illustrated) provided thereon, which reflective film is used for laser emission. By providing a difference in reflectance between the front cleaved surface 114 and the rear cleaved surface 115, it is possible to have most of the laser beam L0 be emitted from a low-reflectance edge plane, for example the front cleaved plane 114 via the light emitting point 103.

The clad layer 113 and the clad layer 112 may be made up of a semiconductor of any one of III-V compound semiconductors represented by GaAs, GaP, InP, AlAs, GaN, InN, InSb, GaSb, and AlN and II-VI compound semiconductors such as ZnTe, ZeSe, ZnS, and ZnO, each of which are of a n-type and a p-type. By applying a forward bias to the anode electrode 17 and the cathode electrode 19, current can be injected into the active layer 111.

Film formation of the semiconductor layers such as the clad layer 113, clad layer 112, and active layer 111, may be carried out by a general film forming method such as MOCVD (metal-organic chemical vapor deposition), MBE (molecular beam epitaxy), CVD (chemical vapor deposition), laser ablasion, sputtering, or like method. The film formation of the metal layers may be carried out by a general film forming method such as vacuum deposition, plating, laser ablasion, sputtering or like methods.

(Light Emitting Principle of Light Emitting Body 40)

Next described is a light emitting principle of the fluorescent material, which light emission is caused by the laser beam emitted from the laser diode 3.

First, the laser beam emitted from the laser diode 3 is emitted to the fluorescent material included in the light emitting body 40. This causes electrons existing inside the fluorescent material to be excited from a low energy state to a high energy state (excited state).

Since this excited state is unstable, the energy state of the electrons in side the fluorescent material thereafter switches back to the original low energy state (ground level energy state or metastable level energy state between excitation level and ground level) after elapse of a set time.

As such, the fluorescent material emits light upon a transition of the electrons excited to the high energy state back to the low energy state.

White light (or pseudo-white light) can be made up by a mixture of three colors which meet an isochromatic principle or by a mixture of two colors which are complementary colors for each other. By combining based on these principles the color of the laser beam emitted from the laser diode with the color of light emitted from the fluorescent material as described above, it is possible to emit (pseudo-) white light.

In a case where ten of the laser diodes 3 are provided, and a laser beam of 405 nm is received from each of the laser diodes 3, the light emitting body 40 emits a luminous flux of 1500 lm (lumen). Luminance in this case is 80 $cd/mm^2$ (candela/square millimeters).

(Effect of Headlamp 1)

The inventor of the present invention found that the light emitting part remarkably deteriorates in a case where the light emitting section is excited with a high-powered laser beam that has a high light density. It is thought that the same problem occurs even if light emitted from an LED is used as the excitation light, as long as the light is high-powered and has a high light density. Deterioration of the light emitting section is mainly caused by deterioration of the fluorescent material itself included in the light emitting section, and further by deterioration of a substance (dispersion medium, for example silicone resin) that surrounds the fluorescent material. The foregoing oxynitride fluorescent material and nitride fluorescent material emit light with an efficiency of 60% to 90% upon irradiation with the laser beam, however the remainder just serves as a cause for generation and discharging of heat. It is thought that the dispersion medium deteriorates caused by this heat. Accordingly, a dispersion medium having high thermal resistance is preferably used as the dispersion medium. Examples of the dispersion medium having high thermal resistance includes, for example, glass.

Moreover, in view of the above problems, the headlamp 1 has at least a portion of the laser beams emitted from each of the emitting ends 5a of the optical fiber 5 be emitted to regions different from each other on the laser beam irradiation plane 40a of the light emitting body 40. In other words, the laser beams emitted from the plurality of emitting ends 5a are emitted mildly on the laser beam irradiation plane 40a, not by having the laser beams being focused on one spot, but by having the laser beams be dispersed toward a two-dimensional flat plane.

This allows for reducing the possibility that the light emitting body 40 remarkably deteriorates caused by the laser beams being emitted in a focused manner toward one point on the light emitting body 40. At this time, the deterioration of the light emitting body 40 is prevented without reducing the luminous flux of light emitted from the light emitting body 40, and allows for achieving a headlamp 1 having a long life while achieving a luminance required as a headlamp.

Furthermore, since the light emitting body 40 has a long life, it is possible to reduce the trouble and costs required for replacing the light emitting body 40.

Moreover, since the light emitting body 40 that is wide in the horizontal direction is excited by a plurality of emitting ends arranged along a long axis of the light emitting body 40, it is possible to achieve a light distribution pattern for a vehicle headlamp. A setting of the light distribution pattern can be carried out based on the shape of the light emitting body 40 and disposition of the plurality of emitting ends 5a; hence, it is possible to achieve the light distribution pattern more easier than the conventional technique.

Moreover, the optical fiber 5 is flexible, and so disposition of the emitting ends 5a with respect to the laser beam irradiation plane 40a can be easily changed. As a result, it is possible to dispose the emitting ends 5a so as to run along the shape of the laser beam irradiation plane 40a. Such a disposition allows for mildly irradiating the entire laser beam irradiation plane 40a with the laser beams.

Moreover, since the optical fiber 5 is flexible, it is possible to easily change a relative positional relationship of the laser diode 3 with the light emitting body 40. By adjusting the length of the optical fiber 5, it is further possible to dispose the laser diode 3 in a position separated away from the light emitting body 40.

Hence, it is possible to increase the freedom in design of the headlamp 1, such as disposing the laser diode 3 at a position allowing easy cooling or easy replacement.

Moreover, setting a disposition of the plurality of emitting ends 5a with respect to the laser beam irradiation plane 40a of the light emitting body 40 allows for changing the illumination intensity of a region illuminated with the light of the light emitting body 40, within the region.

(Another Example of Excitation Light Source)

Figure 7:
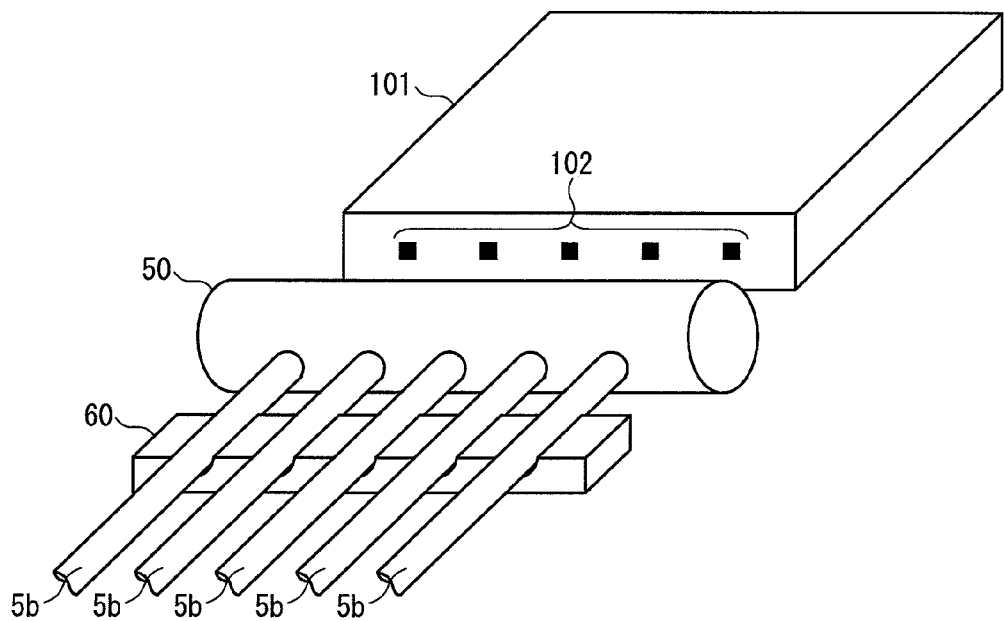
FIG. 7 is a perspective view illustrating a configuration of a laser diode included in a headlamp that serves as another embodiment of the present invention.

Next described is another example of an excitation light source different from the foregoing laser diode 3, with reference to FIG. 7.

The foregoing laser diode 3 includes one light emitting point per chip. However, an excitation light source having a plurality of light emitting points per chip may also be used as the excitation light source of the headlamp 1.

FIG. 7 is a perspective view illustrating a configuration of a LD chip (excitation light source) 101. As illustrated in FIG. 7, the LD chip 101 has five light emitting points (excitation light sources) 102 per chip. Each of the light emitting points 102 emits a laser beam having a wavelength of 405 nm; an output of this laser beam is 1 W, whereby a total of light emitted per chip is 5 W. The light emitting points 102 are provided at a pitch of 0.4 mm.

In a case of using such a LD chip 101, a rod-shaped lens (optical system) 50 is disposed at a position in front of a plane on which the light emitting points 102 of the LD chip 101 are provided. The rod-shaped lens 50 causes the laser beams emitted from the light emitting points 102 to enter the entering end 5b of the optical fiber 5. An aspherical lens 4 may be provided to each of the light emitting points 102, however use of the configuration of the laser diode is more simplified by using the rod-shaped lens 50.

An optical fiber fixture 60 determines a position of the entering ends 5b so as to allow the laser beams emitted from the light emitting points 102 to enter the plurality of the entering ends 5b. The light emitting points 102 are provided at a pitch of 0.4 mm, so the entering ends 5b are also fixed by the optical fiber fixture 60 at a pitch of 0.4 mm. Accordingly, the optical fiber fixture 60 is provided with grooves at a pitch of 0.4 mm.

The configuration of the emitting ends 5a on the optical fiber 5 is as described above.

By using the LD chip 101 as such, it is possible to simplify the configuration of the excitation light source, and reduce manufacturing costs required of the excitation light source.

Configuration of Laser Downlight 400A

Another embodiment of the illuminating device of the present invention is described below, with reference to FIGS. 8 to 13.

This embodiment describes a laser downlight (light emitting device, illuminating device) 400A as an example of an illuminating device of the present invention. The laser downlight 400A is an illuminating device which is disposed on a ceiling of a structure such as a building, vehicle or the like, and uses fluorescence as illumination light, which fluorescence is emitted upon irradiation of the light emitting body 40 with a laser beam emitted from the laser diode 3.

Moreover, an illuminating device having a similar configuration to the laser downlight 400A may be disposed on a side wall or a floor of the structure. Where the illuminating device is disposed is not particularly limited.

Figure 8:
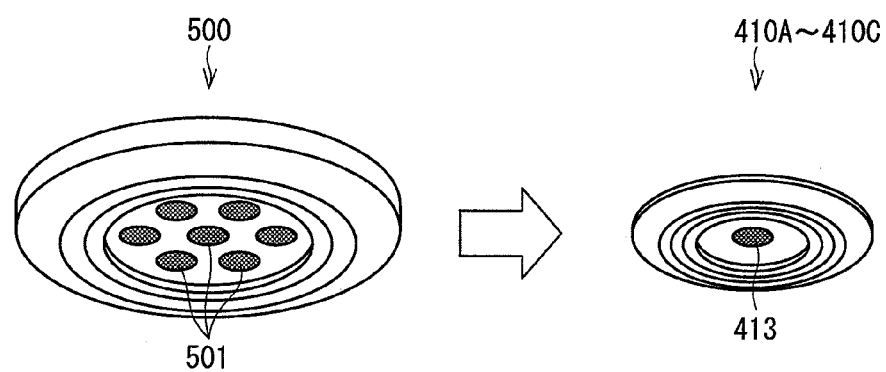
FIG. 8 is a schematic view illustrating external appearances of (i) a light emitting unit included in an example of a laser downlight that serves as an embodiment of the present invention and (ii) a conventional LED downlight.
Figure 9:
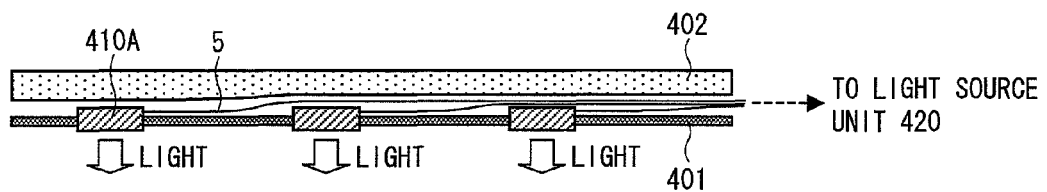
FIG. 9 is a cross sectional view illustrating a ceiling on which the laser downlight is disposed.
Figure 10:
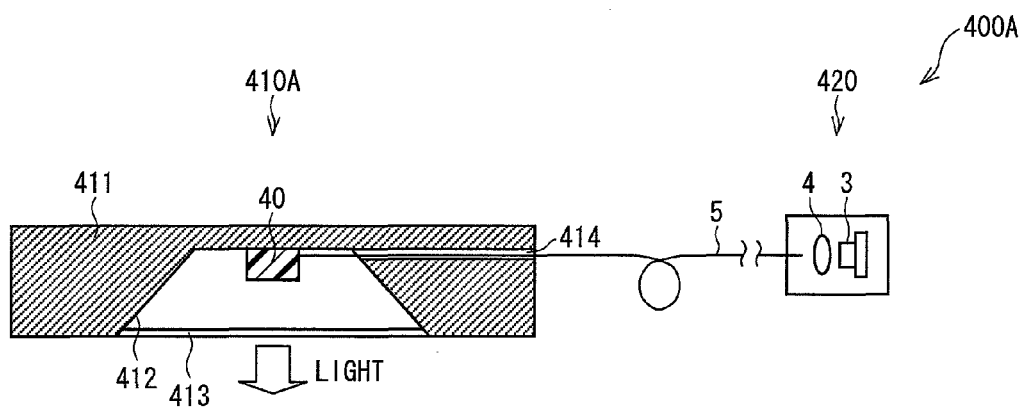
FIG. 10 is a cross sectional view of the laser downlight.

FIG. 8 is a schematic view illustrating an external appearance of a light emitting unit 410A and a conventional LED downlight 500. FIG. 9 is a cross sectional view of a ceiling on which the laser downlight 400A is disposed. FIG. 10 is a cross sectional view of the laser downlight 400A. As illustrated in FIGS. 8 to 10, the laser downlight 400A is embedded in a top panel 401, and includes a light emitting unit 410A which emits illumination light and a light source unit 420 which supplies a laser beam to the light emitting unit 410A via the optical fiber 5. The light source unit 420 is not disposed on the ceiling, and is disposed on a position where the user can easily touch (e.g., side wall of building). The light source unit 420 can be freely positioned as such since the light source unit 420 and the light emitting unit 410A are connected to each other via the optical fiber 5. The optical fiber 5 is disposed in a gap between the top panel 401 and a heat insulating material 402.

(Configuration of Light Emitting Unit 410A)

As illustrated in FIG. 10, the light emitting unit 410A includes a housing 411, the optical fiber 5, a light emitting body 40, and a light transmitting plate 413.

The housing 411 has a concave section 412, and the light emitting body 40 is disposed on a bottom surface of the concave section 412. The concave section 412 has a metal thin film formed on its surface, and therefore the concave section 412 functions as a reflecting mirror.

The housing 411 includes a path 414 formed to pass through the optical fiber 5; the optical fiber 5 passes through the path 414 and extends to the light emitting section 40. The relationship in position of the emitting ends 5a of the optical fiber 5 with the light emitting body 40 is the same as the relationship as described above.

The light transmitting plate 413 is a transparent or a semi-transparent plate disposed so as to close an opening of the concave section 412. This light transmitting plate 413 functions similarly to the transparent plate 9; fluorescence emitted from the light emitting body 40 is emitted through the light transmitting plate 413 as illumination light. The light transmitting plate 413 may be detachable from the housing 411, or may be omitted from the configuration.

Although the light emitting unit 410A in FIG. 8 has a circular outer edge, the shape of the light emitting unit 410A (more specifically, the shape of the housing 411) is not particularly limited.

Different from the case of the headlamp, the downlight does not require an ideal point light source, and is sufficient just as having one light emitting point. Hence, restrictions regarding the shape, size and disposition of the light emitting section 40 are fewer than those of the headlamp.

(Configuration of Light Source Unit 420)

The light source unit 420 includes a laser diode 3, an aspherical lens 4, and an optical fiber 5.

The entering end 5b which is one end of the optical fiber 5 is connected to the light source unit 420. The laser beam emitted from the laser diode 3 enters the entering end 5b of the optical fiber 5 via the aspherical lens 4.

Just one pair of the laser diode 3 and the aspherical lens 4 is illustrated inside the light source unit 420 illustrated in FIG. 10. However, in a case where a plurality of light emitting units 410A are provided, a bundle of the optical fibers 5, each of which extends from a respective one of the light emitting units 410A, may be guided to a single LD light source unit 420. In this case, a plurality of pairs of the laser diode 3 and the aspherical lens 4 (or a set of a plurality of laser diodes 3 and one rod-shaped lens 50) is to be stored in one light source unit 420, and the light source unit 420 is to function as a centralized power source box.

(Modification of How to Dispose Laser Downlight 400A)

Figure 11:
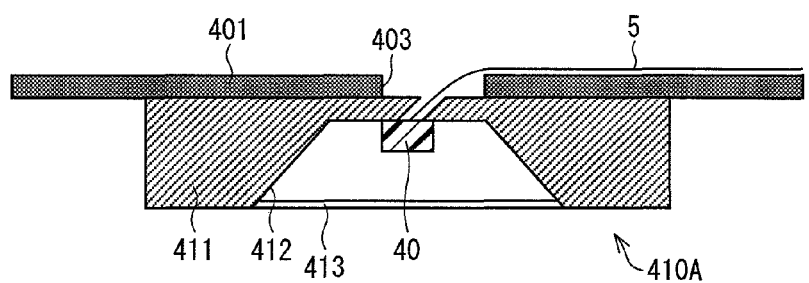
FIG. 11 is a cross sectional view illustrating a modification of how to dispose the laser downlight.

FIG. 11 is a cross sectional view illustrating a modification of how to dispose the laser downlight 400A. As illustrated in FIG. 11, the modification of how to dispose the laser downlight 400A may be one in which the top panel 401 just has a small hole 403 opened for passing through the optical fiber 5, and the laser downlight itself (light emitting unit 410A) is adhered to the top panel 401 with a strong adhesive tape or the like, with full utilization of the thin and lightweight characteristics of the laser downlight 400A. In this case, the restrictions for disposing the laser downlight 400A is reduced, and is also advantageous in that construction costs can be remarkably reduced in amount.

(Comparison of Laser Downlight 400A and Conventional LED Downlight 500)

As illustrated in FIG. 8, the conventional LED downlight 500 includes a plurality of light transmitting plates 501, which each of the light transmitting plates 501 emits illumination light. In other words, the LED downlight 500 includes a plurality of light emitting points. Due to the relatively small luminous flux of light emitted from each of the light emitting points, a luminous flux sufficient enough as illumination light cannot be achieved unless a plurality of the light emitting points are provided. This is why the LED downlight 500 includes the plurality of the light emitting points.

In comparison, the laser downlight 400A is an illuminating device that has a high luminous flux. Hence, the laser downlight 400A may have just one light emitting point. This allows for attaining an effect that a clear shadow is generated by use of the illumination light. Moreover, use of high color rendering fluorescent material (e.g., a combination of several types of oxynitride fluorescent material) as fluorescent material of the light emitting body 40 allows for enhancing color rendering properties of the illumination light.

Figures 12, 13:
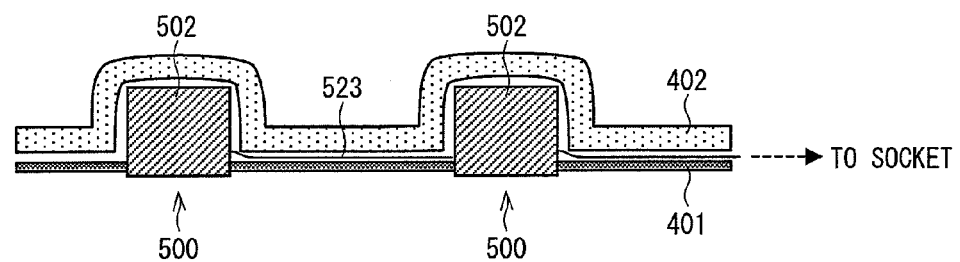
FIG. 12 is a cross sectional view illustrating a ceiling on which the LED downlight is disposed.
FIG. 13 is a table comparing specifications of the laser downlight and the LED downlight.

FIG. 12 is a cross sectional view of a ceiling on which the LED downlight 500 is disposed. As illustrated in FIG. 12, in the LED downlight 500, a housing 502 is embedded in the top panel 401. This housing 502 contains a LED chip, a power source and a cooling unit. The housing 502 is relatively large, and a concave section is formed at a part of the heat insulating material 402 in which the housing 502 is disposed, so that the heat insulating material 402 fits with the shape of the housing 502. A power source line 523 extends from the housing 502, and this power source line 523 is connected to a plug socket (not illustrated).

Such a configuration causes problems as like the following problems: first, a light source (LED chip) and a power source, each of which is a heat generating source, are provided between the top panel 401 and the heat insulating material 402. When the LED downlight 500 is used, the temperature of the ceiling increases due to these heat generating sources, thereby causing a decrease in cooling efficiency of the room.

Moreover, a power source and a cooling unit are required for each of the LED downlight 500 provided; this causes an increase in the total amount of costs.

Furthermore, since the housing 502 is of a relatively large-sized member, it is often difficult to dispose the LED downlight 500 between the top panel 401 and the heat insulating material 402.

In comparison, the laser downlight 400A does not include a large heat-generating source in the light emitting unit 410A; therefore, the cooling efficiency of the room does not decrease. Consequently, it is possible to avoid an increase in the costs required for cooling the room.

Moreover, since there is no need to provide the power source and the cooling unit per light emitting unit 410A, it is possible to reduce the size and thickness of the laser downlight 400A. As a result, restriction of the space for disposing the laser downlight 400A is reduced, thereby making it easy to dispose the laser downlight 400A in already-built houses.

The laser downlight 400A is small and thin, thereby allowing for disposing the light emitting unit 410A on the surface of the top panel 401. Since hardly any space is required on a rear side of the top panel, it is possible to reduce the restriction regarding disposition as compared to the LED downlight 500, which also allows for a remarkable reduce in construction fees.

FIG. 13 is a view for comparing specifications of the laser downlight 400A and that of the LED downlight 500. As shown in FIG. 13, with the laser downlight 400A of this example, the volume is reduced by 94% and the mass is reduced by 86%, as compared to the LED downlight 500.

Moreover, since the light source unit 420 can be disposed at a position (height) easy for the user to reach, the laser diode 3 can be easily replaced without having any difficulty in a case where the laser diode 3 breaks down. Furthermore, the optical fibers 5 extending from the plurality of light emitting units 410A are guided to a single light source unit 420; this allows collective management of the plurality of laser diodes 3. Accordingly, even if a plurality of laser diodes 3 were to be replaced, the replacement can be carried out easily.

In a case where the LED downlight 500 is of a type using the high color rendering fluorescent material, a luminous flux of approximately 500 lm is emitted with an electricity consumption of 10 W. In order to achieve light of a same brightness with the laser downlight 400A, an optical output of 3.3 W is required. With an LD efficiency of 35%, this optical output is equivalent to the electricity consumption of 10 W. Since the electricity consumption of the LED downlight 500 is also 10 W, there is not much remarkable difference between the LED downlight 500 and the laser downlight 400A in terms of electricity consumption. Consequently, the laser downlight 400A is capable of achieving the foregoing various merits while consuming the same amount of electricity as the LED downlight 500.

As described above, the laser downlight 400A includes: a light source unit 420 including at least one laser diode 3 that emits a laser beam; at least one light emitting unit 410A including a light emitting body 40 and a concave section 412 that serves as a reflecting mirror; and an optical fiber 5 guiding the laser beam to the light emitting unit 410A.

A plurality of emitting ends 5b of the optical fiber 5 are provided per light emitting body 40 included in the light emitting unit 410A. Each of a part of the laser beams having a strongest light intensity in its light intensity distribution, which laser beams are emitted from the plurality of disposed emitting ends 5b, is emitted on portions different from each other of the light emitting body 40 corresponding to the emitting ends 5b from which the laser beams are irradiated.

This allows for reducing the possibility in the laser downlight 400A that the light emitting part 40 remarkably deteriorates caused by the laser beams being emitted in a focused manner toward one point on the light emitting part 40. As a result, a long life laser downlight 400A is achieved.

Brief Configuration of Headlamp 110A

Figure 14:
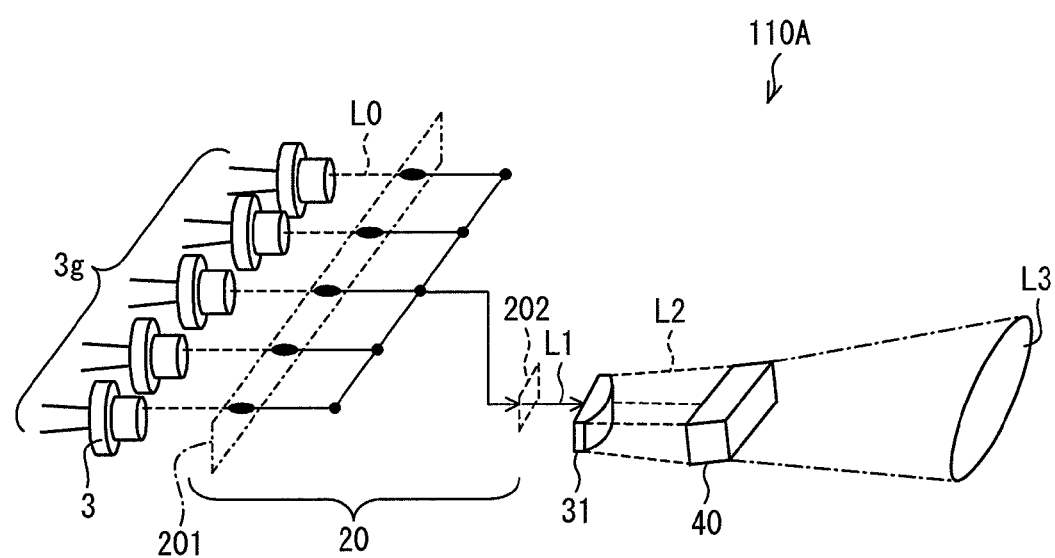
FIG. 14 is a schematic view illustrating a brief configuration of a headlamp that serves as yet another embodiment of the present invention.

Next described is a brief configuration of the headlamp (light emitting device, illuminating device, vehicle headlamp) 110A which is yet another embodiment of the present invention, with reference to FIG. 14. FIG. 14 is a schematic view illustrating a brief configuration of the headlamp 110A.

As illustrated in FIG. 14, the headlamp 110A emits illumination light (light) L3. The headlamp 110A includes a laser diode group (excitation light source) 3g, a first light guide section (optical system, first optical system) 20, a convex cylindrical lens (optical system, second optical system) 31 and a light emitting body 40.

The laser diode group 3g is one example of a light source in which a plurality of excitation light sources are collected together. In the present embodiment, the laser diode group 3g includes a total of five laser diodes 3. A laser beam (excitation light) L0 is emitted from each of the laser diodes 3.

Accordingly, in simple calculation, a luminous flux of a total of the five laser diodes 3 serves as a luminous flux of the entire light source. As a result, it is possible to increase the luminous flux of the entire light source by fivefold as compared to a case where a single laser diode 3 is used. Note that the laser diodes 3 are regarded as equal in performance.

In the present embodiment, the number of the laser diodes 3 that are included in the laser diode group 3g is five, however the number of the laser diodes 3 is not limited to this number; the number may be any one of 2 to 4, or 6 or more.

The excitation light source may be for example a group as like the laser diode group 3g in which a plurality of laser diodes 3 (single stripe per chip) each having a single light emitting end are spatially disposed separately, or may be configured as like the foregoing LD chip 101 (plural number of stripes per chip) in which a plurality of excitation light sources (light emitting points 102) are integrated into a single (one chip) laser diode to emit a plurality of laser beams L0 from the LD chip 101.

Moreover, the excitation light source may be an excitation light source which emits a coherent laser beam L0 as like the laser diode 3 of the present embodiment, or may be an excitation light source which emits incoherent excitation light as like the LED.

The plurality of excitation light sources may include just the LDs or LEDs, or may include a combination of the LDs and LEDs.

Subsequently, the first light guide section 20 guides the laser beams L0 entered from the light entering part (one end of first optical system) 201 to a light emitting part (the other end of first optical system) 202, and emitted light (excitation light) L1 originated from the guided laser beams L0 is emitted from the light emitting part 202.

By adjusting a distance from the light entering part 201 of the first light guide section 20 to the light emitting part 202 of the first light guiding section 20 as such, it is possible to spatially separate the laser diode group 3g from the light emitting body 40 so that a preferred space is provided between the laser diode group 3g and the light emitting body 40. This allows for preventing deterioration of the light emitting body 40 caused by heat generated at the laser diode group 3g.

The laser beams L0 emitted from the laser diodes 3 are coherent light, and thus are narrow-beamed. Accordingly, the headlamp 110A can converge and use the laser beams L0 as excitation light without waste.

This allows formation of an extremely small light emitting body 40, which as a result allows achievement of a headlamp 110A of a small size and with extremely high luminance.

Hence, various merits are attained by applying the headlamp 110A using such laser diodes 3 as the excitation light sources of a vehicle headlamp, such as allowing reduction in size of a headlamp used for vehicles and the like.

The first light guide section 20 illustrated in FIG. 14 does not specifically illustrate how the laser beams L0 are guided from the light entering part 201 to the light emitting part 202.

There are largely three specific examples of modes of the first light guide section 20.

A first mode is a case where the first light guide section 20 is made up of a known light converging element (optical system, first optical system) and the like, so that an area of a cross section of the light emitting part 202 is smaller than an area of a cross section of the light entering part 201.

Examples of this mode include: a truncated pyramid light converging section (optical system, first optical system) 21A described later, a Fresnel lens (optical system, first optical system), and a transmission grating (optical system, first optical system).

A second mode is a case where the area of the cross section of the light entering part 201 and the area of the cross section of the light emitting part 202 are substantially the same, and the first light guide section 20 includes a bundle of a plurality of light guiding members which guide the laser beams L0.

Examples of this mode include: an optical fiber bundle (optical system, first optical system, a plurality of optical fibers) 22 described later, a bundle of waveguides (optical system, first optical system), and like bundle.

A third mode is a case where the first light guide section 20 includes a combination of the plurality of the light guiding members (optical system) with the light converging element (optical system) and like elements.

An example of this mode is a combination of the optical fiber bundle 22 and the light converging element (optical system).

A more specific mode of the first light guide section 20 is described later.

Other than the specific mode described later, the first light guide section 20 may be made up of the aforementioned Fresnel lens and the like to converge (guide) the laser beams L0 from the light entering part 201 to the light emitting part 202, or the first light guide section 20 may be made up of a known transmission grating and the like to converge the laser beams L0 from the light entering part 201 to the light emitting part 202.

An unleveled pattern of the Fresnel lens and a grid pattern of the transmission grating are made a pattern as appropriate so that the laser beams L0 can be converged from the light entering part 201 to the light emitting part 202.

By use of the Fresnel lens or the transmission grating as the light entering part 201 in combination with the LD chip 101 described above that has a plurality of light emitting points 102 in one chip, it is possible to reduce the size of these optical systems, while also improving mass productivity thereof and further reducing their manufacturing costs.

Namely, the "first optical system" such as the first light guide section 20 may be for example made up of a single optical component which guides the lasers beam L0 entered from one end of the single optical component to the other end of the single optical component, or may be made up of a plurality of optical components such as, for example a combination of a first optical component and a second optical component, in which the laser beams L0 entering one end of the first optical component is guided to the other end of the first optical component and thereafter this guided laser beams L0 are emitted from the other end of the first optical component as emitted light L1, and the emitted light L1 that is emitted from the other end of the first optical component and which enters one end of the second optical component is guided to the other end of the second optical component. Moreover, the "first optical system" may be made up by bundling a plurality of optical components as like in an example of an optical fiber bundle 22, later described.

Moreover, the present embodiment describes a case where a convex cylindrical lens (optical system, second optical system, convex lens) 31, which is a single optical component, is used as an example of the "second optical system". However, any other configuration is possible as long as the "second optical system" is capable of emitting, in a dispersed manner, the emitted light L1 originated from the laser beams L0 guided by the first light guide section 20 to a light irradiated plane (light receiving plane) 40a of the light emitting body 40 as irradiation light L2. For instance, the second optical system can be configured so as to be made up of a plurality of optical components as like a case where the emitted light L1 guided by the first light guide section 20 irradiates the light irradiated plane 40a in a dispersed manner, by use of two lenses.

Moreover, as in the foregoing example, the "first optical system" and the "second optical system" may be made up of two or more independent optical components, or may be an integrated single optical component as like a truncated pyramid shaped optical member (optical system, first optical system, second optical system, light guiding member) 21B later described.

The convex cylindrical lens 31 is a planoconvex cylindrical lens whose axis runs in a vertical direction. The convex cylindrical lens 31 disperses the emitted light L1 emitted from the light emitting part 202 in a horizontal direction, and the laser beam irradiation plane 40a of the light emitting body 40 is irradiated with this light as irradiation light (excitation light) L2.

The present embodiment employs a planoconvex cylindrical lens whose axis runs in the vertical direction as an example of the "second optical system", however it is not limited to this. For example, a biconvex lens, a planoconvex lens, a convex meniscus lens or like lens, each of which has an axis thereof running in the vertical direction, may also be used as the "second optical system".

With the convex cylindrical lens 31, it is possible to irradiate the laser beam irradiation plane 40a with the irradiation light L2 in a dispersed manner even if a spreading amount of the emitted light L1 in the horizontal direction is wider than a width of the laser beam irradiation plane 40a in the horizontal direction, by irradiating the irradiation light L2 so that the irradiation light L2 suits the shape of the laser beam irradiation plane 40a of the light emitting body 40 which is shaped long in the horizontal direction.

The emitted light L1 is dispersed in the horizontal direction to not have the emitted light L1 be focused on one specific point on the laser beam irradiation plane 40a but to irradiate the entire light emitting body 40 shaped long in the horizontal direction with the irradiation light L2.

In other words, the emitted light L1 is dispersed in the horizontal direction to irradiate the entire laser beam irradiation plane 40a with the irradiation light L2 having an intensity which does not cause deterioration of the light emitting body 40, so that not one part of the light emitting body 40 is excited at a pinpoint. As long as the intensity is of a degree that does not cause deterioration of the light emitting body 40, the strength of the light intensity distribution that the irradiation light L2 is emitted may be of a certain intensity.

Moreover, the present embodiment is on the supposition that the size of the laser beam irradiation plane 40a is larger than the size of the light emitting part 202. Hence, the laser beam irradiation plane 40a is irradiated with the irradiation light L2 while the light irradiated area is broadening. On the other hand, in a case where the size of the laser beam irradiation plane 40a is smaller than the size of the light emitting part 202, the laser beam irradiation plane 40a may be irradiated with the irradiation light L2 while the light irradiated area is reduced by use of a lens or the like having a light converging effect.

However, in the case where the laser beam irradiation plane 40a is irradiated with the irradiation light L2 while reducing the light irradiated area by use of the lens or the like which has the light converging effect, it is necessary to be careful that the irradiation light L2 is not focused on a specific one point on the laser beam irradiation plane 40a. More specifically, a numerical aperture, focal length, disposed position and the like of the lens or the like having the light converging effect are adjusted to avoid the irradiation light L2 from focusing on one point on the laser beam irradiation plane 40a.

Moreover, the laser beam irradiation plane 40a may be irradiated with the irradiation light L2 by use of a collimator lens, which allows for substantially fixing the light irradiated area.

The light emitting body 40 emits illumination light L3 upon irradiation with the irradiation light L2. Namely, the light emitting body 40 includes at least fluorescent material which is caused to emit the illumination light L3 upon irradiation with the irradiation light L2.

As described above, in the headlamp 110A, the emitted light L1 originated from the laser beams L0 are emitted to the laser beam irradiation plane 40a of the light emitting body 40 in a dispersed manner in the horizontal direction, as the irradiation light L2. This allows for effectively exciting electrons in a low energy state to a high energy state, throughout the entire fluorescent material included in the light emitting body 40.

As a result, the illumination light L3 is emitted evenly from the light emitting body 40, thereby allowing for achievement of a high luminous flux and a high luminance with the headlamp 110A as compared to using a single laser diode 3.

Moreover, the laser beam irradiation plane 40a of the light emitting body 40 is not irradiated with the emitted light L1 originated from the laser beams L0 by being focused on one point, but is irradiated with the emitted light L1 in a dispersed manner via the first light guide section 20 and the convex cylindrical lens 31. Hence, it is possible to prevent the light emitting body 40 from deterioration caused by the laser beam irradiation plane 40a being irradiated with the laser beams L0 so that the laser beams L0 are focused on a single point.

According to the above, it is possible to provide a headlamp 110A which can achieve a high luminous flux and a high luminance, as well as achieving a long life.

The "fluorescent material" is a substance which emits illumination light L3 (fluorescence having a different wavelength from excitation light) upon transition of electrons of a high energy state to a low energy state. Note that the electrons are excited to the high energy state from the low energy state upon irradiation of the fluorescent material with the irradiation light L2.

It is preferable that the foregoing sialon fluorescent material (oxynitride fluorescent material), nitride fluorescent material, or III-V compound semiconductor nanoparticle fluorescent material is employed as the fluorescent material, however it is also possible to use other fluorescent material such as yttrium (Y)-aluminum (Al)-garnet activated by cerium (Ce)(YAG:Ce), as the fluorescent material.

The sialon can be classified by its crystal structure into an a-type and a β-type, as with silicon nitride. In particular, an a-sialon has a unit structure which (i) is made up of 28 atoms indicated by a general formula of: $Si_{12(m+n)}Al_{(m+n)}O_nN_{16-n}$ (m+n≤12, 0<m, n<11; each of m and n is an integer) and (ii) has two gaps where various metals can be put so that the a-sialon becomes an interstitial solid solution. It is possible to obtain a fluorescent material by employing a rare-earth element as the various metals. In a case where calcium (Ca) and europium (Eu) are employed as the various metals, it is possible to obtain a high-quality fluorescent material which emits light having a wavelength falling within a range between yellow and orange, which wavelength is longer than that of the YAG:Ce.

Moreover, the sialon fluorescent material can be excited by light whose wavelength falls within a blue-violet range or a blue range (i.e., 380 nm or more but 490 nm or less), and therefore the sialon fluorescent material is suitably used as fluorescent material for a white LED.

The following describes how the sialon fluorescent material is synthesized. A composition of the sialon fluorescent substance is indicated by a general formula $Ca_pSi_{12-(m+n)}Al_{(m+n)}O_nN_{16-n}:Eu_q$ (p and q are solubilities of Ca and Eu, respectively; m+n≤12; 0<m; n<11; each of m and n is an integer). Optimal amounts of the solubility p of Ca and the solubility q of Eu are obtained in advance by experiments, and m and n are determined based on factors such as conditions of maintaining neutrality of an electric charge.

Powders of silicon nitride ($Si_3N_4$), aluminum nitride (AlN), calcium carbonate ($CaCO_3$), and europium oxide ($Eu_2O_3$) are used as starting material. The powders are weighed and mixed, are subjected to pressure sintering with nitrogen gas at a sintering temperature of 1700° C., and are then reduced to powder so as to obtain the sialon fluorescent material.

The oxynitride fluorescent material and nitride fluorescent material are fluorescent material which have high deterioration resistance to the laser beams L0. In theory, it is therefore possible to effectively prevent deterioration of the light emitting body 40 in a case where the light emitting body 40 is made of only the oxynitride fluorescent material and nitride fluorescent material.

Moreover, another suitable example of the fluorescent material is semiconductor nanoparticle fluorescent material using nanometer-sized particles of the III-V compound semiconductors.

By including the semiconductor nanoparticle fluorescent material in the light emitting body 40, it is possible to further prevent the deterioration (discoloring and deformation) of the light emitting body 40 caused by heat, due to the aforementioned properties of the semiconductor nanoparticle fluorescent material. Hence, in a case where a light emitting element having a high optical output is used as the light source, it is possible to prevent the life of the headlamp 110A of the present embodiment, the headlamp 120A, headlamp 120B, headlamp 140A and the like later described, from becoming short.

As described above, it is thought to be the case that the deterioration of the light emitting body 40 is caused by the deterioration of a dispersion medium (e.g., a silicone resin) of the fluorescent material included in the light emitting body 40. Namely, while the sialon fluorescent material is being irradiated with laser beams, the sialon fluorescent material emits light with an efficiency of 60% to 90%; and the remainder causes heat generation. It is thought that this generated heat causes the deterioration of the dispersion medium.

It is known that white light (or pseudo-white light) can be made up by a mixture of three colors which meet an isochromatic principle or by a mixture of two colors which are complementary colors for each other, as described above. The (pseudo-) white light can be obtained by appropriately selecting a color of the laser beams L0 emitted from the laser diode 3 and a color of the illumination light L3 emitted by the fluorescent material, based on the isochromatic or complementary color principle.

For example, one method for causing the headlamp 110A to emit illumination light L3 of a white color is a method in which a laser beam whose oscillation wavelength falls within a blue-violet range (i.e., 380 nm or more to less than 420 nm) is employed as excitation light, and a combination of blue fluorescent material, green fluorescent material, and red fluorescent material is employed as the fluorescent material.

Another method is a method in which a laser beam whose oscillation wavelength falls within a blue range (i.e., 440 nm or more to 490 nm or less) is employed as the excitation light, and a combination of red fluorescent material with yellow fluorescent material or green fluorescent material is employed as the fluorescent material.

Furthermore, LED light whose oscillation wavelength falls within a blue range (i.e., 440 nm or more to 490 nm or less) may be employed as the excitation light, and a combination of red fluorescent material with yellow fluorescent material or green fluorescent material may be employed as the fluorescent material.

Selection Method of Second Optical System

Figure 16:
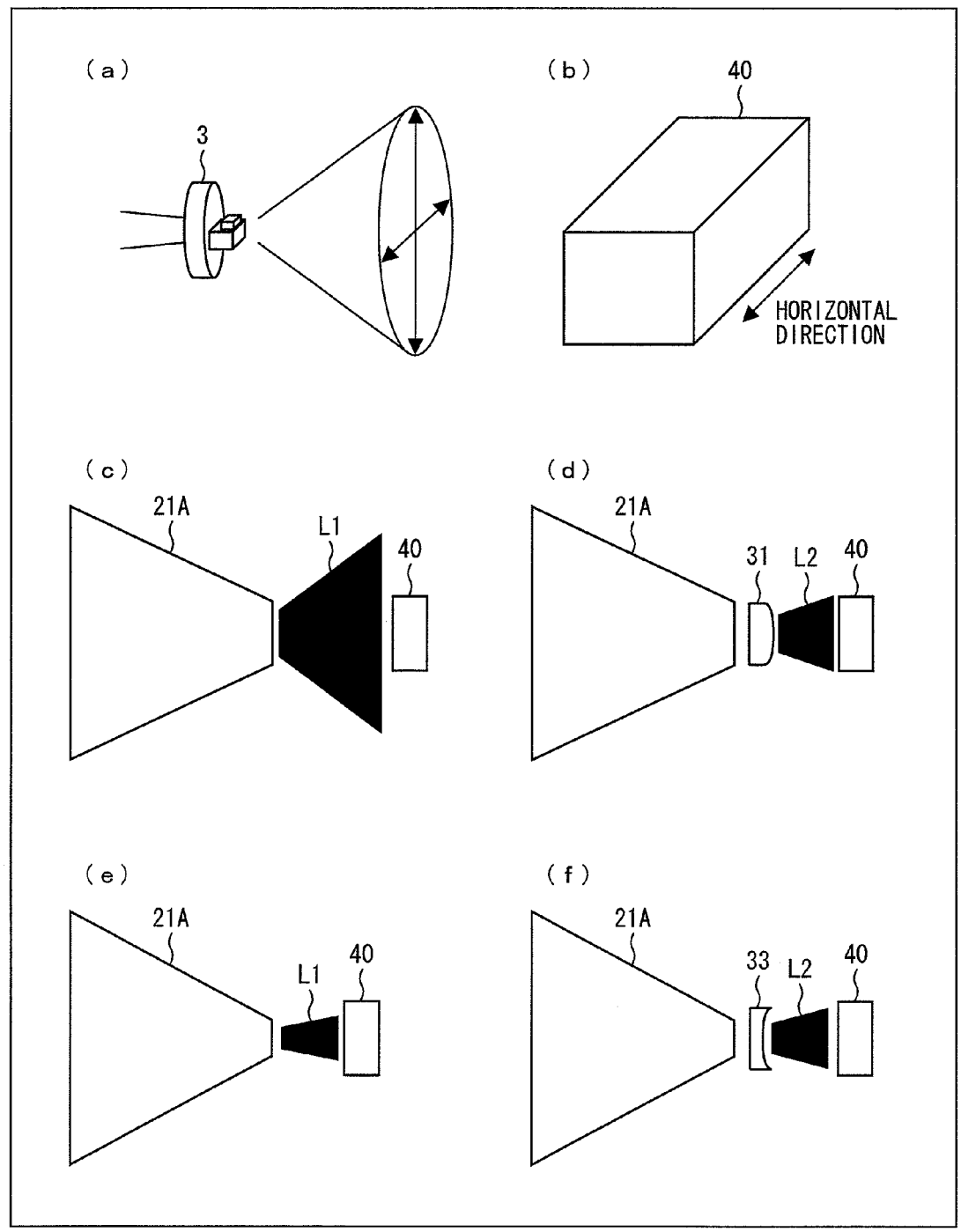
FIG. 16 illustrate views of a light emitting tendency of an LD, a light emitting section included in the headlamp, and examples of light emitted from a first optical system in a case where no second optical system is provided and in a case where a second optical system is provided; (a) illustrates the light emitting tendency of the LD, (b) illustrates a light emitting section included in the headlamp, (c) illustrates an example of light emitted in a case where no second optical system is provided, (d) illustrates an example of light emitted in a case where the second optical system is provided, (e) illustrates another example of light emitted in the case where no second optical system is provided, and (f) illustrates another example of light in the case where the second optical system is provided.
Figure 18:
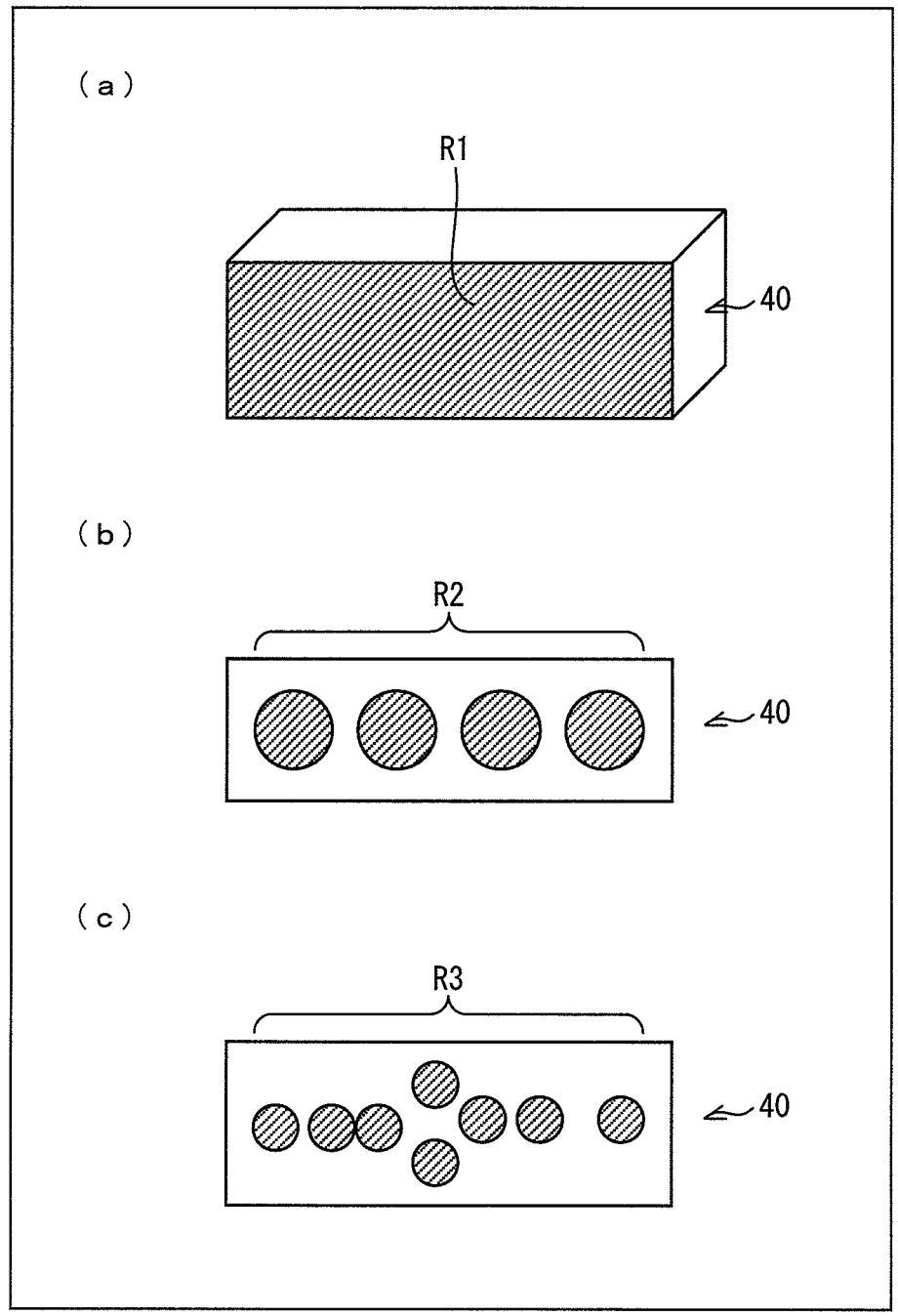
FIG. 18 illustrates schematic views of an example of the light emitting section and examples of a light irradiation region of the light emitting section; (a) illustrates an example of the light emitting section (of a substantially rectangular parallelepiped shape), (b) illustrates one example of a light irradiation region of the light emitting section, and (c) illustrates another example of the light irradiation region.

The following description deals with a relationship between an irradiated range of light emitted from the first optical system and a method of selecting the second optical system, with reference to (a) through (f) of FIG. 16, and (a) of FIG. 18.

As illustrated in (a) of FIG. 16, when the laser diode 3 (small rectangular parallelepiped disposed on a large rectangular parallelepiped provided at an end part of a package illustrated in (a) of FIG. 16) is disposed horizontally, the laser beams L0 emitted from the laser diode 3 exhibit a light emitting tendency of an elliptic truncated conic shape that is long in length (vertical direction) and short in width (horizontal direction).

Namely, the laser beam L0 emitted from the laser diode 3 has an extremely high aspect ratio (e.g., 5 degrees in the horizontal direction and 30 degrees in the vertical direction).

On the other hand, as illustrated in (b) of FIG. 16, the light emitting body 40 is of a rectangular parallelepiped shape that is short in the vertical direction and long in the horizontal direction.

In order to improve the luminous efficiency of the light emitting body 40, it is necessary to provide an optical component (second optical system) which converts the laser beams L0 spreading as an elliptic truncated conic shape being long in length to the irradiation light L2 which is short in the vertical direction and long in the horizontal direction.

The following description explains the light emitting tendency in a case where a truncated pyramid light converging section (optical system, first optical system, light guiding member) 21A later described is employed as the first optical system.

Illustrated in (c) of FIG. 16 is a pattern of the light emitting tendency of light emitted from the truncated pyramid light converging section 21A when no second optical system is provided, of a case where the light emitting plane 212A has a relatively large width in a horizontal direction, and the spreading of the emitted light L1 in the horizontal direction is larger than the width of a light irradiation region R1 (laser beam irradiation plane 40a) of the light emitting body 40 illustrated in FIG. 18 in the horizontal direction. A good example of such a case is a case where the width of the light emitting plane 212A in the horizontal direction is wider than that of the light irradiation region R1 in the horizontal direction.

Moreover, even if the width of the light emitting plane 212A in the horizontal direction is smaller than that of the light irradiation region R1 in the horizontal direction, there may be cases where the spreading of the emitted light L1 in the horizontal direction is wider than the width of the light irradiation region R1 of the light emitting body 40 in the horizontal direction, depending on the shape of the truncated pyramid light converging section 21A.

For example, in a case where the light emitting plane 212A is made up of a flat surface, the emitted light L1 which is emitted from the light emitting plane 212A usually is impossible to be parallel light, and is emitted in a spreading manner even slightly. Moreover, even in the case where an optical fiber bundle 22 later described is used as the first optical system, the emitted light L1 still is emitted in a spreading manner even slightly since optical fibers 223 are of total reflection.

Not just due to the difference between the width of the light emitting plane 212A in the horizontal direction and the width of the light irradiation region R1 of the light emitting body 40 in the horizontal direction, but also if a distance between the light emitting plane 212A and the light emitting body 40 extends out (if the light emitting body 40 is disposed away from the light emitting plane 212A), the spreading out of the emitted light L1 in the horizontal direction may become wider than the width of the light irradiation region R1 in the horizontal direction.

Illustrated in (e) of FIG. 16 is another pattern of the light emitting tendency of the light emitted from the truncated pyramid light converging section 21A in the case where no second optical system is provided, of a state in which the width of the light emitting plane 212A in the horizontal direction is relatively small and the spreading of the emitted light L1 in the horizontal direction is smaller than the width of the light irradiation region R1 (see FIG. 18(a)) of the light emitting body 40.

A good example of such a case is a case where the width of the light emitting plane 212A in the horizontal direction is remarkably smaller than the width of the light irradiation region R1 of the light emitting body 40 in the horizontal direction.

Even in a case where the width of the light emitting plane 212A in the horizontal direction is not remarkably smaller than the width of the light irradiation region R1 of the light emitting body 40 in the horizontal direction, the spreading of the emitted light L1 in the horizontal direction may become smaller than the width of the light irradiation region R1 of the light emitting body 40 in the horizontal direction in cases such as, for example, where the emitted light L1 emitted from the light emitting plane 212A is made substantially parallel by devising an optical design of the truncated pyramid light converging section 21A in a case where the width of the light irradiation region R1 of the light emitting body 40 in the horizontal direction is of around a same width as that of the light emitting plane 212A in the horizontal direction.

The convex cylindrical lens 31 illustrated in (d) of FIG. 16 is a planoconvex cylindrical lens whose axis runs in the vertical direction (direction perpendicular to surface of paper on which the drawing is illustrated) and which has its convex part face the light irradiation region R1. The convex cylindrical lens 31 is an optical component which functions to reduce the spreading of the emitted light L1 in the horizontal direction with respect to the light emitting body 40.

Accordingly, in the case where the spreading of the emitted light L1 in the horizontal direction is wider than the width of the light irradiation region R1 of the light emitting body 40 in the horizontal direction as illustrated in (c) of FIG. 16, the convex cylindrical lens 31 is disposed as appropriate between the truncated pyramid light converging section 21A and the light emitting body 40.

On the other hand, a concave cylindrical lens (optical system, second optical system, concave lens) 33 illustrated in (f) of FIG. 16 is a planoconcave cylindrical lens whose axis runs in the vertical direction and which has its concave section face the light irradiation region R1. The concave cylindrical lens 33 is an optical component that functions to broaden the spreading of the emitted light L1 in the horizontal direction with respect to the light emitting body 40.

Accordingly, in the case where the spreading of the emitted light L1 in the horizontal direction is smaller than the width of the light irradiation region R1 of the light emitting body 40 in the horizontal direction as illustrated in (e) of FIG. 16, the concave cylindrical lens 33 is provided as appropriate between the truncated pyramid light converging section 21A and the light emitting body 40.

Examples of the concave cylindrical lens 33 encompass a biconcave lens, a planoconcave lens, a concave meniscus lens, and like lens, each of which has its axis running in the vertical direction.

Other than the foregoing examples, a combination of independent lenses having a concave plane and a convex plane of any axis, a combination of independent lenses having a convex plane and convex plane of any axis, or a combination of independent lenses having a concave plane and a concave plane of any axis, may also be employed in accordance with the shape of the laser beam irradiation plane 40a of the light emitting section.

Hence, by employing an appropriate combination of lenses according to the shape of the laser beam irradiation plane 40a of the light emitting section, it is possible to enhance the luminous efficiency of the light emitting section.

Moreover, a compound lens which integrates lenses having a concave plane and a convex plane of any axis, a lens which integrates a compound lens having a convex plane and a convex plane of any axis, or a compound lens which integrates lenses having a concave plane and a concave plane of any axis may be employed in accordance with the shape of the irradiation region of the laser beam irradiation plane 40a.

With the entire optical system being small in the number of components, being small in size, and employing an appropriate compound lens in accordance with the shape of the light irradiation region of the light emitting section, it is possible to enhance luminous efficiency of the light emitting section.

Another example of other lenses is GRIN lens (Gradient Index lens).

The GRIN lens is a lens not having a convex or concave shape but functioning as a lens caused by graded refractive index.

Hence, use of the GRIN lens allows for achieving a lens effect while, for example, an edge plane of the GRIN lens is a flat plane. As a result, it is possible to bond the light emitting body 40 to the edge plane of the GRIN lens without having a gap between the light emitting body 40 and the GRIN lens.

This allows for reducing the laser beams L0 that miss the light irradiation region and which are not emitted on the light irradiation region. Consequently, it is possible to further improve the luminous efficiency of the light emitting body 40.

Configuration of Headlamps 120A and 120B

Figure 15:
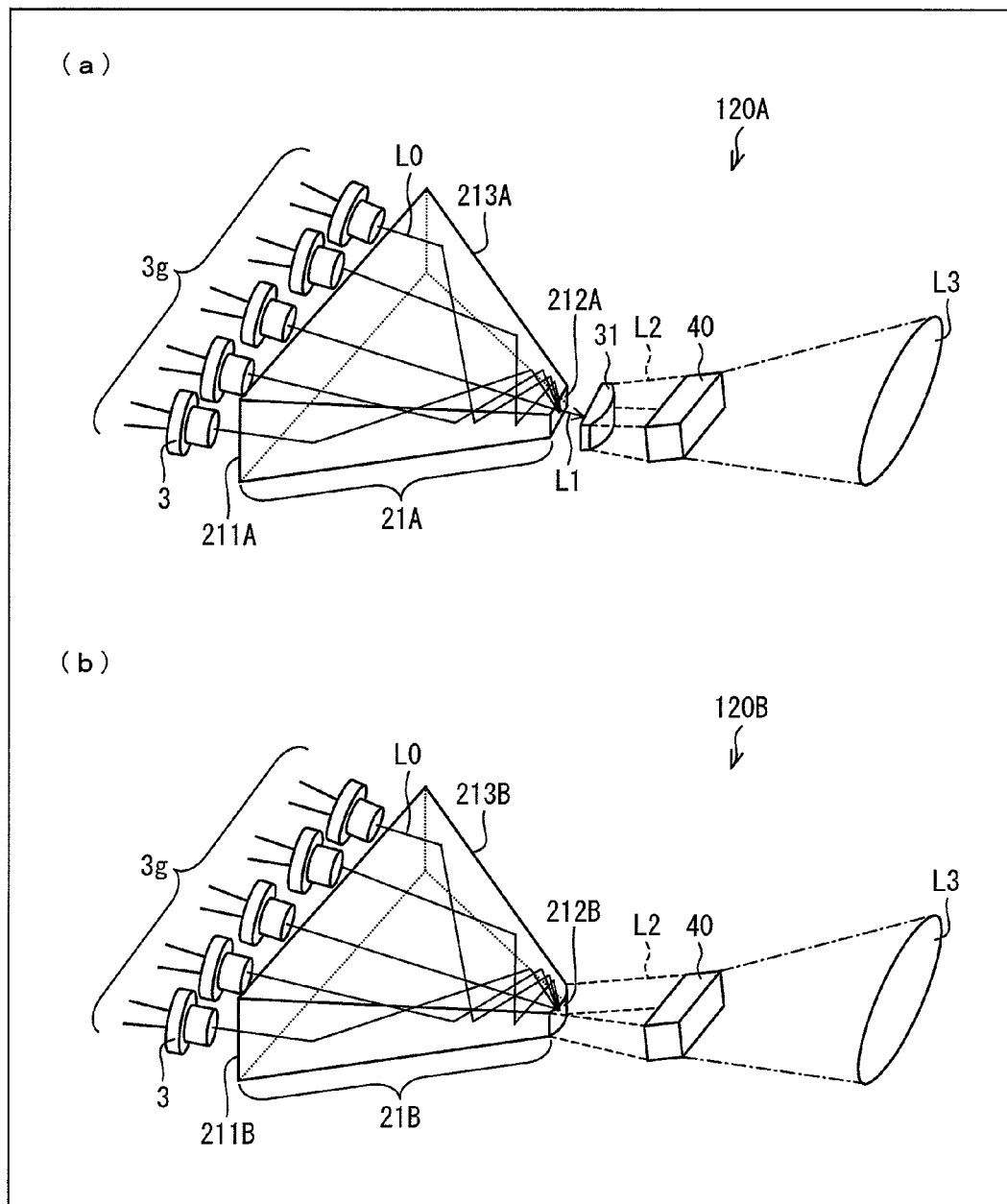
FIG. 15 illustrates schematic views of headlamps which serve as yet another embodiment of the present invention; (a) is an example of a headlamp in which a first optical system is separated from a second optical system, and (b) is an example of a headlamp in which a first optical system and a second optical system are integrated as one.

The following describes configurations of a headlamp 120A and a headlamp 120B serving as another embodiments of the present invention, with reference to (a) and (b) of FIG. 15. Note that the headlamp 120A and the headlamp 120B are examples which more specifically illustrates the first light guide section 20 of the headlamp 110A.

Illustrated in (a) of FIG. 15 is a configuration of the headlamp 120A employing a truncated pyramid light converging section 21A, which serves as an example where the first light guide section 20 of the headlamp 110A serves as the light converging element.

Although the present embodiment discusses the truncated pyramid light converging section 21A as an example, the light converging section is not limited to this in its shape, and light converging sections of various shapes can be employed: such as a circular truncated cone or an elliptic truncated cone.

The laser diode group 3g and the laser diode 3 are as described above.

The truncated pyramid light converging section 21A is configured so as to have a surrounded structure. A truncated pyramid lateral surface (light reflecting lateral surface, surrounded structure) 213A serves as a surround of the truncated pyramid light converging section 21A, which truncated pyramid lateral surface 213A reflects the laser beams L0 entering a light entering plane (one end of the first optical system) 211A. Further, an area of a cross section of the light emitting plane (the other end of the first optical system) 212A is smaller than an area of a cross section of the light entering plane 211A, and the laser beams L0 entering the light entering plane 211A are guided to the light emitting plane 212A by the truncated pyramid lateral surface 213A.

Hence, the truncated pyramid lateral surface 213A guides the laser beams L0 entering the light entering plane 211A to the light emitting plane 212A that has a smaller cross section than the cross section of the light entering plane 211; namely, the truncated pyramid lateral surface 213A allows for converging the laser beams L0 to the light emitting plane 212A.

The truncated pyramid light converging section 21A is made of BK (borosilicate crown) 7, silica glass, acrylic resin, or other transparent material.

According to the configuration, reduction of both the area of the light emitting plane 212A and the size of the light emitting body 40 (laser beam irradiation plane 40a) allows for reducing the size of the light emitting body 40 which emits light having a high luminance and a high luminous flux in accordance with the number of laser diodes 3 that make up the laser diode group 3g.

In the embodiment, the truncated pyramid lateral surface 213A is provided so as to encircle all optical paths of the laser beams L0 emitted from the laser diode group 3g.

Moreover, each of the laser beams L0 is guided toward the light emitting plane 212A along an optical path of any one of (i) an optical path in which the laser beam L0 is reflected just once off the truncated pyramid lateral surface 213A, (ii) an optical path in which the laser beam L0 is reflected several times off the truncated pyramid lateral surface 213A, and (iii) an optical path in which the truncated pyramid lateral surface 213A never reflects the laser beam L0.

The convex cylindrical lens 31 and the light emitting body 40 are as described above.

In the headlamp 120A, the emitted light L1 originated from the laser beams L0 is emitted to the laser beam irradiation plane 40a of the light emitting body 40 in a dispersed manner in the horizontal direction, as the irradiation light L2. This allows for effectively exciting electrons in a low energy state to a high energy state, throughout the entire fluorescent material included in the light emitting body 40.

As a result, illumination light L3 is evenly emitted from the light emitting body 40, thereby allowing for achieving a high luminous flux and a high luminance of the headlamp 120A as compared to a case where a single laser diode 3 is used.

Moreover, the laser beam irradiation plane 40a of the light emitting body 40 is not irradiated with the irradiation light L2 originated from the laser beams L0 by being focused on one point, but is irradiated with the irradiation light L2 in a dispersed manner via the truncated pyramid light converging section 21A and the convex cylindrical lens 31. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 120A which can achieve a high luminous flux and a high luminance as well as a long life.

The truncated pyramid light converging section 21A may be provided between a ferrule 70 [emitting end (other end of the first optical system, part in which the other end of the optical fiber is arranged) 222] and the convex cylindrical lens 31, in the headlamp 140A described later (see (a) of FIG. 17).

This allows increasing the number of excitation light sources while allowing for further reduction of size of the light emitting body 40 in the headlamp 140A.

Illustrated in (b) of FIG. 15 is a headlamp 120B which employs a truncated pyramid optical member 21B as one example of an optical member (light guiding member) in which the truncated pyramid light converging section 21 of the headlamp 120A and the convex cylindrical lens 31 are integrated as one (on the light emitting plane 212A) (however, the size of the convex cylindrical lens 31 is adjusted as appropriate).

The present embodiment is described by having the truncated pyramid optical member 21B serve as an example, however the shape of the optical member is not limited to this, and various shapes are employable, such as a truncated cone shape, an elliptic truncated cone shape, and like shape.

The laser diode group 3g and the laser diode 3 are as described above.

The truncated pyramid optical member 21B is configured so as to have a surrounded structure. The truncated pyramid lateral surface (light reflecting lateral surface, surrounded structure) 213B serves as a surround of the truncated pyramid optical member 21B, which truncated pyramid lateral surface 213B reflects the laser beams L0 entering a light entering plane (one end on the first optical system side) 211B of one end of the truncated pyramid optical member 21B. By use of this surrounded structure, the laser beams L0 that enters the light entering plane 211B are guided to the other end of the truncated pyramid optical member 21B.

On the other end of the truncated pyramid optical member 21B, a light dispersing plane (light dispersing section, other end on the second optical system side) 212B is provided, via which a predetermined laser beam irradiation plane 40a of the light emitting body 40 is irradiated with the guided laser beams L0 in a dispersed manner.

Furthermore, an area of the cross section of the light dispersing plane 212B is smaller than an area of the cross section of the light entering plane 211B; use of the truncated pyramid lateral surface 213B allows for converging the laser beams L0 entering the light entering plane 211B, to the light dispersing plane 212B.

The truncated pyramid optical member 21B is made of BK 7, silica glass, acrylic resin, or other transparent material.

The light dispersing plane 212B is configured so as to be integrated with a planoconvex cylindrical lens (cylindrical lens 31) whose axis runs in a vertical direction with respect to the light emitting plane 212A of the truncated pyramid light converging section 21A illustrated in FIG. 15(a).

According to the configuration, reduction of both the area of the light dispersing plane 212B and the size of the light emitting body 40 (laser beam irradiation plane 40a) allows for reducing the size of the light emitting body 40 which emits light having a high luminance and a high luminous flux in accordance with the number of laser diodes 3 included in the laser diode group 3g.

In the embodiment, the truncated pyramid optical member 21B is configured so as to encircle all optical paths of the laser beams L0 emitted from the laser diode group 3g.

Moreover, each of the laser beams L0 is guided toward the light dispersing plane 212B along an optical path of any one of (i) an optical path in which the laser beam L0 is reflected just once on the truncated pyramid lateral surface 213B, (ii) an optical path in which the laser beam L0 is reflected several times on the truncated pyramid lateral surface 213B, and (iii) an optical path in which the truncated pyramid lateral surface 213B never reflects the laser beam L0. The light emitting body 40 is as described above.

In the headlamp 120B, the irradiation light L2 originated from the laser beams L0 are emitted to the laser beam irradiation plane 40a of the light emitting body 40 in a dispersed manner in the horizontal direction, via the light dispersing plane 212B. Hence, it is possible to effectively excite the electrons from a low energy state to a high energy state throughout the fluorescent material included in the light emitting body 40.

As a result, illumination light L3 is evenly emitted from the light emitting body 40, thereby allowing for achieving a high luminous flux and a high luminance of the headlamp 120B as compared to a case where a single laser diode 3 is used.

Moreover, the laser beam irradiation plane 40a of the light emitting body 40 is not irradiated with the irradiation light L2 originated from the laser beams L0 by being focused on one point, but the laser beam irradiation plane 40a is irradiated with the irradiation light L2 in a dispersed manner via the truncated pyramid light converging section 21B. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 120B which can achieve a high luminous flux and a high luminance as well as achieving a long life.

Configuration of Headlamp 140A

Figure 17:
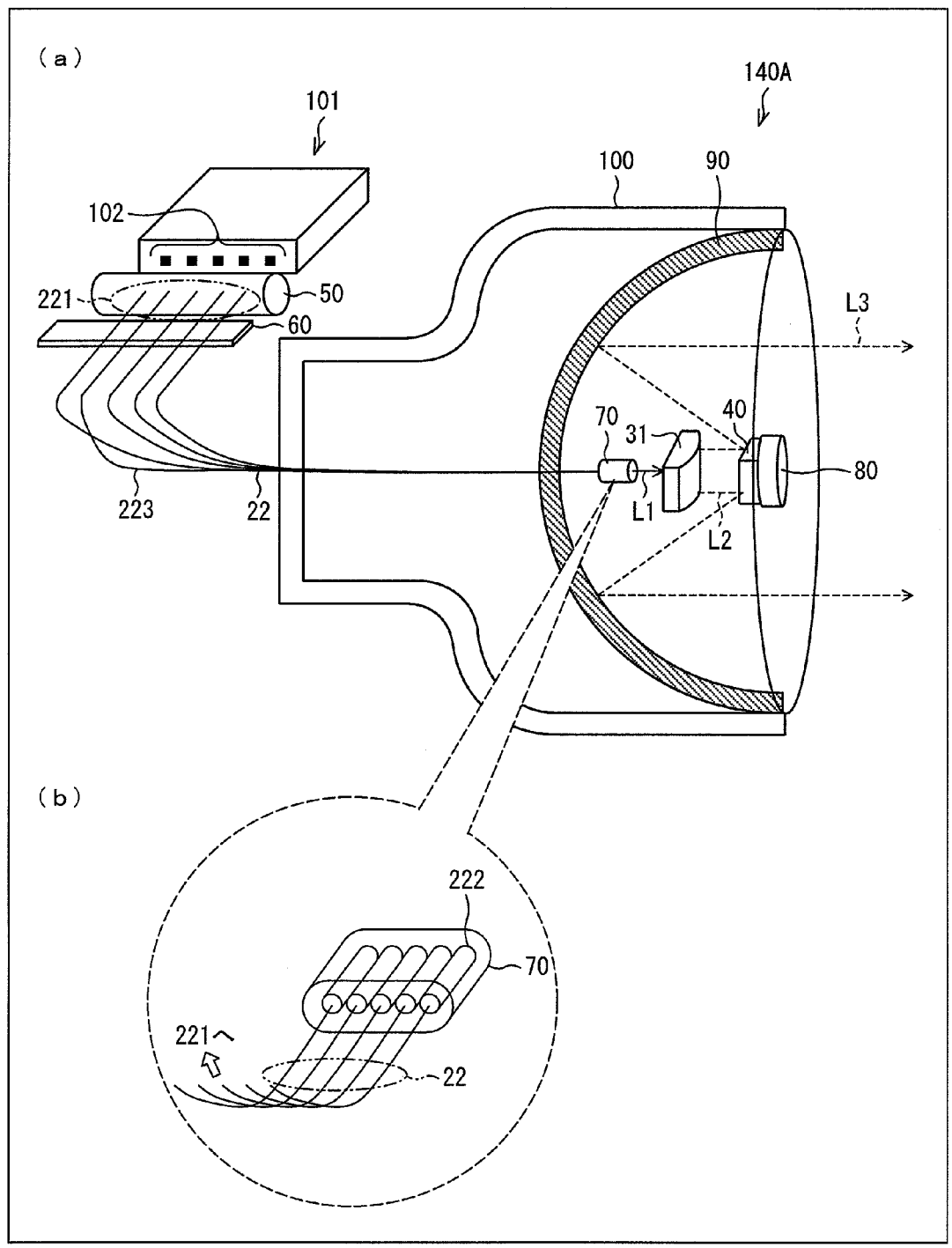
FIG. 17 is a schematic view illustrating a headlamp that serves as yet another embodiment of the present invention; (a) illustrates a configuration of the headlamp, and (b) illustrates an example of a ferrule that fixes a plurality of optical fibers.

Next described is a brief configuration of the headlamp (light emitting device, illuminating device, vehicle headlamp) 140A which serves as yet another embodiment of the present invention, with reference to (a) and (b) of FIG. 17.

FIG. 17 is a schematic view illustrating a configuration of the headlamp 140A which employs an optical fiber bundle (optical system, first optical system, a plurality of optical fibers, light guiding member) 22 as an example of the first light guide section 20 of the headlamp 110A which includes a plurality of light guiding members. Illustrated in (a) of FIG. 17 is a brief configuration of the headlamp 140A, and (b) of FIG. 17 illustrates an example of a ferrule 70 that fixes the plurality of the optical fibers.

As illustrated in (a) of FIG. 17, the headlamp 140A includes: the LD chip 101, a rod-shaped lens 50, an optical fiber fixing jig 60, an optical fiber bundle 22, a ferrule 70, a convex cylindrical lens 31, a light emitting body 40, a reflective plate 80, a reflecting mirror 90 and a housing 100.

As such, by providing the excitation light source with use of the LD chip 101, coherent laser beams L0 are emitted from the each of the light emitting points 102. Since the coherent laser beams L0 have strong directivity as compared to the incoherent excitation light, it is possible to have the coherent laser beams L0 enter an entering end (one end of the first optical system) 221 while holding down the loss of luminous flux to its minimum amount.

Moreover, according to the LD chip 101 having five stripes per chip, the single LD chip 101 has five light emitting points 102, so therefore it is possible to reduce the size of the LD chip 101.

Bulk production of the single LD chips 101 which have five light emitting points 102 allows for reducing manufacturing costs, as compared to manufacturing five laser diodes 3 of one stripe per chip, each of which having a single laser beam emitting end.

The present embodiment uses the laser diode of five stripes per chip which has five light emitting points 102 as the excitation light source, however the number of the light emitting points 102 is not limited to this; the number of light emitting points 102 provided may be 2 to 4, or 6 or more if necessary.

In a case where the excitation light source group is made up of a plurality of the laser diodes 3, an aspherical lens may be provided per laser diode 3 to collimate the laser beam L0. This laser beam L0 is thereafter caused to be entered from one end of a corresponding optical fiber 223. As long as the lens has the foregoing function, the shape and material of the aspherical lens 4 is not particularly limited. However, it is preferable that the material has high transmittance in the vicinity of 405 nm and that the material has good heat resistance.

The laser beams L0 emitted from the five light emitting points 102 of the LD chip 101 are collimated by the rod-shaped lens 50 and enter the entering end 221 (one end of the optical fiber 223).

The optical fiber bundle 22 is provided on a front side of the rod-shaped lens 50 as illustrated in the drawing, which optical fiber bundle 22 includes five optical fibers 223 being arranged at a pitch of 0.4 mm.

The optical fibers 223 are optical fibers made of quartz, each having a core diameter of 200 μm, a clad diameter of 240 μm, and a numerical aperture NA of 0.22.

The optical fiber fixing jig 60 has grooves hollowed thereon, at a pitch of 0.4 mm. The grooves fix the entering end 221 of the optical fiber bundle 22, to maintain a pitch interval between the optical fibers 223.

The present embodiment uses optical fibers 223 having a circular shaped cross section as the first optical system, however the cross section of the optical fibers 223 is not limited to the circular shape; other than the circular cross section, it is preferable that the cross section be any one of an equilateral triangular shape, a parallelogram (including square and rectangle), and a regular hexagon.

According to the configuration, in theory, the cross section of the emitting end 222 can be packed with cross sections of the other ends of the optical fibers 223 having identical shapes. Namely, the number of cross sections of the other ends of the optical fibers 223 per area can be made the maximum number for each of the cross sectional shapes.

As described above, in the lamps disclosed in Patent Literatures 1 and 2, a condenser lens is provided per excitation light source to guide excitation light, and the excitation light is emitted to the fluorescent material by having a hole opened in the reflecting mirror for each of beams of excitation light and causing each of the beams of excitation light to pass through the respective one of the holes. This causes a secondary problem that as the number of excitation light sources increases, the lamp increases in size and the reflection efficiency of light by the reflecting mirror decreases.

In order to solve the secondary problem, the first optical system in the headlamp 140A employs a configuration of the optical fiber bundle 22, which optical fiber bundle 22 is a bundle of a plurality of the optical fibers 223.

One end of the optical fiber bundle 22 serves as the entering end 221, which is an assembly of the one ends of the optical fibers 223.

The other end of the optical fiber bundle 22 serves as an emitting end (the other end of the first optical system, a part in which the other ends of the optical fibers are arranged) 222, which is an assembly of the other ends of the optical fibers 223, in which optical fibers 223 are inserted into a respective one of five through-holes formed in the ferrule 70. The material of the ferrule 70 is not particularly limited, and may be, for example, stainless steel.

Each of the laser beams L0 emitted from the five light emitting points 102 of the LD chip 101 enters one end of a corresponding one of the optical fibers 223. Thereafter, the other ends of the optical fibers 223 (emitting ends 222) emit the emitted light L1 originated from the laser beams L0.

Hence, each of the laser beams L0 enter the corresponding one of the ends of the optical fibers 223 and are guided to the emitting ends 222, by use of a simple configuration in which the first light guide section 20 includes the optical fiber bundle 22.

Moreover, although dependent on the thickness and number of the optical fibers 223, even if a plurality of the optical fibers 223 were bundled together, a total thickness of the bundle generally would not become so thick.

Accordingly, it is possible to irradiate the light emitting body 40 having a small laser beam irradiation plane 40a, with the irradiation light L2 originated from the laser beams L0 that are emitted from the five light emitting points 102, while maintaining the size of the emitting ends 222 and the light emitting body 40 (laser beam irradiation plane 40a) small.

For example, in the headlamp 140A, a hole is opened in the center of the reflecting mirror 90, and the optical fiber bundle 22 is passed through the hole to irradiate the light emitting body 40 with the irradiation light L2 from the emitting end 222. Hence, even if the number of the excitation light sources (light emitting points 102) increases as with the lamps disclosed in Patent Literatures 1 and 2, the light reflection efficiency of the reflecting mirror 90 will not deteriorate.

Subsequently, the emitted light L1 emitted from the emitting end 222 transmits through the convex cylindrical lens 31, and is emitted in a dispersing manner on the laser beam irradiation plane 40a of the light emitting body 40 as the irradiation light L2. The light emitting body 40 is as described above.

The reflective plate 80 is a transparent resin plate bonded to a rear plane of a projector lens, and the light emitting body 40 is bonded and fixed to the reflective plate 80. The reflective plate 80 is preferably made of material which (i) blocks the laser beams L0 emitted from the laser diodes 3 and (ii) transmits fluorescence (illumination light L3) generated by converting the laser beam L0 at the light emitting body 40.

Mostly all of the coherent laser beams L0 are converted into the illumination L3 by the light emitting body 40. However, there may be cases where a part of the laser beams L0 are not converted, due to some kind of cause. Even in such a case, it is possible to prevent the laser beams L0 from leaking outside by blocking the laser beams L0 with the reflective plate 80. Further, if such an effect is not expected, and the light emitting body 40 is fixed by a member other than the reflective plate 80, the reflective plate 80 can be omitted.

The reflective plate 80 may be of any size as long as it is capable of preventing the laser beams L0 from leaking outside. In the present embodiment, the size of the reflective plate 80 is made slightly larger than that of the light emitting body 40, however the reflective plate 80 may be sized around the same size as an opening of the laser beams L0 reflecting mirror 90.

The illumination light L3 emitted from the light emitting body 40 travels in a direction opposite of a traveling direction of the irradiation light L2, caused by the reflective plate 80.

The reflecting mirror 90 forms a pencil of rays that travels within a set solid angle, by reflecting the illumination light L3 emitted from the light emitting body 40. The reflecting mirror 90 has its plane facing the light emitting body 40 be shaped as a semisphere, and has its focus set at a position on which the light emitting body 40 is provided.

The illumination light L3 reflected off the reflective plate 80 is again reflected off the reflecting mirror 90, so as to travel to a front side of the headlamp 140A. As such, the reflecting mirror 90 causes the illumination light L3 emitted from the light emitting body 40 to travel to the front side, by forming the pencil of rays which travels within the set solid angle.

The housing 100 is a housing that stores the ferrule 70, the convex cylindrical lens 31, the light emitting body 40, and like members.

Moreover, in the headlamp 140A, the emitted light L1 originated from the laser beams L0 is emitted to the laser beam irradiation plane 40a of the light emitting body 40 in a dispersed manner in the horizontal direction, as the irradiation light L2. This allows for efficiently exciting the electrons in a low energy state to a high energy state, throughout the fluorescent material included in the light emitting body 40.

As a result, the illumination light L3 is evenly emitted from the light emitting body 40, thereby allowing for achieving a high luminous flux and a high luminance of the headlamp 140A as compared to a case where an excitation light source having a single light emitting point 102 is used.

Moreover, the laser beam irradiation plane 40a of the light emitting body 40 is not irradiated with the emitted light L1 originated from the laser beams L0 by being focused on one point, but is irradiated with the emitted light L1 in a dispersed manner via the optical fiber bundle 22 and the convex cylindrical lens 31. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 140A which can achieve a high luminous flux and a high luminance as well as achieving a long life.

(Shape of Light Emitting Section and Light Irradiation Region)

Figure 20:
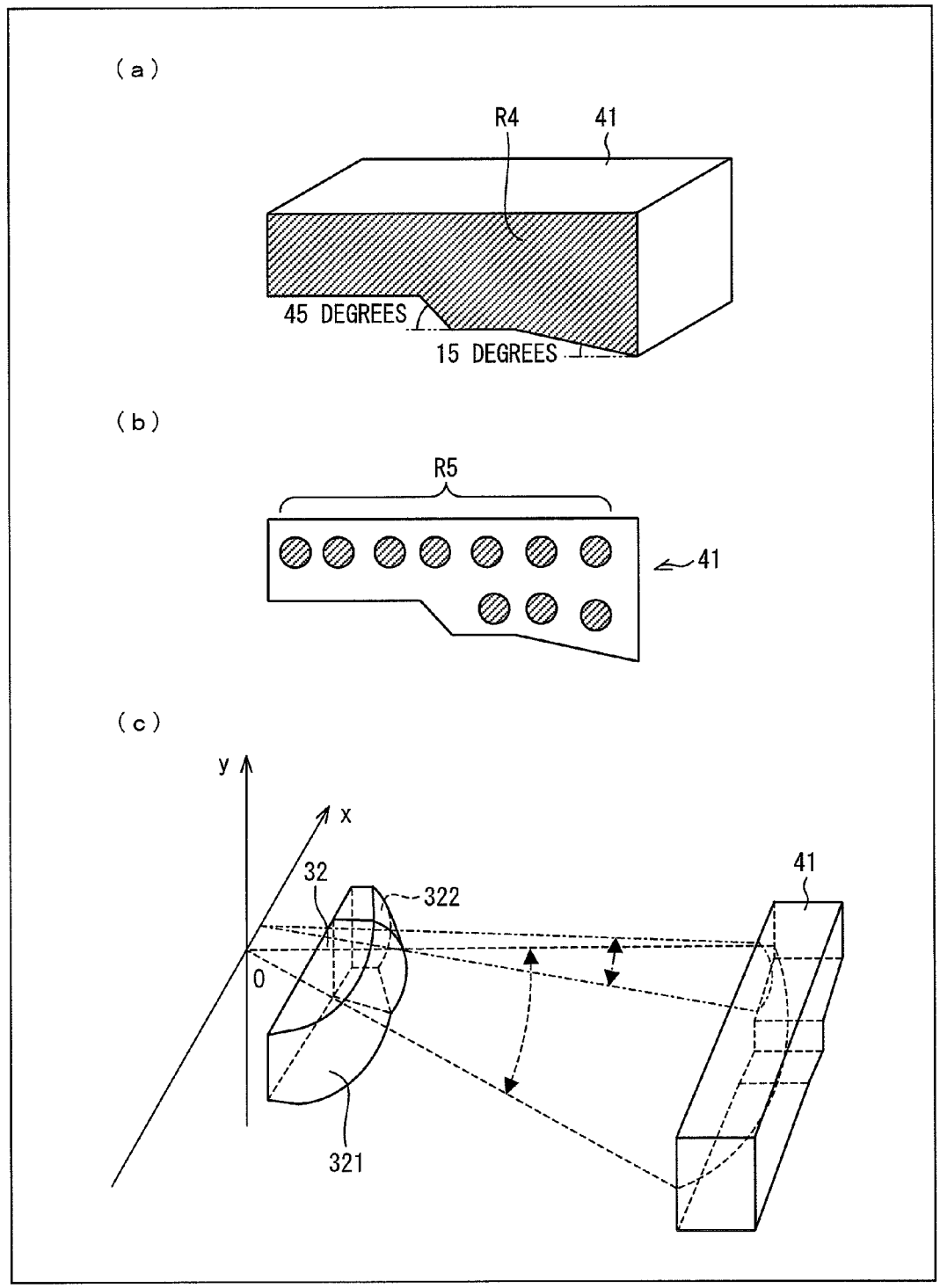
FIG. 20 is a view illustrating another example of the light emitting section (light emitting section for low beam); (a) illustrates a shape of the light emitting section for low beam, (b) illustrates an example of a light irradiation region of the light emitting section for low beam, and (c) illustrates an example of how the light irradiation region is irradiated with light.

Next described is another example of a light emitting section and a light irradiation region, with reference to (a) of FIG. 18 to (c) of FIG. 20.

Illustrated in (a) of FIG. 18 is the light emitting body 40, (b) of FIG. 18 illustrates one example of the light irradiation region of the light emitting body 40, and (c) of FIG. 18 illustrates another example of the light irradiation region.

As disclosed in Non Patent Literature 1, it is preferable that a light distribution pattern of a vehicle headlamp (high beam) be narrow in a vertical direction and be broad horizontally, and further that a shape of the light emitting section be long in a horizontal direction, as illustrated in (a) of FIG. 18. Accordingly, the light emitting body 40 is of a substantially rectangular parallelepiped shape. The size of the light emitting body 40, as described above, is approximately width×depth× height=3 mm×1 mm×1 mm.

The rectangular region illustrated as the shaded front side is a light irradiation region R1, and serves as an example of a region of the light irradiation region in the light emitting body 40 that has a largest area (=laser beam irradiation plane 40a).

Such a light irradiation region R1 is obtained by, for example, irradiating the light emitting body 40 with the irradiation light L2 that is collimated in a vertical direction and a perpendicular direction so as to suit the light irradiation region R1, by having the emitted light L1 be passed through a planoconvex cylindrical lens (optical system, second optical system) which has an axis running in the vertical direction and a planoconvex cylindrical lens (optical system, second optical system) which has an axis in a horizontal direction.

Other methods that can be carried out include increasing the number of optical fibers 223 so that the size of the emitting end 222 becomes around the same size as the light irradiation region, and arranging the other ends of the optical fibers 223 closely together so as to form a matrix.

Illustrated in (b) of FIG. 18 is an example of a light irradiation region of the light emitting body 40 of a case where the emitting end 222 is formed by arranging the other end of four optical fibers 223 (however their diameters are slightly larger) horizontally in one row.

In this example, a light irradiation region R2 of four circular regions is formed in reflection with the four optical fibers 223.

Illustrated in (c) of FIG. 18 is an example of a light irradiation region of the light emitting body 40 of a case where the emitting end 222 is formed by arranging the other ends of a total of eight optical fibers 223 (however their diameters are slightly smaller) horizontally in one row.

In the light irradiation region R3, the number of circular regions is increased in the circular region arranged horizontally in one row, by separating just a center part into two: an upper part and a lower part.

This allows for enhancing a brightness of the emitted light L1 directly in front (in the center) of the light emitting body 40.

Other than the foregoing example, the number of circular regions may be adjusted in accordance with a part where the emitted light L1 is desirably made brighter, of the light emitting body 40. As a result, the brightness of the emitted light L1 can be adjusted at a desired position.

Figure 19:
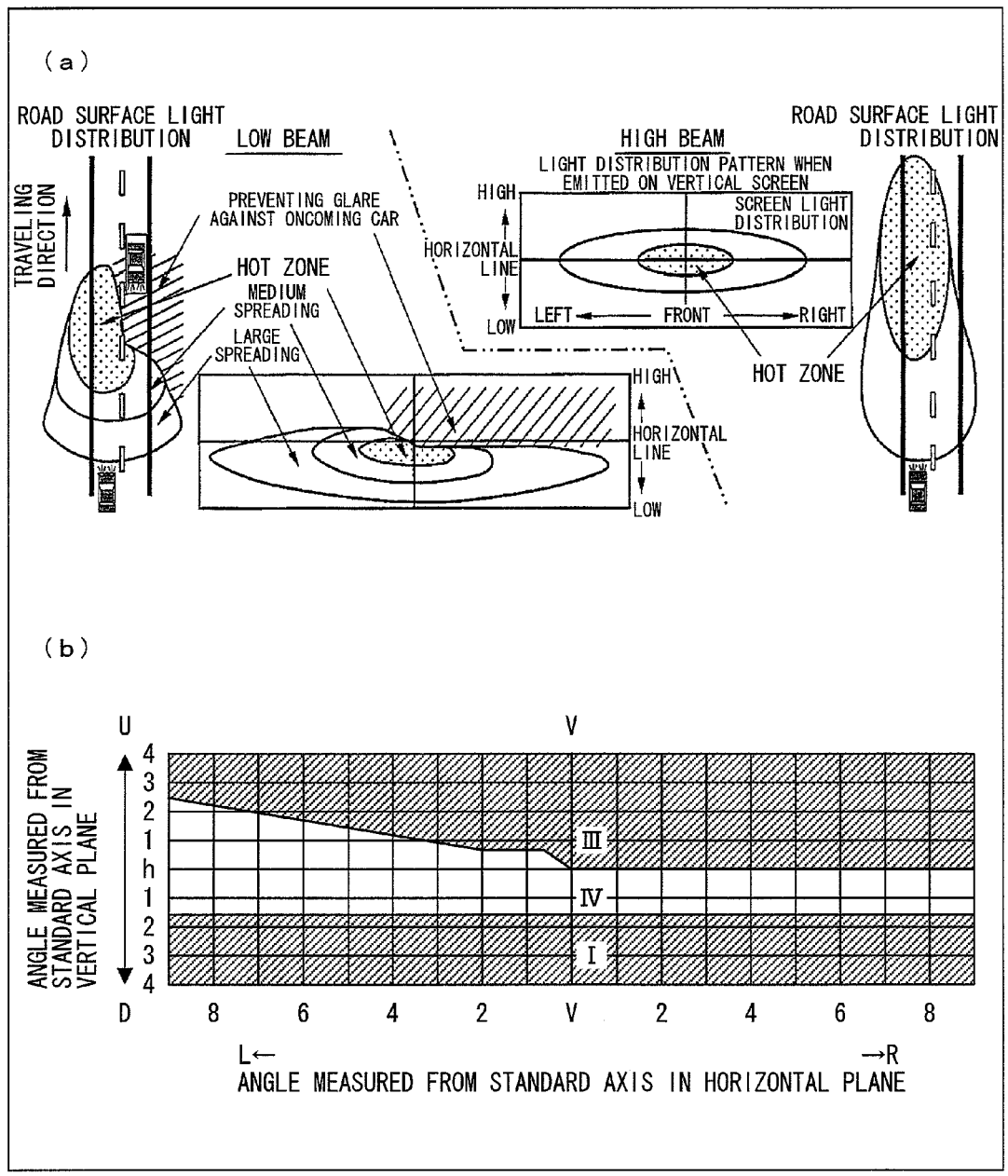
FIG. 19 is a view illustrating a light distribution pattern required of a vehicle headlamp (low beam/high beam) and light distribution characteristics required of a low beam of the vehicle headlamp; (a) illustrates the light distribution pattern; and (b) illustrates the light distribution characteristics.

Illustrated in (a) of FIG. 19 is a schematic view illustrating a light distribution pattern required of a vehicle headlamp (low beam/high beam), and (b) of FIG. 19 is a view illustrating light distribution characteristics required of a low beam of the vehicle headlamp.

As illustrated in (a) of FIG. 19, there are two types of light distribution patterns required of the headlamp: a light distribution pattern required of a low beam, and a light distribution pattern required of a high beam.

Screen light distribution illustrated in (a) of FIG. 19 is an illuminance distribution of light irradiated on a vertical screen provided face to the headlamp. The brightest part in the front direction is called a hot zone, and light intensity of this part determines a reached distance to a distant place.

Moreover, with the low beam, a remarkable difference in brightness is required between the upper half and the lower half based on a horizontal line, in order to hold down glare against an oncoming vehicle.

Illustrated in (b) of FIG. 19 is a view of the light distribution characteristics required of the low beam of the vehicle headlamp.

The following description deals with one example of the low beam light emitting body (light emitting section) 41, with reference to (b) of FIG. 19 and (a) of FIG. 20.

As illustrated in (b) of FIG. 19, cut lines which determine a brightness boundary of the light distribution pattern unique to the low beam are formed on a borderline of shaded region I and region IV, and also on a borderline of shaded region III and region IV. With the light distribution characteristics required of the low beam, a remarkable brightness difference is required between the upper and lower parts of the horizontal line.

The shape of the light irradiation region R4 (or laser beam irradiation plane 40a) of the low beam light emitting body 41 employs the shape of the cut line of this light distribution pattern illustrated in (b) of FIG. 19 as it is, however being rotated by 180 degrees.

The light distribution pattern illustrated in (b) of FIG. 19 is rotated by 180 degrees since, in the headlamp 140A as illustrated in (a) of FIG. 17, the light emitted from the light emitting body 40 is reflected off the reflective plate 80 and further is reflected off the reflecting mirror 90 to travel to the front side of the headlamp 140A.

As like the foregoing low beam light emitting body 41, the shape of the light emitting section may be formed in accordance with the shape of the cut line that determines a brightness borderline of the light distribution pattern emitted.

Accordingly, by forming the shape of the light emitting section in accordance with the shape of the cut line that determines the brightness borderline of the light distribution pattern for the emitted light, it is possible to cause emission of light having a light distribution pattern of various cut line shapes.

Illustrated in (b) of FIG. 20 is a schematic view of a light irradiation region R5 of the low beam light emitting body 41, and (c) of FIG. 20 is a schematic view illustrating an example of how the light irradiation region R4 of the light emitting body 41 for low beam is irradiated with the irradiation light L2.

As illustrated in (b) of FIG. 20, an arrangement pattern of the optical fibers 223 in the emitting end 222 of the headlamp 140A and an arrangement pattern of a through-hole of the ferrule 70 may be determined as with forming the light irradiation region R4 (see (a) and (b) of FIG. 17).

As a result, it is possible to form the light irradiation region R4 in accordance with the shape of the low beam light emitting body 41, even in a case where the optical fiber bundle 22 is used as the first light guide section 20.

As illustrated in (c) of FIG. 20, the shape of the compound cylindrical lens (optical system, second optical system) 32 may be set as with forming the light irradiation region R4.

For example, as with the shape of the light irradiation region R4, in a case where the compound cylindrical lens 32 is shaped long in the horizontal direction and which its diameter in the vertical direction linearly changes with respect to the horizontal direction, the compound cylindrical lens 32 may be configured by combining and integrating a vertical axis cylindrical lens (convex lens having a convex plane whose axis runs in the vertical direction) 321 whose axis runs in the vertical direction and a horizontal axis cylindrical lens (convex lens having a convex plane whose axis runs in the horizontal direction) 322 whose axis runs in the horizontal direction, as illustrated in (c) of FIG. 20.

By configuring the shape of the compound cylindrical lens 32 by combining the vertical axis cylindrical lens 321 whose axis runs in the vertical direction and the horizontal axis cylindrical lens 322, it is possible to irradiate the light irradiation region R4 with the irradiation light L2 in a dispersed manner so that the dispersed irradiation light L2 suits the size of the light irradiation region R4 in the horizontal direction and vertical direction.

Laser Downlight 400B

A laser downlight (light emitting device, illuminating device) 400B is described below as yet another embodiment the present invention, with reference to FIG. 8 and FIGS. 21 to 23.

The embodiment describes the laser downlight 400B as an example of the illuminating device of the present invention. The laser downlight 400B is an illuminating device disposed on a ceiling of a structure such as a building, a vehicle, or like structure. The laser downlight 400B uses, as illumination light, fluorescence emitted upon irradiation of the light emitting body 40 with the laser beams L0 that are emitted from the laser diode 3 via the optical fibers 223 and the like.

In a case where the LD chip 101 is used instead of the laser diode 3, and the optical fiber bundle 22 is used instead of the optical fibers 223, the rod-shaped lens 50, the optical fiber fixing jig 60, or the like as illustrated in (a) of FIG. 17 may be used instead of the aspherical lens 4.

Figure 21:
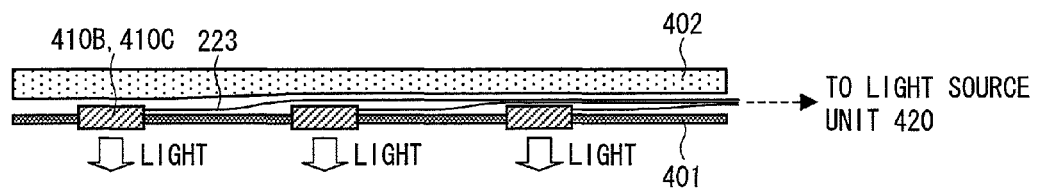
FIG. 21 is a cross sectional view of a ceiling on which another example of a laser downlight serving as an embodiment of the present invention is disposed.
Figure 22:
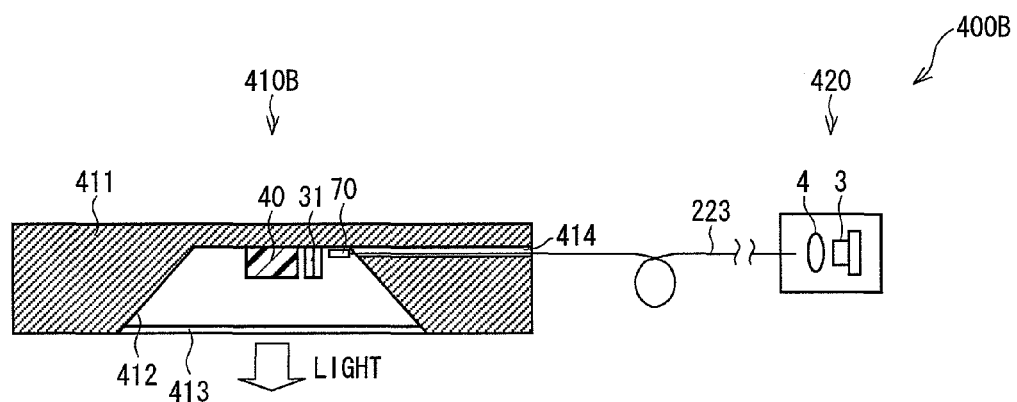
FIG. 22 is a cross sectional view of the laser downlight.
Figure 23:
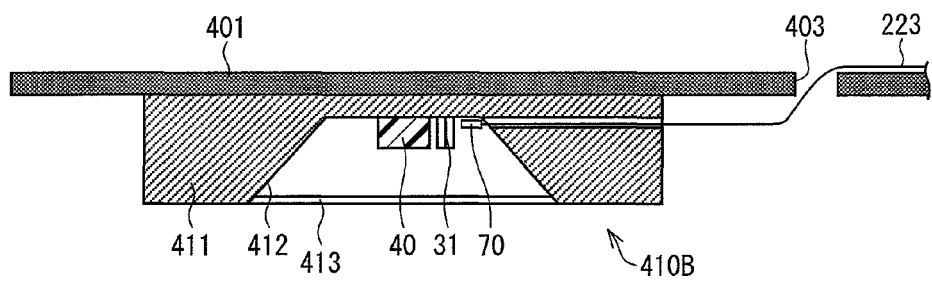
FIG. 23 is a cross sectional view illustrating a modification of how the laser downlight is disposed.

FIG. 8 is a schematic view illustrating external appearances of a light emitting unit 410B and a conventional LED downlight 500. FIG. 21 is a cross sectional view of a ceiling on which the laser downlight 400B is disposed. FIG. 22 is a cross sectional view of the laser downlight 400B.

The laser downlight 400B differs from the above-described laser downlight 400A in the following points (1) to (3). Other configurations of the laser downlight 400B are identical to the laser downlight 400A; descriptions of those configurations are therefore omitted.

(1) The optical fibers 223 are used instead of the optical fiber 5.

(2) The ferrule 70 is provided on ends of the optical fibers 223, which ends are disposed closer to the light emitting body 40.

(3) The convex cylindrical lens 31 is disposed between the light emitting body 40 and the ferrule 70.

As described above, the laser downlight 400B includes: a light source unit 420 including at least one laser diode 3 that emits a laser beam L0; at least one light emitting unit 410B including (i) an light emitting body 40 and (ii) a concave section 412 which serves as a reflecting mirror; optical fibers 223 guiding the laser beam L0 to a respective light emitting unit 410B; and a convex cylindrical lens 31 causing irradiation of the laser beam irradiation plane 40a of the light emitting body 40 with emitted light L1 emitted from the emitting end of the optical fiber 223 in a dispersing manner, as irradiation light L2.

With this configuration, it is possible to reduce the possibility that the light emitting body 40 is remarkably deteriorated in the laser downlight 400B, caused by the irradiation of the light emitting body 40 with the laser beam L0 being focused on one part of the light emitting body 40. This as a result achieves a long life of the laser downlight 400B. Other configurations of the light emitting unit 410B and the light source unit 420 of the laser downlight 400B, a modification of a how to dispose the laser downlight 400B, a comparison between the laser downlight 400B and the conventional LED downlight 500, a specification of the laser downlight 400B and the like are substantially the same as the laser downlight 400A. Hence, descriptions of those are omitted in the embodiment.

Brief Configuration of Headlamp 110B

Figure 24:
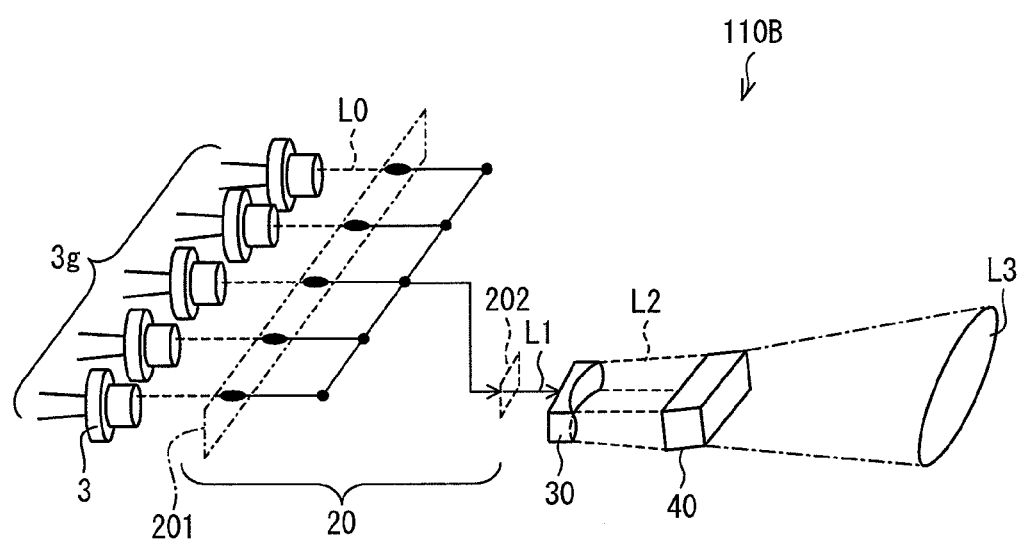
FIG. 24 is a schematic view illustrating a brief configuration of a headlamp that serves as yet another embodiment of the present invention.

Next described is a brief configuration of a headlamp (light emitting device, illuminating device, vehicle headlamp) 110B which is yet another embodiment of the present invention, with reference to FIG. 24.

FIG. 24 is a schematic view illustrating a brief configuration of the headlamp 110B which serves as one embodiment of the present invention.

The headlamp 110B differs from the headlamp 110A in a point that the convex cylindrical lens 31 in the headlamp 110A is replaced by a saddle-shaped concave lens (optical system, second optical system, concave lens, convex lens) 30. Other configurations of the headlamp 110B are identical to the headlamp 110A.

The present embodiment describes as an example of the "second optical system" a case where the saddle-shaped concave lens 30 is used, which is a single optical component.

In a case where the laser diode 3 is disposed horizontally (see FIG. 6(b) and FIG. 16(a)), the laser beam L0 emitted from the LD usually shows a light emitting tendency of an elliptic truncated conic shape, which light emitting tendency is long in length (vertical direction) and short in width (horizontal direction).

Namely, the laser beams L0 emitted from the LD have an extremely high aspect ratio (e.g., 5 degrees in the horizontal direction and 30 degrees in the vertical direction).

Hence, the emitted light L1 emitted from the light emitting parts 202 are usually effected by the feature that the aspect ratio of the laser beams L0 emitted from the laser diodes 3 is high.

Although dependent on the disposition direction of the laser diodes 3 and the shape of the "light emitting section", this causes a case where the laser beams L0 emitted from the light emitting part 202 spreads smaller than the size of the laser beam irradiation plane 40a of the "light emitting section".

Moreover, in a case where the headlamp 110B is assumed to be used as a vehicle headlamp (high beam), the light distribution pattern of the headlamp 110B is preferably narrow in the vertical direction and broad sideways, and a shape of the light emitting part is preferably long in width in the horizontal direction, as also described in Non Patent Literature 1. Hence, the light emitting body 40 is shaped to be a substantially rectangular parallelepiped shape.

Therefore, the shape of the laser beam irradiation plane 40a of the light emitting body 40 is long in the horizontal direction and short in the vertical direction.

This as a result causes a case where the spreading of the emitted light L1 from the light emitting part 202 in the horizontal direction becomes smaller than the width of the laser beam irradiation plane 40a in the horizontal direction, while the spreading of the emitted light L1 in the vertical direction is wider than the width of the laser beam irradiation plane 40a in the vertical direction.

Such a case causes a secondary issue that the "light emitting section" decreases in luminous efficiency, since some parts of the laser beams L0 miss the laser beam irradiation plane 40a or some parts of the laser beam irradiation plane 40a are not irradiated with the laser beams L0.

In order to solve such a secondary issue, the headlamp 110B of the present embodiment is configured in such a manner that the saddle-shaped concave lens 30 has a saddle-shaped concave plane in which a concave plane whose axis runs in a vertical direction and a convex plane whose axis runs in a horizontal direction is integrated as one, and this saddle-shaped concave plane is made up of a curved plane having a saddle point.

Material such as synthetic quartz or BK7 is suitably used for the saddle-shaped concave lens 30. A lens made of synthetic quartz has a high transmittance in an ultraviolet range as compared to that made of BK7, and further excels in thermal properties since its coefficient of thermal expansion is low. In view that the vicinity of the laser diodes 3 may reach a high temperature caused by heat generation of elements, the lens made of synthetic quartz is more preferable in view of this point.

On the other hand, if the effect by the generation of heat can be ignored, transparent resin such as optical silicone or acryl may also be used. In a case where resin is used, it is possible to easily mold and produce the saddle-shaped concave lens with use of a die. The effect caused by generation of heat can be ignored in some cases since the first light guide section 20 is provided between the laser diode 3 and the saddle-shaped concave lens.

With the saddle-shaped concave lens 30, the concave plane of the concave section is formed of a curved plane which has an axis running in the vertical direction. Hence, the saddle-shaped concave lens 30 functions to enlarge the spreading of the emitted light L1 to the light emitting body 40 in the horizontal direction.

Hence, by configuring the "second optical system" with the saddle-shaped concave lens 30, the spreading of the emitted light L1 in the horizontal direction may be enlarged to a size around a size of the light irradiation region of the light emitting body 40 by use of the saddle-shaped concave lens 30, even in a case where the spreading of the emitted light L1 is smaller than the size of the laser beam irradiation plane 40a of the light emitting body 40.

Moreover, the saddle-shaped concave lens 30 has a saddle-shaped concave plane in which a concave plane whose axis runs in the vertical direction and a convex plane whose axis runs in the horizontal direction are integrated as one. This saddle-shaped concave plane is configured of a curved plane having a saddle point.

As a result, the laser beam irradiation plane 40a side of the saddle point has a focus point of the concave plane, and the light emitting part 202 side of the saddle point has a focus point of the convex plane.

Therefore, the spreading of the emitted light from the saddle-shaped concave plane of the saddle-shaped concave lens 30 is accelerated with the concave plane, while is held down with the convex plane.

Hence, even with the laser beam irradiation plane 40a of the light emitting body 40, which laser beam irradiation plane 40a is shaped long in the horizontal direction and short in the vertical direction, it is possible to irradiate, in a dispersed manner, the laser beam irradiation plane 40a with the irradiation light L2 originated from the laser beams L0, so that the irradiation light L2 suits the shape of the laser beam irradiation plane 40a and suits the size in the horizontal direction and vertical direction of the laser beam irradiation plane 40a, by use of the single saddle-shaped concave lens 30 having the saddle-shaped concave plane.

Since the second optical system can be configured with the saddle-shaped concave lens 30, it is possible to reduce the number of components in the optical system of the entire headlamp 110B and hold down the size of the entire headlamp 110B as compared to a configuration in which the second optical system is made up of separate lenses such as a combination of a concave lens [concave cylindrical lens (optical system, second optical system, concave lens) 33 described later] having a concave plane whose axis runs in the vertical direction and a convex lens [convex cylindrical lens (optical system, second optical system, convex lens) 31] having a convex plane whose axis runs in the horizontal direction, even in a case where the shape of the laser beam irradiation plane 40a of the light emitting body 40 is long in the horizontal direction and short in the vertical direction.

The "saddle point" is a point where a minimal point of the concave plane of the concave lens coincides with a maximal point of the convex plane of the convex lens. For example, a "hyperbolic paraboloid" is a typical example of a curved plane having the saddle point. The "saddle point" and the "hyperbolic paraboloid" are later described.

Although the present embodiment employs the saddle-shaped concave lens 30 as an example of the "second optical system", the second optical system is not limited to this saddle-shaped concave lens 30. Alternatively, a single concave lens whose axis runs in the vertical direction may be employed to suit the shape of the "light irradiation region", or a combination of two independent lens, a concave lens whose axis runs in the vertical direction and a convex lens whose axis runs in the horizontal direction, may be employed.

Namely, in addition to the above configuration, the headlamp 110B may include, other than the saddle-shaped concave lens 30, a concave cylindrical lens (optical system, second optical system, concave lens) 33 later described, whose axis runs in the vertical direction.

Accordingly, configuration of the "second optical system" with a concave cylindrical lens 33 having a concave plane whose axis runs in the vertical direction allows irradiation of the laser beam irradiation plane 40a with the emitted light L1 in a dispersed manner in the horizontal direction, which emitted light L1 serves as the irradiation light L2, in such a manner that the irradiation light L2 suits the width of the laser beam irradiation plane 40a in the horizontal direction, even if the spreading of the emitted light L1 in the horizontal direction is smaller than the width of the laser beam irradiation plane 40a.

Hence, it is possible to have the laser beam irradiation plane 40a be irradiated with the emitted light L1 in a dispersed manner so that the emitted light L1 suits the shape of the laser beam irradiation plane 40a of the light emitting body 40 long in the horizontal direction.

Examples of the concave cylindrical lens 33 having a concave plane whose axis runs in the vertical direction encompass: a biconcave lens (optical system, second optical system), a planoconcave lens (optical system, second optical system), a concave meniscus lens (optical system, second optical system), and like lens, each of which has an axis running in the vertical direction.

Moreover, the "second optical system" may be a combination of (i) the convex cylindrical lens 31 having a convex plane whose axis runs in the horizontal direction (later described) with (ii) the concave cylindrical lens 33.

The shape of the laser beam irradiation plane 40a of the light emitting body 40 is long in the horizontal direction and short in the vertical direction.

This as a result causes a case where the spreading of the emitted light L1 from the light emitting part 202 in the horizontal direction becomes smaller than the width of the laser beam irradiation plane 40a in the horizontal direction, while the spreading of the emitted light L1 in the vertical direction is wider than the width of the laser beam irradiation plane 40a in the vertical direction.

By configuring the "second optical system" as the combination of the convex cylindrical lens 31 and the concave cylindrical lens 33, it is possible to irradiate the laser beam irradiation plane 40a with the irradiation light L2 in a dispersing manner so that the irradiation light L2 suits the size of the laser beam irradiation plane 40a in the horizontal direction and vertical direction, even with the laser beam irradiation plane 40a being shaped long in the horizontal direction and short in the vertical direction.

It is preferable that an optical axis of the convex cylindrical lens 31 coincides with that of the concave cylindrical lens 33.

As described above, it is possible to have the light irradiation region be irradiated with the emitted light L1 in a dispersing manner as the irradiation light L2, so that the irradiation light L2 suits the laser beam irradiation plane 40a of the light emitting body 40 shaped long in the horizontal direction and short in the vertical direction.

The emitted light L1 is dispersed in the horizontal direction so as to suit the shape of the laser beam irradiation plane 40a of the light emitting body 40, so that the laser beam irradiation plane 40a is not irradiated with the emitted light L1 by being focused on one specific point but is irradiated with the emitted light L1 throughout the entire light emitting body 40 which is long in the horizontal direction and short in the vertical direction.

In other words, the emitted light L1 is dispersed to irradiate the entire laser beam irradiation plane 40a with the irradiation light L2 having an intensity which does not cause deterioration of the light emitting body 40, so that not one part of the light emitting body 40 is excited at a pinpoint. As long as the intensity is of a degree that does not cause deterioration of the light emitting body 40, the strength of the light intensity distribution that the irradiation light L2 is irradiated may be of a certain intensity. The light emitting body 40 is as described above.

As described above, in the headlamp 110B, the emitted light L1 originated from the laser beams L0 is emitted to the laser beam irradiation plane 40a of the light emitting body 40 in a dispersed manner in the horizontal direction, as the irradiation light L2. This allows for effectively exciting electrons in a low energy state to a high energy state, throughout the entire fluorescent material included in the light emitting body 40.

As a result, the illumination light L3 is emitted evenly from the light emitting body 40, thereby allowing for achievement of a high luminous flux and a high luminance with the headlamp 110B as compared to using a single LD chip (laser beam source) 11.

Moreover, the laser beam irradiation plane 40a of the light emitting body 40 is not irradiated with the emitted light L1 originated from the laser beams L0 by being focused on one point, but is irradiated with the emitted light L1 in a dispersed manner via the first light guide section 20 and the saddle-shaped concave lens 30. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 110B which can achieve a high luminous flux and a high luminance, as well as achieving a long life.

(Selection Method of Second Optical System)

Figure 29:
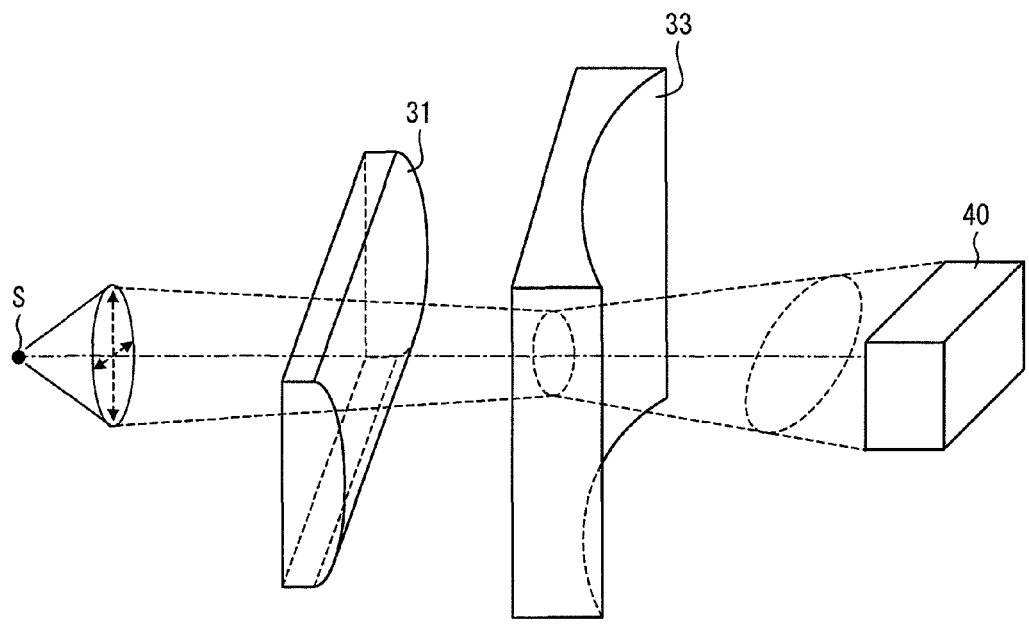
FIG. 29 is a schematic view related to the headlamp, illustrating a case where a second optical system includes a convex lens and a concave lens.

The following description explains a relationship between an irradiated range of light emitted from the first optical system and a method of selecting the second optical system, with reference to (a) through (f) of FIG. 16, and FIG. 29.

As illustrated in (a) of FIG. 16, when the laser diode 3 (small rectangular parallelepiped disposed on a large rectangular parallelepiped of an end part of the package) is disposed horizontally, the laser beams L0 emitted from the laser diode 3 exhibit a light emitting tendency of an elliptic truncated conic shape that is long in length (vertical direction) and short in width (horizontal direction).

Namely, the laser beam L0 emitted from the laser diode 3 has an extremely large aspect ratio (e.g., 5 degrees in the horizontal direction, 30 degrees in the vertical direction).

On the other hand, as illustrated in (b) of FIG. 16, the light emitting body 40 is of a rectangular parallelepiped shape that is short in the vertical direction and long in the horizontal direction.

In order to improve the luminous efficiency of the light emitting body 40, an optical component (second optical system) is required, which converts the laser beams L0 that spread as an elliptic truncated conic shape that is long in length, to the irradiation light L2 which is short in the vertical direction and long in the horizontal direction.

For instance, in the example illustrated in FIG. 29, in a case where the plane irradiated by the laser beam emitted from the laser beam source group S is of an elliptical shape long in the vertical direction and short in the horizontal direction, the second optical system employed may be of a combination of the convex cylindrical lens 31 having a convex plane whose axis runs in the horizontal direction and the concave cylindrical lens 33 having a concave plane whose axis runs in the vertical direction.

FIG. 29 is a schematic view illustrating a case where the second optical system is configured of a convex lens and a concave lens.

The convex cylindrical lens 31 having a convex plane whose axis runs in the horizontal direction causes the plane which is irradiated with the laser beam emitted from the laser beam source group S to shrink in the vertical direction, whereas the concave cylindrical lens 33 causes the plane irradiated by the laser beam emitted from the laser beam source group S to be enlarged in the horizontal direction.

In the example of FIG. 29, the lens disposed closer to the laser beam source group S is the convex cylindrical lens 31, and the lens disposed closer to the light emitting body 40 is the concave cylindrical lens 33. However, in opposite, the lens disposed closer to the laser beam source group S may be the concave cylindrical lens 33 and the lens disposed closer to the light emitting body 40 may be the convex cylindrical lens 31.

Moreover, in the example illustrated in FIG. 29, the optical axis of the convex cylindrical lens 31 coincides with that of the concave cylindrical lens 33.

The light emitting tendency exhibited in a case where a truncated pyramid light converging section (optical system, first optical system, light guiding member) 21A is employed as the first optical system, is as described above.

Figure 26:
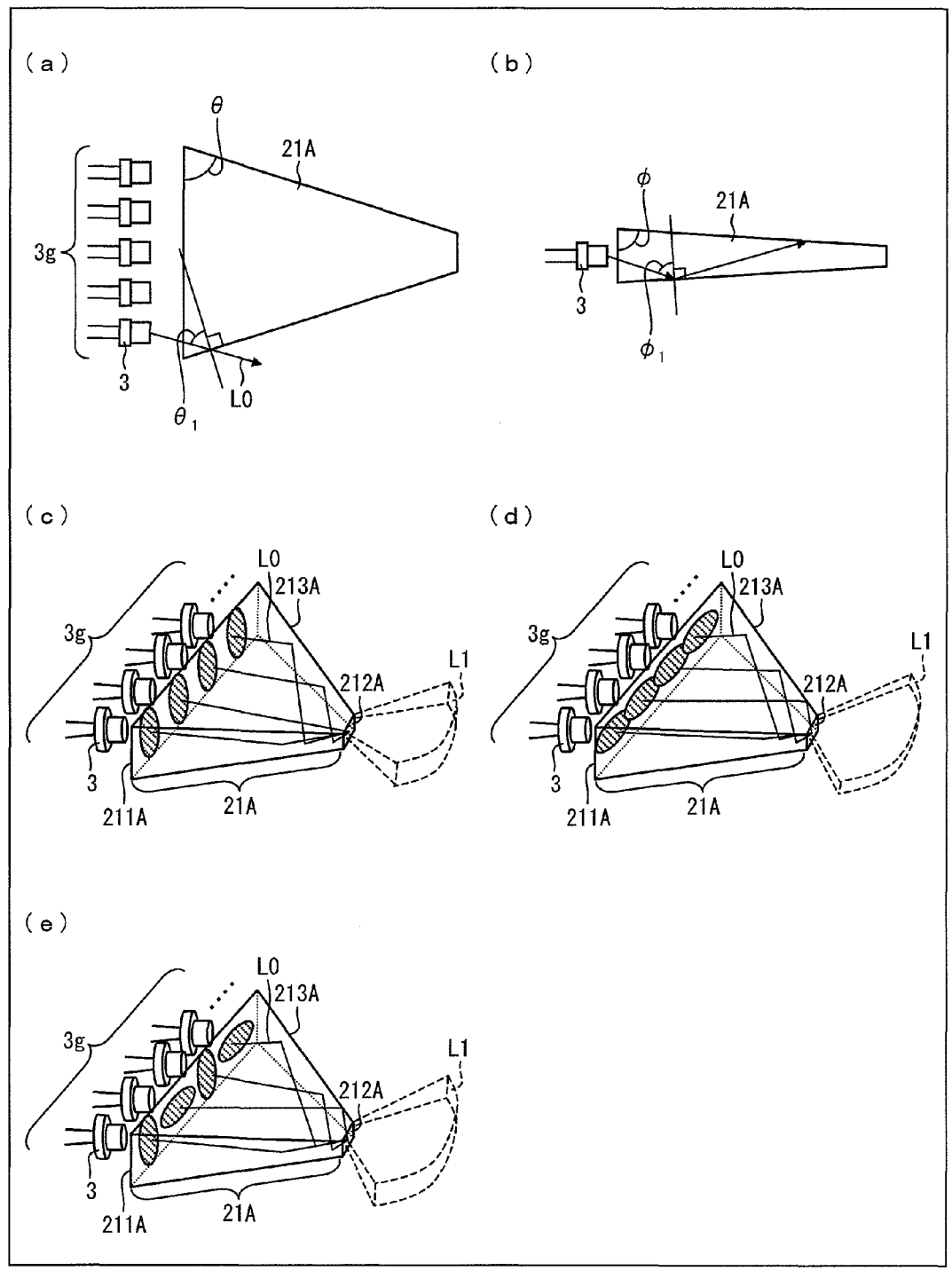
FIG. 26 illustrates views of examples of configurations of the light converging member and their light emitting tendencies; (a) illustrates a top view of the light converging member, (b) illustrates a side view of the light converging member, (c) illustrates an example of a light emitting tendency of the light converging member, (d) illustrates another example of a light emitting tendency of the light converging member, and (e) illustrates yet another example of a light emitting tendency of the light converging member.
Figure 27:
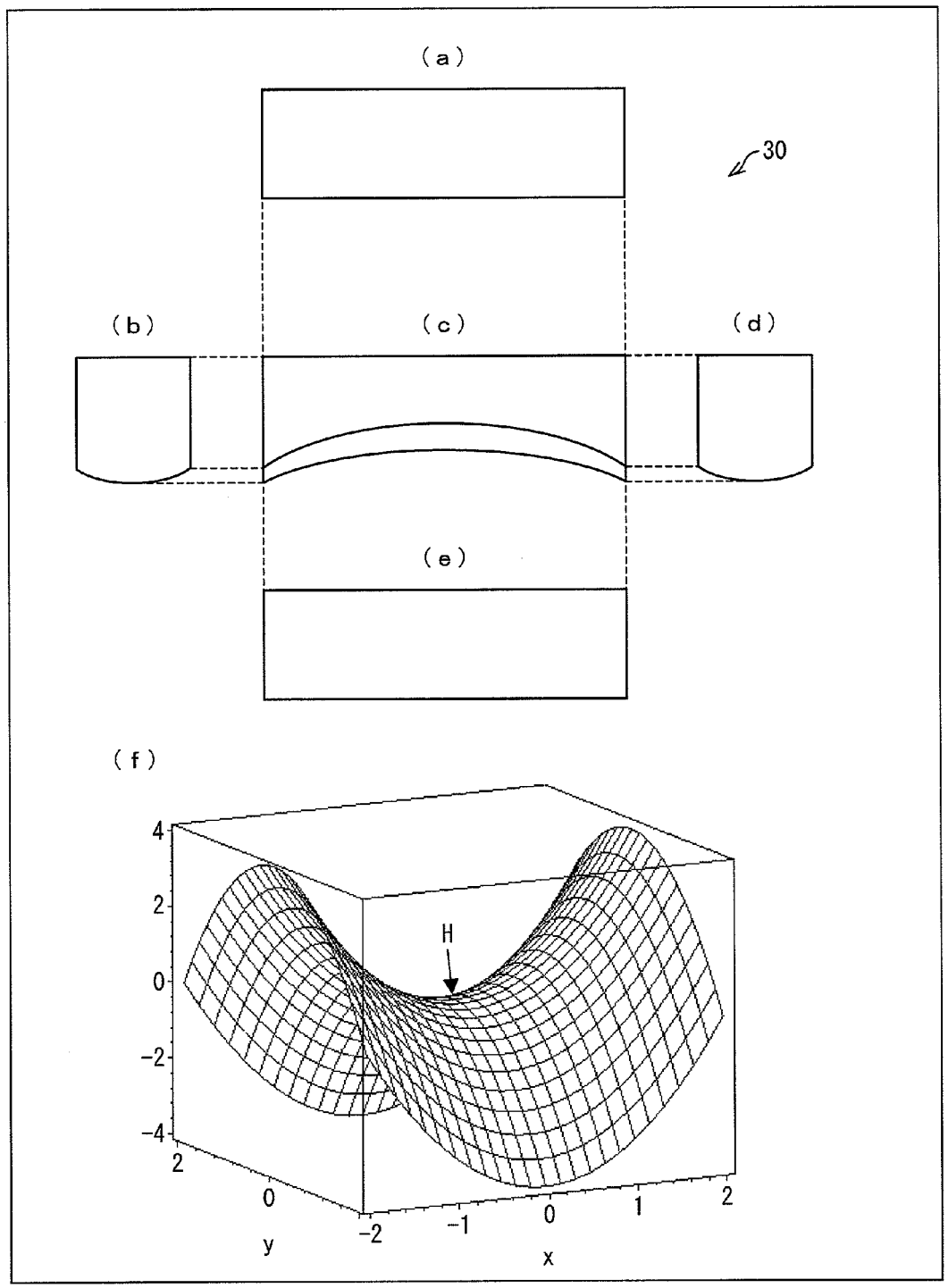
FIG. 27 illustrates a schematic view related to the headlamp, to describe a configuration of a saddle-shaped concave lens; (a) illustrates a rear side (a side of a concave plane serves as a front side) of the saddle-shaped concave lens, (b) illustrates one side of the saddle-shaped concave lens along its shorter direction, (c) illustrates one side of the saddle-shaped concave lens along its longitudinal direction, (d) illustrates the other side of the saddle-shaped concave lens along its short direction, (e) illustrates the front side of the saddle-shaped concave lens, and (f) conceptually illustrates an example of a shape of the concave plane of the saddle-shaped concave lens.

Relationship between Light Emitting Tendency of Other End of Light Guiding Member and Configuration of Second Optical System The following description deals with a relationship between (i) the light emitting tendency of the light emitting plane (the other end of first optical system) 212A of the above-described truncated pyramid light converging section 21A and (ii) the configuration of the second optical system, with reference to FIG. 24, (a) of FIG. 16, (a) to (e) of FIG. 26, and (a) to (f) of FIG. 27.

The following description explains directions of where the laser diodes 3 included in the laser diode group 3g face, and further explains the light emitting tendency of the emitted light L1 emitted from the light emitting plane 212A of the truncated pyramid light converging section 21A, with reference to (a) to (e) of FIG. 26.

In view of causing total reflection of the laser beams L0 on the truncated pyramid lateral surface 213A of the truncated pyramid light converging section 21A, it is preferable that the laser diodes 3 included in the laser diode group 3g are disposed in a state in which the laser diodes 3 are made horizontal (state in (a) of FIG. 16), as illustrated in (c) of FIG. 26. The reason for this is as described below.

The reason for this is because a vertical angle θ of the truncated pyramid light converging section 21A on a side of the truncated pyramid light converging section 21A closer to the laser diode group 3g from a top view perspective as illustrated in (a) of FIG. 26 is greater than a vertical angle f of the truncated pyramid light converging section 21A on the upper side of the truncated pyramid light converging section 21A from a side view perspective as illustrated in (b) of FIG. 26.

Namely, in view that the laser beam L0 is to be totally reflected on the truncated pyramid lateral surface 213A of the truncated pyramid light converging section 21A, the smaller an incident angle that the laser beam L0 enters the truncated pyramid lateral surface 213A of the truncated pyramid shaped light converging section 21A, the better (the greater an incident angle with respect to the truncated pyramid lateral surface 213A the better).

For instance, the laser beam L0 illustrated in FIG. 26(a) shows that since the incident angle $\theta_1$ with respect to the truncated pyramid lateral surface 213A is too small, the laser beam L0 is passed through outside the truncated pyramid shaped light converging section 21A, without the laser beam L0 being totally reflected.

On the other hand, the laser beam L0 illustrated in FIG. 26(b) has a large incident angle $f_1$; hence, the laser beam L0 is totally reflected off the truncated pyramid lateral surface 213A.

In other words, there is a high possibility that the laser beam L0 escapes with respect to a horizontal direction of the truncated pyramid light converging section 21A in which its cross section is long in the horizontal direction and short in the vertical direction, whereas the possibility that the laser beam L0 escapes is low with respect to a vertical direction of the truncated pyramid light converging section 21A.

The light irradiation range on the light entering plane 211A via which the laser beam L0 emitted from the laser diodes 3 enters is considered preferable as being long in a vertical direction and short in the horizontal direction, as illustrated in (c) of FIG. 26.

The emitted light L1 emitted from the light emitting plane 212A of the truncated pyramid light converging section 21A spreads lesser in the horizontal direction and greater in the vertical direction (as illustrated in (c) of FIG. 26) with a state in which the laser diodes 3 included in the laser diode group 3g are disposed horizontally (state in (a) of FIG. 16), as compared to a case (as illustrated in (d) of FIG. 26) described below where the direction of the laser diodes 3 are rotated by 90 degrees from the horizontally-disposed state.

Consequently, a headlamp 120C and the like described later employ the saddle-shaped concave lens 30, based on an understanding that the spreading in the horizontal direction of the emitted light L1 emitted from the light emitting plane 212A is narrower than the width of the light irradiation region of the light emitting body 40 in the horizontal direction, and that the spreading in the vertical direction of the emitted light L1 emitted from the light emitting plane 212A is broader than the width in the vertical direction of the light irradiation region of the light emitting body 40.

Namely, the saddle-shaped concave lens 30 is of a lens having a saddle-shaped concave plane, in which a concave lens whose axis runs in the vertical direction and a convex lens whose axis runs in the horizontal direction are integrated as one.

For example, the saddle-shaped concave lens 30 illustrated in (a) to (f) of FIG. 27 has a saddle-shaped concave plane in which a concave plane whose axis runs in the vertical direction and a convex plane whose axis runs in the horizontal direction are integrated as one, and the saddle-shaped concave plane is of a curved plane having a saddle point H.

FIG. 27 is a schematic view used for describing a configuration of the saddle-shaped concave lens 30; (a) of FIG. 27 illustrates a rear side of the saddle-shaped concave lens 30 (concave plane side is denoted as front), (b) of FIG. 27 illustrates a side plane in a short direction of the saddle-shaped concave lens 30, (c) of FIG. 27 illustrates a side plane in a longitudinal direction of the saddle-shaped concave lens 30, (d) of FIG. 27 illustrates another side plane in the short direction, and (e) of FIG. 27 illustrates a front side of the saddle-shaped concave lens 30. Moreover, (f) of FIG. 27 is an overview conceptually illustrating an example of a shape of the concave plane of the saddle-shaped concave lens 30.

Moreover, a front side of the saddle point H (lower side of (c) of FIG. 27 in the printed drawing) can have a focus based on the concave plane, and a rear side of the saddle-shaped concave lens 30 of the saddle point H can have a focus based on the convex plane.

Hence, the spreading of the emitted light from the saddle-shaped concave plane of the saddle-shaped concave lens 30 is accelerated by the concave plane and is held down by the convex plane.

As a result, even if the spreading of the emitted light L1 emitted from the light emitting plane 212A is small in the horizontal direction but large in the vertical direction, it is possible to irradiate the light irradiation region with irradiation light L2 originated from laser beams L0 so that the irradiation light L2 suits the size of the light irradiation region of the light emitting body 40 in its horizontal direction and its vertical direction, by use of the single saddle-shaped concave lens 30 having a saddle-shaped concave plane.

As such, the second optical system can be constituted of just the saddle-shaped concave lens 30. As a result, it is possible to hold down the number of components in the entire optical system and keep the size of the entire optical system small, as compared to a configuration in which the second optical system is made up of separate lenses such as the combination of the convex cylindrical lens 31 and the concave cylindrical lens 33.

The point H shown in (f) of FIG. 27 is the "saddle point", and is a point where a minimal point of the concave plane of the concave lens coincides with a maximal point of the convex plane of the convex lens. For example, the "hyperbolic paraboloid" shown in (f) of FIG. 27 is a typical example of a curved plane including the saddle point H.

Moreover, the curved line running along the x-axis is at its maximum at point H, and the curved line running along the y-axis is at its minimum at the point H; the point H where the x-axis and the y-axis coincide serves as the saddle point in which the maximal point coincides with the minimal point.

Next described with reference to (d) of FIG. 26 is a case where the relationship between the spreading in the horizontal direction of the emitted light L1 and the spreading in the vertical direction of the emitted light L1, which emitted light L1 is emitted from the light emitting plane 212A, is the opposite way round of that illustrated in (c) of FIG. 26 described above.

Illustrated in (d) of FIG. 26 is a schematic view of another example of a light emitting tendency of the light emitting plane 212A, of the truncated pyramid light converging section 21A.

In (d) of FIG. 26, it illustrates how the laser beams L0 enter the light entering plane 211A of the truncated pyramid light converging section 21A. Here, the laser beams L0 are emitted in a state in which the laser diodes 3 making up the laser diode group 3*g* are rotated by 90 degrees from their horizontally disposed state (state in (a) of FIG. 16).

At this time, the laser beams L0 emitted from the laser diodes 3 and entering the light entering plane 211A is light having an irradiated plane shaped of an ellipse which is long horizontally and short vertically, and which has an aspect ratio of 5 degrees in the vertical direction and 30 degrees in the perpendicular direction.

Hence, the emitted light L1 emitted from the light emitting plane 212A of the truncated pyramid light converging section 21A tends to spread relatively large in the horizontal direction and relatively small in the vertical direction.

In such a case, for example in a case as like (d) of FIG. 26, the spreading of the laser beam L0 emitted from the light emitting plane 212A of the truncated pyramid shaped light converging section 21A in the horizontal direction may become larger than the width of the light irradiation region of the light emitting body 40 in the horizontal direction, and the spreading of the laser beam L0 in the vertical direction may become smaller than the width of the light irradiation region in the vertical direction.

Such a case may cause a part of the laser beam L0 to miss the light irradiation region, or may cause a part of the light irradiation region to not be irradiated with the laser beam L0. This causes a problem that the luminous efficiency of the light emitting body 40 deteriorates.

Hence, in such cases, it is required to employ a saddle-shaped concave lens, in which a concave lens having a concave plane whose axis runs in the horizontal direction and a convex lens having a convex plane whose axis runs in the vertical direction are integrated as one, in other words, a saddle-shaped concave lens having an opposite configuration to the saddle-shaped concave lens 30 illustrated in FIG. 27.

Namely, a saddle-shaped concave lens in which the concave lens illustrated in (c) of FIG. 27 whose axis runs in the horizontal direction is replaced by a convex lens having an axis running in the horizontal direction, and the convex lens illustrated in (b) and (d) of FIG. 27 whose axis runs in the vertical direction is replaced by a concave lens having an axis running in the vertical direction.

As described above, the spreading of the emitted light from the saddle-shaped concave plane is accelerated with the concave plane, and is held down with the convex plane.

As a result, it is possible to irradiate the light irradiation region with the irradiation light L2 originated from laser beam L0 so that the irradiation light L2 suits the size of the light irradiation region of the light emitting body 40 in its horizontal direction and vertical direction by use of the single saddle-shaped concave lens 30 having a saddle-shaped concave plane, even in the case where the spreading of the emitted light L1 emitted from the light emitting plane 212A is broad in the horizontal direction and narrow in the vertical direction.

The configuration of the saddle-shaped concave lens is considered to be a configuration in which the size in the longitudinal direction and the size in the short direction of the saddle-shaped concave lens 30 illustrated in FIG. 24 are switched over, and the saddle-shaped concave lens 30 is rotated by 90 degrees about an axis running in the horizontal direction. Hence, this configuration is not particularly illustrated in the embodiment.

With reference to (e) of FIG. 26, the following describes yet another example of a direction of the laser diodes 3 included in the laser diode group 3*g*, and describes the light emitting tendency of emitted light L1 emitted from the light emitting plane 212A of the truncated pyramid light converging section 21A.

Illustrated in (e) of FIG. 26 is a schematic view of yet another example of the light emitting tendency of the light emitting plane 212A of the truncated pyramid light converging section 21A.

In (e) of FIG. 26, it illustrates how the laser beams L0 enter the light entering plane 211A of the truncated pyramid shaped light converging section 21A in a case where the laser diodes 3 making up the laser diode group 3*g* are arranged so that the laser diodes 3 in the horizontal state (state in (a) of FIG. 16) and the laser diodes 3 rotated by 90 degrees from the horizontal state are arranged alternatively.

At this time, the emitted light L1 emitted from the light emitting plane 212A of the truncated pyramid light converging section 21A tends to be relatively largely spread in the horizontal direction and relatively largely spread also in the vertical direction.

For instance, in the case of (e) of FIG. 26, there is the possibility that the spreading in the horizontal direction of the laser beam L0 emitted from the light emitting plane 212A of the truncated pyramid light converging section 21A is wider than the width in the horizontal direction of the light irradiation region of the light emitting body 40, and the spreading of the laser beam L0 in the vertical direction may also be wider than the width of the light emitting body 40 in the vertical direction.

Such a case causes the laser beam L0 to have a part that misses the light irradiation region, thereby causing a problem that the light emitting body 40 decreases in luminous efficiency.

Hence, in such a case, it is necessary to employ, for example, a compound convex lens (second optical system; the compound convex lens is not particularly illustrated in the embodiment) in which a convex lens having a convex plane whose axis runs in the horizontal direction and a convex lens having a convex plane whose axis runs in a vertical direction are integrated as one.

As described above, the spreading of the emitted light from the light emitting plane 212A is held down by employing the convex lens.

As a result, even in a case where the spreading of the emitted light L1 emitted from the light emitting plane 212A is broad in the horizontal direction and also broad in the vertical direction, it is possible to irradiate the light irradiation region of the light emitting body 40 with the irradiation light L2 originated from the laser beam L0 so that the irradiation light L2 suits the size of the light irradiation region in the horizontal direction and vertical direction, by use of a single compound convex lens in which the convex lens having a convex plane whose axis runs in the horizontal direction and a convex lens having a convex plane whose axis runs in the vertical direction are integrated as one.

The foregoing description explains the following three modes: cases where an irradiated range of the laser beam L0 emitted from the laser diodes 3 included in the laser diode group 3g are (i) long in a vertical direction in a single direction ((c) of FIG. 26); (ii) long in a horizontal direction in a single direction ((d) of FIG. 26); and (iii) arranged so that the laser diodes 3 are arranged in such a manner that a laser diode 3 having an irradiated range long in the vertical direction and a laser diode 3 having an irradiated range long in the horizontal direction are arranged alternatively ((e) of FIG. 26).

However, the direction and disposition method of the laser diodes 3 which make up the laser diode group 3g is not limited to the three modes described in the embodiment. Needless to say, various modes such as a case where each of the laser diodes 3 are facing different directions to each other are also included within the scope of the present invention.

Namely, the direction of the laser diode 3 may be disposed in any direction; all or part of the laser diodes 3 may be disposed in the same direction, or the laser diodes 3 may be disposed in all different directions.

Headlamp 120C and Headlamp 120D

Figure 25:
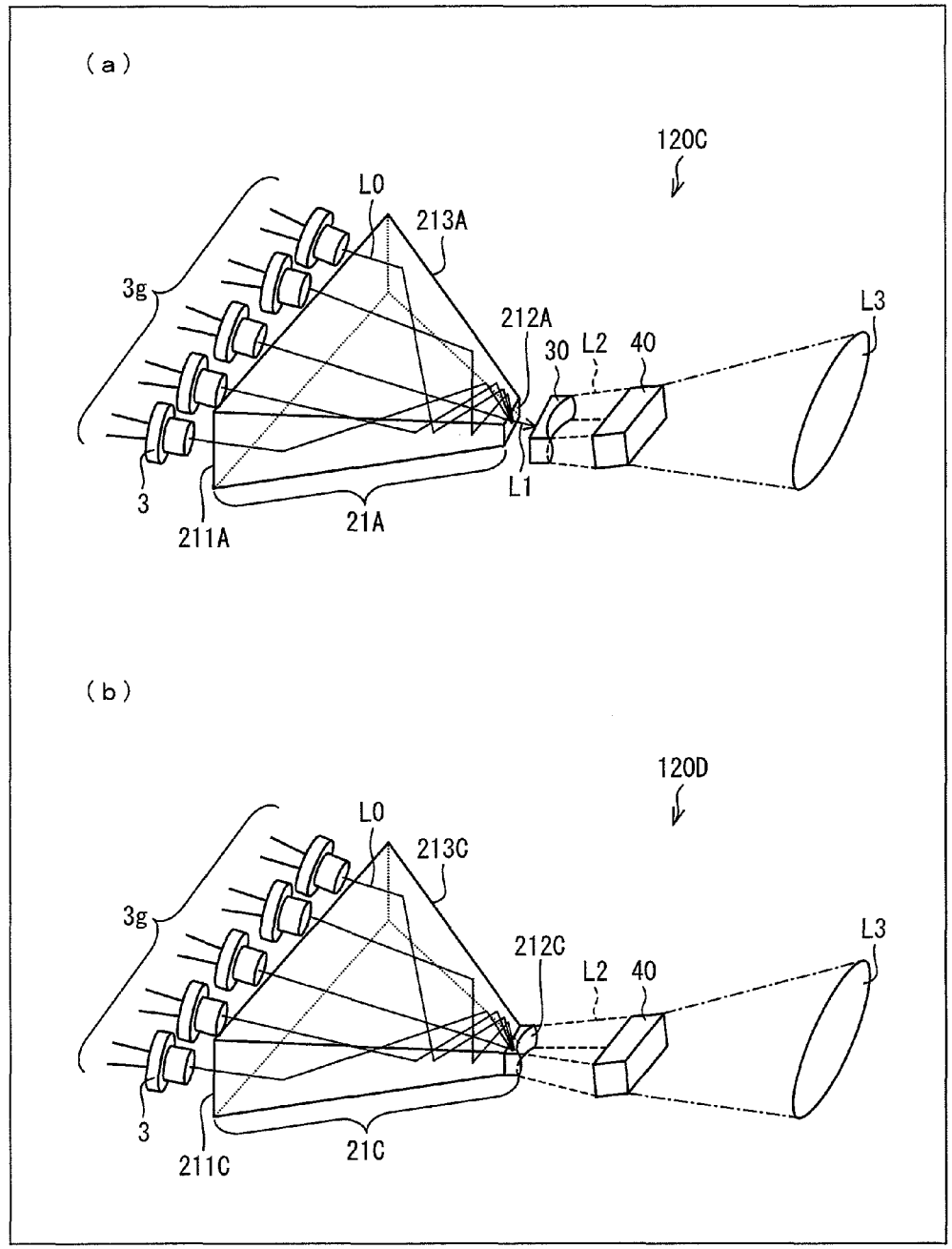
FIG. 25 illustrates schematic views of headlamps which serve as yet another embodiment of the present invention; (a) is an example of a headlamp in which a first optical system is separated from a second optical system, and (b) is an example of a headlamp in which a first optical system and a second optical system are integrated as one.

The following describes how a headlamp 120C and a headlamp 120D are configured in another embodiment of the present invention, with reference to (a) and (b) of FIG. 25. Note that the headlamp 120C and the headlamp 120D are examples which specifically illustrate the first light guide section 20 of the headlamp 110B.

Illustrated in (a) of FIG. 25 is a configuration of the headlamp 120C which employs the aforementioned truncated pyramid light converging section 21A, as an example in which the first light guide section 20 of the headlamp 110B serves as a light converging element.

Although the present embodiment discusses the truncated pyramid light converging section 21A as an example, a shape of the light converging section is not limited to this, and other various shapes are possible, such as a circular truncated cone or an elliptic truncated cone.

The laser diode group 3g and the laser diodes 3 are as described above.

As described above, the truncated pyramid light converging section 21A guides the laser beams L0 that enters the light entering plane 211A to the light emitting plane 212A with use of the truncated pyramid lateral surface 213A.

Hence, with use of the truncated pyramid lateral surface 213A, the laser beams L0 that enter the light entering plane 211A can be guided to the light emitting plane 212A which has a smaller cross section than the cross section of the light entering plane 211A. Namely, the truncated pyramid lateral surface 213A can converge the laser beams L0 to the light emitting plane 212A.

According to the configuration, reduction of both the area of the light emitting plane 212A and the size of the light emitting body 40 (laser beam irradiation plane 40a) allows for reducing the size the light emitting body 40 emitting light that has a high luminance and a high luminous flux in accordance with the number of laser diodes 3 included in the laser diode group 3g.

In the embodiment, the truncated pyramid lateral surface 213A is provided so as to encircle all optical paths of the laser beams L0 emitted from the laser diode group 3g.

Moreover, each of the laser beams L0 is guided toward the light emitting plane 212A along an optical path of any one of (i) an optical path in which the laser beam L0 is reflected just once on the truncated pyramid lateral surface 213A, (ii) an optical path in which the laser beam L0 is reflected several times on the truncated pyramid lateral surface 213A, and (iii) an optical path in which the truncated pyramid lateral surface 213A never reflects the laser beam 0.

The saddle-shaped concave lens 30 and the light emitting body 40 are as described above.

In the headlamp 120C, the emitted light L1 originated from the laser beams L0 is emitted to the laser beam irradiation plane 40a of the light emitting body 40 in a dispersed manner as the irradiation light L2, so as to suit the laser light irradiation plane 40a of the light emitting body 40. This allows for effectively exciting the electrons in a low energy state to a high energy state, throughout the fluorescent material included in the light emitted body 40.

As a result, the illumination light L3 is emitted evenly from the light emitting body 40, thereby allowing for achievement of a high luminous flux and a high luminance with the headlamp 120C as compared to using a single laser diode 3.

Moreover, the laser beam irradiation plane 40a of the light emitting body 40 is not irradiated with the irradiation light L2 originated from the laser beams L0 by being focused on one point, but is irradiated with the irradiation light L2 in a dispersed manner via the truncated pyramid light converging section 21A and the saddle-shaped concave lens 30. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 120C which can achieve a high luminous flux and a high luminance as well as achieving a long life.

As described later, the truncated pyramid light converging section 21A may be provided between a ferrule 70 [emitting end (part in which the other end of the optical fiber is arranged) 222] in the headlamp 140B and the saddle-shaped concave lens 30 (see (a) of FIG. 28).

This allows for increasing the number of laser beam sources while allowing for further reduction of size of the light emitting body 40 in the headlamp 140B.

Illustrated in (b) of FIG. 25 is a headlamp 120D which employs a truncated pyramid optical member (optical system, first optical system, second optical system, light guiding member) 21B, as an example of an optical member (light guiding member) in which the truncated pyramid light converging section 21 of the headlamp 120C and the saddle-shaped concave lens 30 are integrated as one (on the light emitting plane 212A) (however, the size of the saddle-shaped concave lens 30 is adjusted as appropriate).

The present embodiment is described by using the truncated pyramid optical member 21B as an example, however the shape of the optical member is not limited to this, and various shapes are employable such as a truncated cone, an elliptic truncated cone, and like shape.

The laser diode group 3g and the laser diode 3 are as described above.

The truncated pyramid optical member 21B is configured so as to have a surrounded structure. A truncated pyramid lateral surface (light reflecting lateral surface, surrounded structure) 213B serves as a surround of the truncated pyramid optical member 21B, which truncated pyramid lateral surface 213B reflects the laser beams L0 entering a light entering plane (one end on the first optical system side) 211B of one end of the truncated pyramid optical member 21B. By use of this surrounded structure, the laser beams L0 entering the light entering plane 211B are guided to the other end of the truncated pyramid optical member 21B.

On the other end of the truncated pyramid optical member 21B, a light dispersing plane (light dispersing section, other end on the second optical system side) 212B is provided, via which a predetermined laser beam irradiation plane 40a of the light emitting body 40 is irradiated with the guided laser beams L0 in a dispersed manner.

Furthermore, an area of the cross section of the light dispersing plane 212B is smaller than an area of the cross section of the light entering plane 211B; use of the truncated pyramid lateral surface 213B allows for converging the laser beams L0 entering the light entering plane 211B, to the light dispersing plane 212B.

The truncated pyramid optical member 21B is made of silica glass, acrylic resin, or other transparent material.

The light dispersing plane 212B is configured so as to be integrated with the saddle-shaped concave lens 30 on the light emitting plane 212A of the truncated pyramid light converging section 21A illustrated in (a) of FIG. 25.

According to the configuration, reduction of both the area of the light dispersing plane 212B and the size of the light emitting body 40 (laser beam irradiation plane 40a) allows for reducing the size of the light emitting body 40 which emits light having a high luminance and a high luminous flux in accordance with the number of laser diode 3 included in the laser diode group 3g.

In the embodiment, the truncated pyramid optical member 21B is configured so as to encircle all optical paths of the laser beams L0 emitted from the laser diode group 3g.

Moreover, each of the laser beams L0 is guided toward the light dispersing plane 212B along an optical path of any one of (i) an optical path in which the laser beam L0 is reflected just once on the truncated pyramid lateral surface 213B, (ii) an optical path in which the laser beam L0 is reflected several times on the truncated pyramid lateral surface 213B, and (iii) an optical path in which the truncated pyramid lateral surface 213B never reflects the laser beam 0. The light emitting body 40 is as described above.

In the headlamp 120D, the irradiation light L2 originated from the laser beams L0 is emitted to the laser beam irradiation plane 40a of the light emitting body 40 in a dispersed manner from the light dispersing plane 212B, so as to suit the laser beam irradiation plane 40a of the light emitting body 40. Hence, it is possible to effectively excite the electrons from a low energy state to a high energy state throughout the fluorescent material included in the light emitting body 40.

As a result, the illumination light L3 is evenly emitted from the light emitting body 40, thereby allowing for achieving a high luminous flux and a high luminance of the headlamp 120D as compared to a case where a single laser diode 3 is used.

Moreover, the laser beam irradiation plane 40a of the light emitting body 40 is not irradiated with the irradiation light L2 originated from the laser beams L0 by being focused on one point, but is irradiated with the irradiation light L2 in a dispersed manner via the truncated pyramid light converging section 21B. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 120D which can achieve a high luminous flux and a high luminance as well as achieving a long life.

Headlamp 140B

Figure 28:
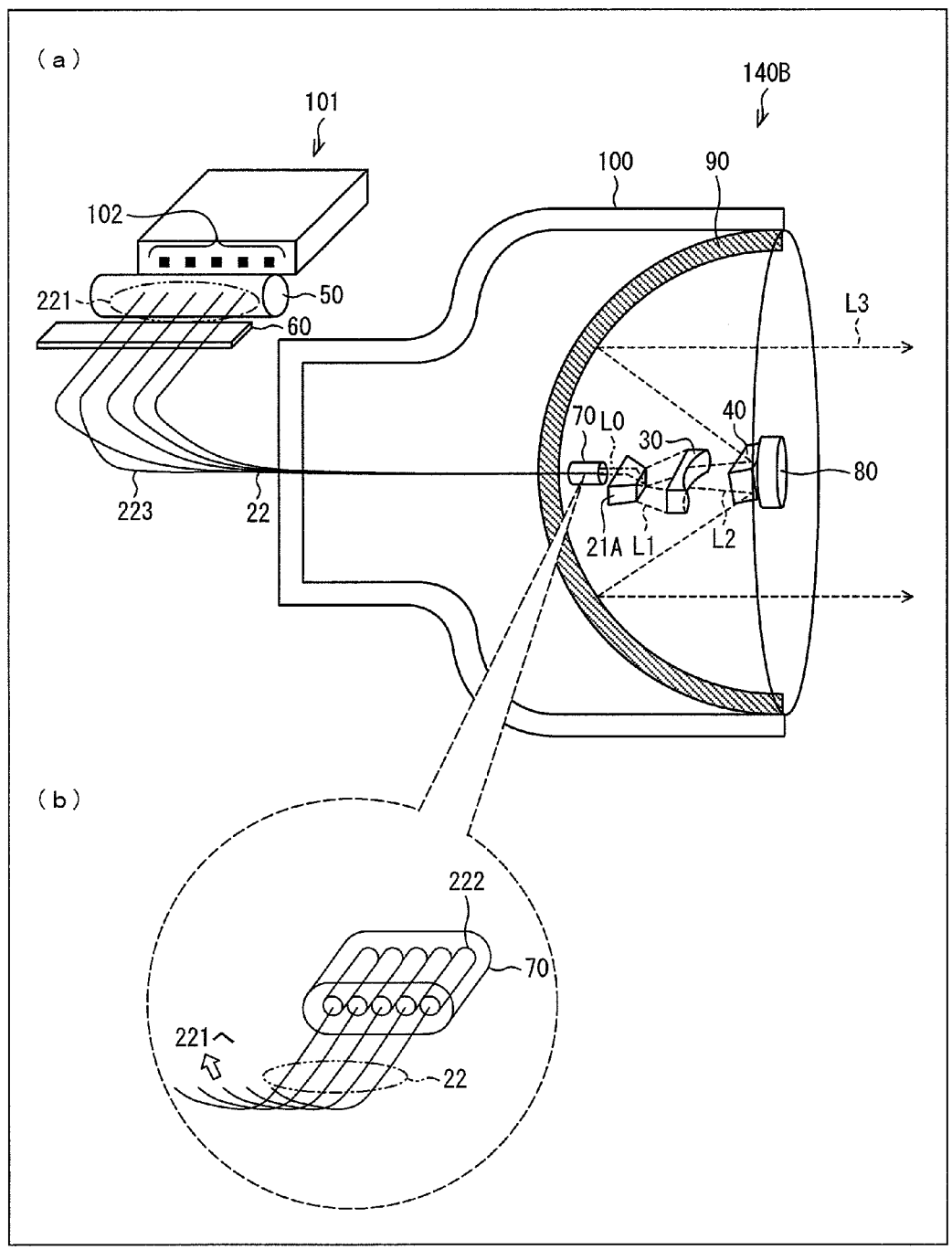
FIG. 28 is a schematic view illustrating a headlamp which serves as yet another embodiment of the present invention; (a) illustrates a configuration of the headlamp, and (b) illustrates an example of a ferrule which fixes a plurality of optical fibers.

Next described is a brief configuration of a headlamp (light emitting device, illuminating device, vehicle headlamp) 140B which serves as yet another embodiment of the present invention, with reference to (a) and (b) of FIG. 28.

FIG. 28 is a schematic view illustrating a configuration of the headlamp 140B which employs an optical fiber bundle (optical system, first optical system, a plurality of optical fibers, light guiding member) 22 as an example of the first light guide section 20 of the headlamp 110B which includes a plurality of light guiding members. Illustrated in (a) of FIG. 28 is a brief configuration of the headlamp 140B, and (b) of FIG. 28 illustrates an example of a ferrule 70 that fixes the plurality of the optical fibers.

As illustrated in (a) of FIG. 26, the headlamp 140B includes: an LD chip 101, a rod-shaped lens 50, an optical fiber fixing jig 60, an optical fiber bundle 22, a ferrule 70, truncated pyramid shaped light converging section 21A, a saddle-shaped concave lens 30, a rectangular parallelepiped light emitting body 40, a reflecting mirror 90, and a housing 100.

The headlamp 140B differs from the above-described headlamp 140A in the following points (1) and (2); other configurations are identical to the headlamp 140A.

(1) The saddle-shaped concave lens 30 is used instead of the convex cylindrical lens 31.

(2) A further truncated pyramid light converging section 21A is disposed between the ferrule 70 and the saddle-shaped concave lens 30. Hence, configurations that have already been described in the headlamp 140A are omitted in description here.

As described above, in the lamps disclosed in Patent Literatures 1 and 2, a condenser lens is provided per laser beam source to guide the laser beams, and each of the laser beams are emitted to the fluorescent material by having a hole opened in the reflecting mirror for each of the laser beams and causing the laser beams to pass through the respective one of the holes. This causes secondary problems that as the number of laser beam sources increases, the lamp increases in size and the reflection efficiency of light by the reflecting mirror decreases.

In order to solve the secondary problem, the first optical system in the headlamp 140B employs the configuration of the optical fiber bundle 22, which optical fiber bundle 22 is a bundle of a plurality of optical fibers 223.

One end of the optical fiber bundle 22 serves as the entering end 221, which is an assembly of the one ends of the optical fibers 223.

The other end of the optical fiber bundle 22 serves as an emitting end (a part in which the other ends of the optical fibers are arranged) 222, which is an assembly of the other ends of the optical fibers 223, in which optical fibers 223 are inserted into a respective one of five through-holes formed in the ferrule 70. The material of the ferrule 70 is not particularly limited, and may be, for example, stainless steel.

Each of the laser beams L0 emitted from the five light emitting points 102 of the LD chip 101 enters one end of a corresponding one of the optical fibers 223. Thereafter, the other ends of the optical fibers 223 (emitting ends 222) emit the emitted light L1 originated from the laser beams L0.

Hence, each of the laser beams L0 enter the corresponding one of the ends of the optical fibers 223 and are guided to the emitting ends 222, by use of a simple configuration in which the first light guide section 20 includes the optical fiber bundle 22.

Moreover, in the headlamp 140B, the truncated pyramid light converging section 21A is provided between the ferrule 70 (emitting end 222) and the saddle-shaped concave lens 30.

This allows for further reduction of a size of the light emitting body 40 in the headlamp 140B while increasing the number of the laser beam sources.

Moreover, although dependent on the thickness and number of the optical fibers 223, even if a plurality of the optical fibers 223 are bundled together, a total thickness generally would not become so thick.

Accordingly, it is possible to irradiate the light emitting body 40 having a small laser beam irradiation plane 40a, with the irradiation light L2 originated from the laser beams L0 that are emitted from the five light emitting points 102, while maintaining the size of the emitting ends 222 and the light emitting body 40 (laser beam irradiation plane 40a) small.

For example, in the headlamp 140B, a hole is opened in the center of the reflecting mirror 90, and the optical fiber bundle 22 is passed through the hole to irradiate the light emitting body 40 with the irradiation light L2 from the emitting end 222. Hence, even if the number of the laser beam sources (light emitting points 102) increase in number as with the lamps disclosed in Patent Literatures 1 and 2, the light reflection efficiency of the reflecting mirror 90 will not deteriorate.

The emitted light emitted from the emitting end 222 then enters the light entering plane 211A of the truncated pyramid light converging section 21A and is guided to the light emitting plane 212A by the truncated pyramid lateral surface 213A.

Thereafter, the laser beams guided to the light emitting plane 212A is transmitted via the light emitting plane 212A and through the saddle-shaped concave lens 30 as the irradiation light L2, and is emitted to the laser beam irradiation plane 40a of the rectangular parallelepiped light emitting body 40, in a dispersing manner. The light emitting body 40 is as described above.

The reflective plate 80 and the reflecting mirror 90 are as described above.

The illumination light L3 emitted from the light emitting body 40 travels in a direction opposite of a traveling direction of the irradiation light L2, by the reflective plate 80.

The illumination light L3 reflected off the reflective plate 80 is again reflected off the reflecting mirror 90, so as to travel to a front side of the headlamp 140B. As such, the reflecting mirror 90 causes the illumination light L3 emitted from the light emitting body 40 to travel to the front side, by forming the pencil of rays which travel within the set solid angle.

The housing 100 is a housing that stores the ferrule 70, the saddle-shaped concave lens 30, the light emitting body 40, and like members.

Moreover, in the headlamp 140B, the emitted light L1 originated from the laser beams L0 is emitted to the laser beam irradiation plane 40a of the light emitting body 40 in a dispersing manner, as the irradiation light L2. This allows for efficiently exciting the electrons in a low energy state to a high energy state, throughout the fluorescent material included in the light emitting body 40.

As a result, the illumination light L3 is evenly emitted from the light emitting body 40, thereby allowing for achieving a high luminous flux and a high luminance of the headlamp 140B as compared to a case where the laser beam source having a single light emitting point 102 is used.

Moreover, the laser beam irradiation plane 40a of the light emitting body 40 is not irradiated with the emitted light L1 originated from the laser beams L0 by being focused on one point, but the laser beam irradiation plane 40a is irradiated with the emitted light L1 in a dispersed manner via the optical fiber bundle 22, the truncated pyramid shaped light converging section 21A and the saddle-shaped concave lens 30. Hence, it is possible to prevent the light emitting body 40 from deteriorating caused by the laser beam irradiation plane 40a being irradiated with the laser beams L0 so that the laser beams L0 are focused on a single point.

According to the above, it is possible to provide a headlamp 140B which can achieve a high luminous flux and a high luminance as well as achieving a long life.

Laser Downlight 400C

A laser downlight (light emitting device, illuminating device) 400C is described below as yet another embodiment the present invention, with reference to FIGS. 8, 21, 30 and 31.

Figure 30:
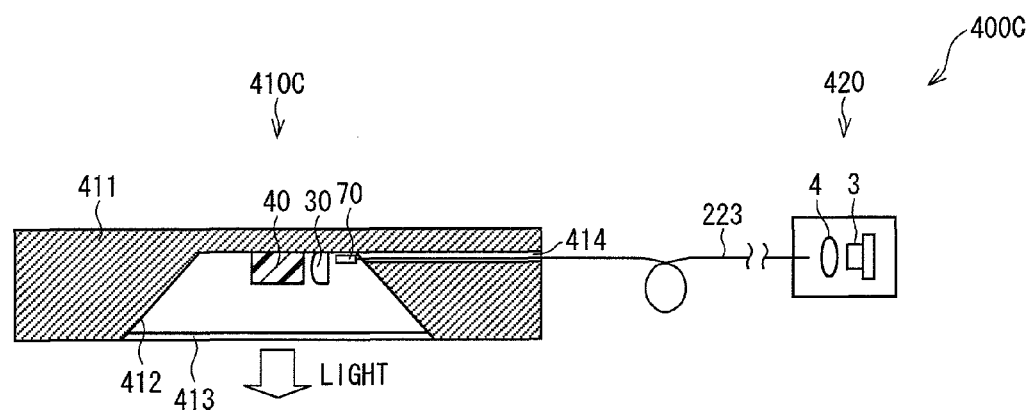
FIG. 30 is a cross sectional view illustrating yet another example of a laser downlight which serves as an embodiment of the present invention.
Figure 31:
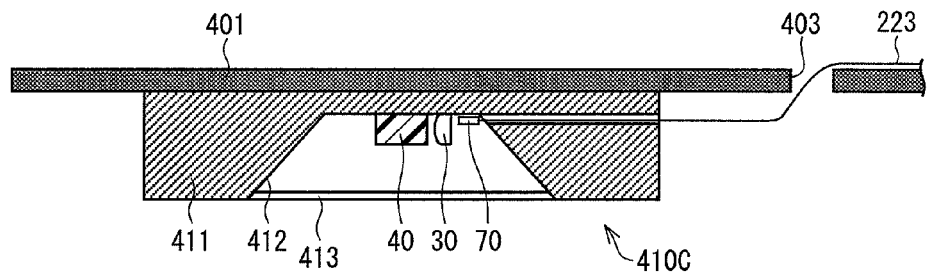
FIG. 31 is a cross sectional view illustrating a modification of how the laser downlight is disposed.

FIG. 8 is a schematic view illustrating external appearances of a light emitting unit 410C and a conventional LED downlight 500. FIG. 21 is a cross sectional view of a ceiling on which the laser downlight 400C is disposed. FIG. 30 is a cross sectional view of the laser downlight 400C.

The laser downlight 400C differs from the laser downlight 400A in the following points (1) to (3). Other configurations of the laser downlight 400C are identical to those of the laser downlight 400A, and therefore are omitted in description here.

(1) The optical fibers 223 are used instead of the optical fiber 5.

(2) The ferrule 70 is provided on ends of the optical fibers 223, which ends are disposed closer to the light emitting body 40.

(3) A saddle-shaped concave lens 30 is disposed between the light emitting body 40 and the ferrule 70.

As described above, the laser downlight 400C includes: a light source unit 420 including at least one laser diode 3 that emits a laser beam L0; at least one light emitting unit 410C including a light emitting body 40 and a concave section 412 serving as a reflecting mirror; an optical fiber 223 guiding the laser beam L0 to a respective light emitting unit 410C; and a saddle-shaped concave lens 30 causing irradiation of the laser beam irradiation plane 40a of the light emitting body 40 with emitted light L1 emitted from the emitting end of the optical fiber 223 in a dispersing manner, as irradiation light L2.

With this configuration, it is possible to reduce the possibility that the light emitting body 40 is remarkably deteriorated in the laser downlight 400C, caused by the irradiation of the light emitting body 40 with the laser beam L0 being focused on one part of the light emitting body 40. This as a result achieves a long life of the laser downlight 400C. Other configurations of the light emitting unit 410C and the light source unit 420 of the laser downlight 400C, a modification of how to dispose the laser downlight 400C, a comparison between the laser downlight 400C and the conventional LED downlight 500, a specification of the laser downlight 400C and the like are substantially same as the laser downlight 400A. Hence, descriptions of those are omitted here.

Light Distribution Characteristics of Light Emitting Device (Experimental Device)

An experiment was carried out with a light emitting device (hereinafter, referred to as an experimental device) which was experimentally prepared using ten (10) laser diodes 3, each of which is a laser diode (whose oscillation wavelength is 405 nm) having a single stripe per chip. Each of the LD chips 11 has an optical power of 1.0 W, and is driven at an operating voltage of 5 V and an operating current of 0.6 A.

An optical fiber bundle made up of ten optical fibers 223 was used as the first optical system. The convex cylindrical lens 31 or the saddle-shaped concave lens 30 was used as the second optical system. A light emitting body 40 having a dimension of length×depth×height=3 mm×1 mm×1 mm, was employed as the light emitting section.

The optical fibers 223 were optical fibers made of quartz, each of which having a core diameter of 200 μm, a clad diameter of 240 μm, and a numerical aperture NA of 0.22.

An aspherical lens (first optical system: e.g., FLKN1 405 manufactured by ALPS ELECTRIC CO., LTD.; not illustrated) was provided per laser diode 3 to collimate the laser beams L0, and these collimated laser beams L0 were caused to enter one end of a corresponding one of the optical fibers. Dispositions of these configurations were adjusted as appropriate, however descriptions of the adjustments are omitted since this would become troublesome.

The light distribution characteristic of the experimental device was studied, which resulted in that the light emitting body 40 emitted light having a luminous flux of approximately 1500 lm (lumen).

Further, a luminance of the light emitting body 40 was approximately 80 Mcd/m$^2$ (megacandela per square meter).

From the result of the experiment, it turned out that a luminous flux per laser diode 3 was approximately 150 lm by simple calculation. Accordingly, for example, if 14 or more pieces of laser diodes 3 were used, the light emitting body 40 would be capable of emitting light having a luminous flux of approximately more than 2000 lm.

It is difficult to accurately calculate an actual light intensity (a luminous flux per unit solid angle) because light is not emitted in an isotropic manner. Note however, that 17 laser diodes 3 are to achieve a light intensity of approximately 203 (cd) (~150×17 (lm)/4p ~2550 (lm)/4/3.14) by simple calculation, on the assumption that the light is emitted in an isotropic manner from the light emitting point. In a case where (i) an effective aperture area is approximately 3 mm$^2$ and (ii) a transmittance of the optical system is approximately 0.7, a luminance is approximately 203 (cd)/0.7/3 (mm$^2$)=96.6 (cd/mm$_2$) ~96.6 (Mcd/m$^2$)~100 (Mcd/m$^2$).

Note that, as a result of similar experiments which were carried out while changing the number of the laser diodes 3, it turned out that the light emitting body 40 were able to achieve a high luminous flux of more than 2000 lm and a high luminance of more than 100 Mcd/m$^2$ (hereinafter, the light emitting device which can achieve such a high luminance and a high luminous flux is simply referred to as a "laser illumination").

Figure 32:
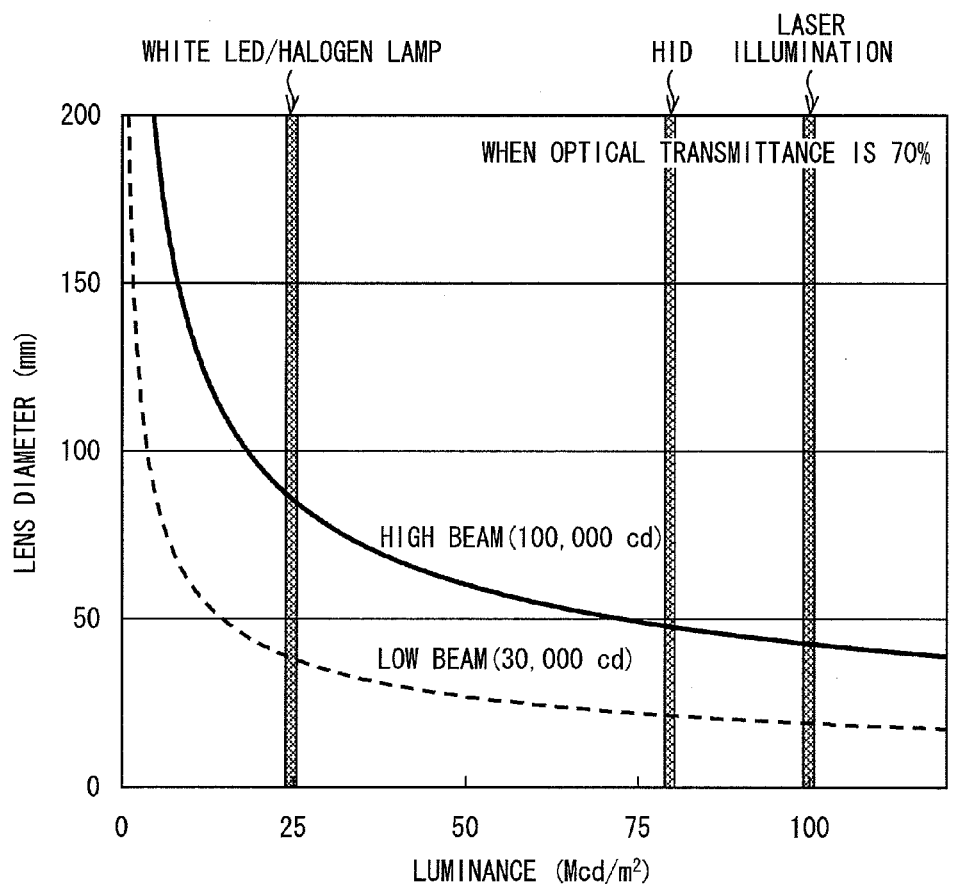
FIG. 32 is a graph illustrating a comparison of a required lens diameter as a car headlamp, by lamp types.
Figure 33:
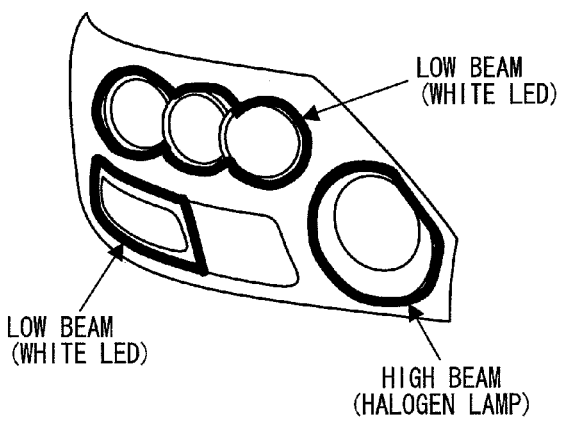
FIG. 33 is a view illustrating lamp properties, an exterior configuration of a conventional car headlamp and an exterior configuration of a car headlamp which serves as an embodiment of the present invention; (a) illustrates a comparison result of lamp properties by lamp types, (b) illustrates an example of an exterior configuration of a conventional vehicle headlamp, and (c) illustrates an example of an exterior configuration of a car headlamp which is one embodiment of the present invention.
Figure 33:
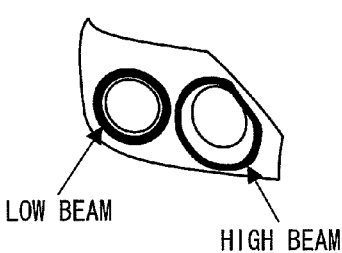

Comparison of Light Distribution Characteristics between Light Emitting Device (Experimental Device) and Conventional Lamp The following describes a comparison result of light distribution characteristics of the laser illumination and a conventional lamp, with reference to FIGS. 32 and 33.

FIG. 32 is a graph illustrating comparison results as to how lens diameters required for a car headlamp change depending on types of lamps.

As illustrated in FIG. 32, a commercially available halogen lamp achieves a luminance of approximately 25 Mcd/m$^2$ (megacandela per square meter), and a HID (High Intensity discharge) lamp achieves a luminance of approximately 80 Mcd/m$^2$.

On the other hand, the laser illumination can achieve a high luminance of approximately 100 Mcd/m$^2$. Accordingly, it is possible to achieve a high luminance which is approximately four times larger than that of the halogen lamp and which is larger than that of the HID lamp (see FIG. 32).

Namely, it is preferable that a luminance of illumination light L3 emitted by the light emitting body 40 is 80 Mcd/m$^2$ or more.

In general, a halogen lamp is used as a headlamp for high beam use of a car. Meanwhile, use of the light emitting body 40 allows for achieving a high luminance approximately four times larger than that of the halogen lamp, even by a light emitting body 40 having an aperture area size smaller than that of the halogen lamp. Accordingly, it is possible to reduce an area of a lens to one-quarter of its original size, which lens is provided in front of the headlamp for high beam use.

Note that a light-emitting filament of the halogen lamp has an approximate size of width×depth×height=5 mm×1.5 mm×1.5 mm.

Illustrated in (a) of FIG. 33 is a comparison of performances by the types of lamps, (b) of FIG. 33 illustrates an exterior example of a conventional car headlamp, and (c) of FIG. 33 illustrates an exterior example of a car headlamp in a case where the laser illumination is used.

As illustrated in (a) of FIG. 33, a commercially available high-power white LED (hereinafter, may be referred to as "white LED" due to its complexity) emits light with a luminous flux whose upper limit is approximately 400 lm to 500 lm per module. The luminous flux of an in-vehicle halogen lamp is approximately 700 lm to 1500 lm (the luminous flux of a halogen lamp for a standard-sized car is approximately 1000 lm in general). The luminous flux of an HID lamp is approximately 3200 lm. Note however, that it is difficult to utilize, as irradiation light of a headlight, the whole luminous flux of 3200 lm of the HID lamp due to the configuration and shape of the HID lamp. It is said that an effective luminous flux which can be utilized is merely 2000 lm or less. There is also a further problem that the optical system of the HID lamp is difficult to design.

On the other hand, the laser light emitting body of the Example can achieve a high luminous flux of more than 2000 lm. Specifically, it is possible to achieve a high luminous flux which is approximately four to five times larger than that of the white LED, which is larger than that of the halogen lamp, and which is similar to that of the HID lamp (effectively, larger than the luminous flux of the HID lamp).

In view of the circumstances, it is preferable that the luminous flux of the illumination light L3 emitted by the light emitting body 40 is 1500 lm or more but 3200 lm or less.

In general, the white LED is used as a headlamp for low beam use of a car. With the laser illumination of the Example, one (1) LD chip can achieve, for example, a high luminous flux that is four to five times larger than that of one (1) white LED.

According to the laser illumination of the Example, it is necessary to provide just one (1) headlamp for high beam use and just one (1) headlamp for low beam use (see (c) of FIG. 33), unlike the conventional headlamp whose size is as shown in (b) of FIG. 33. Further, it is possible to drastically reduce an area of a lens that is provided in front of the headlamps for high beam use and headlamps for low beam use.

The laser illumination has a life of approximately 10000 hours under continuous use, which is substantially identical to that of the white LED which has a long life (see (a) of FIG. 33).

Accordingly, the present invention allows for providing devices such as the headlamps 110A and 110B, the headlamps 120A through 120D, and the headlamps 140A and 140B (laser illumination), each of which can achieve a high luminance, a high luminous flux, and a long life.

Modification

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

For instance, a high-output LED may be used as the excitation light source. In this case, a light emitting device which emits white light can be achieved by combining a LED which emits light having a wavelength of 450 nm (blue color) with yellow fluorescent material or with green and red fluorescent material.

Moreover, a solid laser other than the laser diode may be used as the excitation light source. However, it is preferable that the laser diode be used since the laser diode allows for reducing size of the excitation light source.

The present invention may also be expressed as follows:

Namely, a high-luminance light source of the present invention includes: an excitation light source including a laser diode capable of high-output emission; a light emitting section having a substantially rectangular shape long in a horizontal direction, emitting light by being effected by excitation light emitted from the excitation light source; and a light guiding member configured to evenly (not lopsided to one part) excite the substantially rectangular shaped light emitting section.

The light guiding member is optically joint to one or a plurality of excitation light sources, and is a light guiding member whose other end has a plurality of light emitting ends. The plurality of light emitting ends are (densely) arranged on one plane (substantially rectangular shaped plane) of the substantially rectangular shaped light emitting section.

Moreover, a light emitting device of the present invention may include: an excitation light source group emitting a plurality of beams of excitation light; a light emitting section emitting light upon irradiation with the plurality of beams of excitation light emitted from the excitation light source group; a first light guiding member guiding the beams of excitation light emitted from the excitation light source group and entered via one end of the first light guiding member to a predetermined light emitting part provided on the other end of the first light guiding member, and emitting the beams of the excitation light from the light emitting part; and a second light guiding member emitting the beams of the excitation light guided by the first light guiding member and emitted via the light emitting part of the first light guiding member to a predetermined light irradiation region of the light emitting section, in a dispersing manner.

According to the configuration, the excitation light source group emits a plurality of beams of excitation light. This allows for increasing a luminous flux of the excitation light source group as compared to using a single excitation light source.

Moreover, the light emitting section emits light upon irradiation with the beams of excitation light that are emitted from the excitation light source group. Accordingly, the light emitting section includes at least fluorescent material which emits light upon irradiation with the beams of the excitation light.

Moreover, the first light guiding member guides the beams of excitation light emitted from the excitation light source group and entered from one end of the first light guiding member, to a predetermined light emitting part provided on the other end of the first light guiding member, and emits the guided beams of excitation light via the light emitting part.

By thus adjusting a size of the first light guiding member from one end thereof to the other end thereof, the excitation light source group is spatially separated apart from the light emitting section with an arbitrary interval provided therebetween. This allows for preventing deterioration of the light emitting section due to the light emitting section being effected by heat generated at the excitation light source group.

Moreover, according to the configuration, the second light guiding member irradiates a predetermined light irradiation region of the light emitting section with the beams of excitation light emitted via the light emitting part of the first light guiding member, in a dispersed manner.

Since the light irradiation region of the light emitting section is irradiated with the beams of excitation light in a dispersed manner, electrons in a low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single excitation light source.

Moreover, according to the configuration, the light emitting section is not irradiated with the beams of excitation light by being focused on one point, but is irradiated with the beams of excitation light in a dispersed manner via the first light guiding member and the second light guiding member. Hence, it is possible to prevent the light emitting section from deterioration caused by the light emitting section being irradiated with the beams of excitation light so that the beams of excitation light are focused on a single point.

According to the above, it is possible to provide a light emitting device and like device which can achieve a high luminance and a long life.

Moreover, the light emitting device of the present invention may be configured in such a manner that the first light guiding member has a surrounded structure in which the first light guiding member is configured so as to be surrounded by a light reflecting lateral surface, the surrounded structure allowing the beams of excitation light entered via one end of the first light guiding member to be guided toward the light emitting part, and the light emitting part having a cross section smaller than that of the one end of the first light guiding member.

According to the configuration, the surrounded structure of the light reflecting lateral surface allows the beams of excitation light entered via one end of the structure to be guided to the light emitting part that has a cross section smaller than that of the one end of the structure. Namely, the surrounded structure allows for converging the beams of excitation light to the light emitting part which has a cross section smaller than that of the one end of the structure.

Hence, reduction of both the cross sectional area of the light emitting part and the size of the light emitting section (light irradiation region) allows for reducing the size of the light emitting section which emits light having a high luminance and a high luminous flux in accordance with the number of excitation light sources included in the excitation light source group.

Moreover, in addition to the foregoing configuration, the light emitting device of the present invention may be configured in such a manner that the first light guiding member includes a plurality of optical fibers, and each of the beams of excitation light enters one end of a corresponding one of the optical fibers and is emitted via the other end of that optical fiber, and the light emitting part is a part in which the other ends of the plurality of optical fibers are arranged.

According to the configuration, each of the beams of excitation light enter one end of a corresponding one of the plurality of optical fibers, and is guided to a part in which the other ends of the plurality of optical fibers are arranged (light emitting part), with a simple configuration in which the first light guiding member includes the plurality of optical fibers.

Moreover, although dependent on the thickness and number of the optical fibers, even if a plurality of optical fibers are bundled together, a total thickness of the bundle generally would not become so thick.

Accordingly, it is possible to irradiate the light irradiation region of the light emitting section of a small size with excitation light originated from a multiple number of excitation light sources, while maintaining the size of the light emitting part and the light irradiation region (or light emitting section) small.

Moreover, for example, in a case where the light emitting device of the present invention is used as a head lamp, a hole is opened in a center of the reflecting mirror, and the bundle of the plurality of optical fibers is passed through the hole to irradiate the light emitting section with the beams of excitation light from the part in which the other ends of the plurality of optical fibers are arranged. Hence, even if the number of the excitation light sources included in the excitation light source group increases in number, light reflection efficiency of the reflecting mirror will not deteriorate as with the lamps disclosed in Patent Literatures 1 and 2.

Moreover, in addition to the above configuration, the light emitting device of the present invention may be configured in such a manner that the light irradiation region is shaped long in a horizontal direction, and that the second light guiding member includes a planoconvex cylindrical lens whose axis runs in a vertical direction.

By configuring the second light guiding member with a planoconvex cylindrical lens whose axis runs in a vertical direction, it is possible to disperse the excitation light in a horizontal direction.

This allows for irradiating the light irradiation region with the beams of excitation light in a dispersed manner, in accordance with the shape of the light irradiation region which is long in the horizontal direction.

Moreover, the light emitting device of the present invention may be configured in such a manner that the light irradiation region is shaped long in a horizontal direction and so that its diameter in a vertical direction is linearly changeable with respect to the horizontal direction, and the second light guiding member is a combination of a first planoconvex cylindrical lens whose axis runs in the vertical direction and a second planoconvex cylindrical lens whose axis runs in the horizontal direction.

By configuring the second light guiding member as a combination of the first planoconvex cylindrical lens whose axis runs in the vertical direction and a second planoconvex cylindrical lens whose axis runs in the horizontal direction, it is possible to irradiate the light irradiation region with the beams of excitation light in such a manner that the beams of excitation light are dispersed so as to suit the size of the light irradiation region in the horizontal direction and in the vertical direction.

Moreover, the light emitting device of the present invention may include: an excitation light source group emitting a plurality of beams of excitation light; a light emitting section emitting light upon irradiation with the beams of excitation light emitted from the excitation light source group; and a light guiding member guiding the beams of excitation light emitted from the excitation light source group and which enter one end of the light guiding member to the other end of the light guiding member, the other end of the light guiding member having a light dispersing section configured to irradiate a predetermined light irradiation region of the light emitting section with the guided beams of excitation light in a dispersing manner.

According to the configuration, the excitation light source group emits a plurality of beams of excitation light. This increases a luminous flux of the excitation light source group as compared to using a single excitation light source.

Moreover, the light emitting section emits light upon irradiation with the beams of excitation light that are emitted from the excitation light source group. Accordingly, the light emitting section includes at least fluorescent material which emits light by being irradiated with the beams of excitation light.

Moreover, the light guiding member guides the beams of excitation light that is emitted from the excitation light source group and entered via one end of the light guiding member, to the other end of the light guiding member.

Furthermore, the other end of the light guiding member has a light dispersing section which irradiates a predetermined light irradiation region of the light emitting section with the guided beams of excitation light dispersed toward the light emitting section.

By thus adjusting a size of the light guiding member from one end thereof to the other end thereof, the excitation light source group is spatially separated apart from the light emitting section with an arbitrary interval provided therebetween. This allows for preventing deterioration of the light emitting section due to the light emitting section being effected by heat generated by the excitation light source group.

Moreover, since the light irradiation region of the light emitting section is irradiated with the beams of excitation light in a dispersed manner from the light dispersed section, electrons in the low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single excitation light source.

Moreover, according to the configuration, the light emitting section is not irradiated with the beams of excitation light by being focused on one point but is irradiated with the beams of excitation light in a dispersed manner via the light guiding member. Hence, it is possible to prevent the light emitting section from deteriorating caused by the light emitting section being irradiated with the beams of excitation light so that the beams of excitation light are focused on a single point.

The light emitting device of the present invention may be configured in such a manner that the excitation light source group includes a plurality of laser diodes, and the beams of excitation light may be laser beams emitted from corresponding laser diodes.

Moreover, the light emitting device of the present invention may be configured in such a manner that the excitation light source group is made up of a single laser diode having a plurality of laser beam emitting ends, and the beams of excitation light are laser beams that are emitted from corresponding laser beam emitting ends.

Moreover, the light emitting device of the present invention may be configured in such a manner that the light emitting section includes oxynitride fluorescent material.

Moreover, the light emitting device of the present invention may be configured in such a manner that the light emitting part emits light having a luminance of at least 80 Mcd/m$^2$.

Moreover, the light emitting device of the present invention may be configured in such a manner that the light emitting section emits light having a luminous flux of not less than 700 lm but not more than 3200 lm.

Moreover, the light emitting device of the present invention may be configured in such a manner that the light emitting section is shaped in accordance with a cut line that determines a terminator of a light distribution pattern of light emitted from the light emitting section.

The present invention may also be expressed by the following method:

A light emitting method of the present invention is a method of causing emission of light upon irradiation of a predetermined light emitting section, by guiding a plurality of beams of excitation light emitted from a predetermined excitation light source group to a predetermined light emitting part, and emitting the guided beams of excitation light via the light emitting part, the method including the steps of: (a) causing emission of a plurality of beams of excitation light from the excitation light source group; (b) guiding the plurality of beams of excitation light emitted in step (a) to the light emitting part; (c) emitting the plurality of beams of excitation light guided in step (b) via the light emitting part; and (d) irradiating a predetermined light irradiation region of the light emitting section with the plurality of beams of excitation light emitted via the light emitting part in step (c), in a dispersed manner.

Moreover, the light emitting method of the present invention is a method of causing emission of light upon irradiation of a predetermined light emitting section, by guiding a plurality of beams of excitation light emitted from a predetermined excitation light source group to a predetermined light dispersing section, and irradiating the predetermined light emitting section with the guided excitation light emitted via the light dispersing section, the method including the steps of: (a) causing the excitation light source group to emit the plurality of beams of excitation light; (b) guiding the plurality of beams of excitation light emitted in step (a) to the light dispersing section; and (c) irradiating a predetermined light irradiation region of the light emitting section with the plurality of beams of excitation light guided in step (b) via the light dispersed section, in a dispersed manner.

Moreover, the light emitting method of the present invention is a method of causing emission of light by guiding a plurality of beams of excitation light emitted from a predetermined excitation light source group to a vicinity of a predetermined light emitting section, and irradiating a predetermined light irradiation region of the light emitting section with the guided plurality of beams of excitation light, the method including the steps of: (a) causing the excitation light source group to emit the plurality of beams of excitation light; (b) guiding the plurality of beams of excitation light emitted in step (a) to the vicinity of the light emitting section; and (c) irradiating the light irradiation region with the plurality of beams of excitation light guided in step (b), in a dispersed manner.

Moreover, a light emitting device (high-luminance light source) of the present invention may include: an excitation light source including a laser diode capable of high output laser emission; a light emitting section having a substantially rectangular shape long in the horizontal direction, emitting light by being effected by excitation light emitted from the excitation light source; and a light guiding member configured to evenly (not lopsided to one part) excite the substantially rectangular shaped light emitting section.

Moreover, the light guiding member may be configured so as to be optically joint to one or a plurality of excitation light sources, and includes (i) a first light guiding member whose other end has one light emitting end and (ii) a second light guiding member including a substantially cylindrical lens for evenly irradiating the light emitting section with excitation light emitted from the first light guiding member.

The second light guiding member may be of a shape combining a plurality of substantially cylindrical lens.

Moreover, not only a laser diode but also a high-output light emitting diode may serve as the excitation light source.

Moreover, the laser diode can not only be a laser diode which has one laser beam emitting end per one excitation light source (one chip), but may also be a laser diode which has a plurality of laser beam emitting ends per one excitation light source (one chip).

Moreover, a light emitting device (high-luminance light source) of the present invention may include: a laser beam source including a laser diode capable of high output laser emission; a light emitting section having a substantially rectangular shape long in the horizontal direction, emitting light by being effected by a laser beam emitted from the laser beam source; and a light guiding member configured to evenly (not lopsided to one part) excite the substantially rectangular shaped light emitting section.

Moreover, the light guiding member may be configured optically joint to one or a plurality of excitation light sources, and includes (i) a first light guiding member whose other end has one light emitting end and (ii) a second light guiding member including a substantially cylindrical lens for evenly irradiating the light emitting section with a laser beam emitted from the first light guiding member.

The second light guiding member may be of a shape combining a plurality of substantially cylindrical lens.

Moreover, the laser diode can not only be a laser diode which has one laser beam emitting end per one laser beam source (one chip), but may also be a laser diode which has a plurality of laser beam emitting ends per one laser beam source (one chip).

Moreover, the light emitting device of the present invention may include: a laser beam source group emitting a plurality of laser beams; a light emitting section emitting light upon irradiation with the laser beams emitted from the laser beam source group; a first light guiding member guiding the plurality of laser beams emitted from the laser beam source group and entered via one end of the first light guiding member to a predetermined light emitting part provided on the other end of the first light guiding member, and emitting the guided laser beams via the light emitting part; and a second light guiding member irradiating a predetermined light irradiation region of the light emitting section with the plurality of laser beams emitted via the light emitting part of the first light guiding member, in a dispersed manner.

According to the configuration, the laser beam source group emits a plurality of laser beams. This allows for increasing the luminous flux of the laser beam source group as compared to a case where a single laser beam source is used.

Moreover, the light emitting section emits light upon irradiation with the laser beams emitted from the laser beam source group. Accordingly, the light emitting section at least includes fluorescent material which emits light upon irradiation with the laser beams.

Moreover, the first light guiding member guides the laser beams emitted from the laser beam source group and entered via one end of the first light guiding member to a predetermined light emitting part provided on the other end of the first light guiding member, and emits the guided laser beams via the light emitting part.

By thus adjusting a size of the first light guiding member from one end thereof to the other end thereof, the laser beam source group is spatially separated apart from the light emitting section with an arbitrary interval provided therebetween. This allows for preventing deterioration of the light emitting section due to the light emitting section being effected by heat generated by the laser beam source group.

Moreover, according to the configuration, the second light guiding member irradiates a predetermined light irradiation region of the light emitting section with the laser beams emitted from the light emitting part of the first light guiding member, in a dispersed manner.

Since the light irradiation region of the light emitting section is irradiated with the laser beams in a dispersed manner, electrons in a low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single laser beam source.

Moreover, according to the configuration, the light emitting section is not irradiated with the laser beams by being focused on one point, but is irradiated with the laser beams in a dispersed manner via the first light guiding member and the second light guiding member. Hence, it is possible to prevent the light emitting section from deteriorating caused by the light emitting section being irradiated with the laser beams so that the laser beams are focused on a single point.

According to the above, it is possible to provide a light emitting device and like device which can achieve a high luminance and a long life.

Moreover, the light emitting device of the present invention may be configured in such a manner that the first light guiding member has a surrounded structure in which the first light guiding member is configured so as to be surrounded by a light reflecting lateral surface, the surrounded structure allowing the laser beams entered via one end of the first light guiding member to be guided to the light emitting part, and the light emitting part having a cross section smaller than that of the one end of the first light guiding member.

According to the configuration, the surrounded structure of the light reflecting lateral surface allows the laser beams entered via one end of the structure to be guided to the light emitting part that has a cross section smaller than that of the one end of the structure. Namely, the surrounded structure allows for converging the laser beams to the light emitting part which has a cross section smaller than that of the one end of the structure.

Hence, reduction of both the cross sectional area of the light emitting part and the size of the light emitting section (light irradiation region) allows for reducing the size of the light emitting section which emits light having a high luminance and a high luminous flux in accordance with the number of laser beam sources included in the laser beam source group.

Moreover, the light emitting device of the present invention may be configured in such a manner that the first light guiding member includes a plurality of optical fibers, and each of the laser beams enters one end of a corresponding one of the optical fibers and is emitted via the other end of that optical fiber, and the light emitting part is a part in which the other end of the plurality of optical fibers are arranged.

According to the configuration, each of the laser beams enter one end of a corresponding one of the plurality of optical fibers, and is guided to a part in which the other ends of the plurality of optical fibers are arranged (light emitting part), with a simple configuration in which the first light guiding member includes the plurality of optical fibers.

Moreover, although dependent on the thickness and number of the optical fibers, even if a plurality of optical fibers are bundled together, a total thickness of the bundle generally would not become so thick.

Accordingly, it is possible to irradiate the light irradiation region of the light emitting section of a small size with laser beams originated from a multiple number of laser beam sources, while maintaining the size of the light emitting part and the light irradiation region (or light emitting section) small.

Moreover, for example, in a case where the light emitting device of the present invention is used as a headlamp, a hole is opened in a center of the reflecting mirror, and the bundle of the plurality of optical fibers is passed through the hole to irradiate the light emitting section with the excitation light from the part in which the other ends of the plurality of optical fibers are arranged. Hence, even if the number of the laser beam sources included in the laser beam source group increases in number, light reflection efficiency of the reflecting mirror will not deteriorate as with the lamps disclosed in Patent Literatures 1 and 2.

Moreover, the light emitting device of the present invention may include: a laser beam source group emitting a plurality of laser beams; a light emitting section emitting light upon irradiation with the laser beams emitted from the laser beam source group; and a light guiding member guiding the laser beams emitted from the laser beam source group and entered via one end of the light guiding member to the other end of the light guiding member, the other end of the light guiding member having a light dispersing section configured to irradiate a predetermined light irradiation region of the light emitting section with the guided laser beams in a dispersing manner.

According to the configuration, the laser beam source group emits a plurality of laser beams. This allows for increasing a luminous flux of the laser beam source group as compared to using a single laser beam source.

Moreover, the light emitting section emits light upon irradiation with the laser beams that are emitted from the laser beam source group. Accordingly, the light emitting section includes at least fluorescent material which emits light by being irradiated with the laser beams.

Moreover, the light guiding member guides the laser beams that is emitted from the laser beam source group and entered via one end of the light guiding member, to the other end of the light guiding member.

Furthermore, the other end of the light guiding member has a light dispersing section which irradiates a predetermined light irradiation region of the light emitting section with the guided laser beams dispersed toward the light emitting section.

By thus adjusting a size of the light guiding member from one end thereof to the other end thereof, the laser beam source group is spatially separated apart from the light emitting section with an arbitrary interval provided therebetween. This allows for preventing deterioration of the light emitting section due to the light emitting section being effected by heat generated at the laser beam source group.

Moreover, since the light irradiation region of the light emitting section is irradiated with the laser beams in a dispersed manner from the light dispersed section, electrons in the low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single excitation light source.

Moreover, according to the configuration, the light emitting section is not irradiated with the laser beams by being focused on one point, but is irradiated with the laser beams in a dispersed manner via the light guiding member. Hence, it is possible to prevent the light emitting section from deteriorating caused by the light emitting section being irradiated with the laser beams so that the laser beams are focused on a single point.

Moreover, the light emitting device of the present invention may be configured in such a manner that the laser beam source group includes a plurality of laser diodes, and the laser beams may be laser beams emitted from corresponding laser diodes.

Moreover, the light emitting device of the present invention may be configured in such a manner that the laser beam source group is made up of a single laser diode having a plurality of laser beam emitting ends, and the laser beams are laser beams that are emitted from corresponding laser beam emitting ends.

The present invention may also be expressed by the following methods:

A light emitting method of the present invention is a method of causing emission of light upon irradiation of a predetermined light emitting section, by guiding a plurality of laser beams emitted from a predetermined laser beam source group to a predetermined light emitting part, and emitting the guided laser beams via the light emitting part, the method including the steps of: (a) causing emission of a plurality of laser beams from the laser beam source group; (b) guiding the plurality of laser beams emitted in step (a) to the light emitting part; (c) emitting the plurality of laser beams guided in step (b) via the light emitting part; and (d) irradiating a predetermined light irradiation region of the light emitting section with the plurality of laser beams emitted via the light emitting part in step (c), in a dispersing manner.

Moreover, the light emitting method of the present invention is a method of causing emission of light upon irradiation of a predetermined light emitting section, by guiding a plurality of laser beams emitted from a predetermined laser beam source group to a predetermined light dispersing section, and irradiating the predetermined light emitting section with the guided laser beams emitted via the light dispersing section, the method including the steps of: (a) causing the laser beam source group to emit a plurality of laser beams; (b) guiding the plurality of laser beams emitted in step (a) to the light dispersing section; and (c) irradiating a predetermined light irradiation region of the light emitting section with the plurality of laser beams guided in step (b), via the light dispersed section a dispersing manner.

Moreover, the light emitting method of the present invention is a method of causing emission of light by guiding a plurality of laser beams emitted from a predetermined laser beam source group to a vicinity of a predetermined light emitting section, and irradiating a predetermined light irradiation region of the light emitting section with the guided plurality of laser beams, the method including the steps of: (a) causing the laser beam source group to emit a plurality of laser beams; (b) guiding the plurality of laser beams emitted in step (a) to the vicinity of the light emitting section; and (c) irradiating the light irradiation region with the plurality of laser beams guided in step (b), in a dispersing manner.

Moreover, the light emitting device of the present invention may include: an (single or plurality of) excitation light source configured to emit excitation light; a light guiding section (light guiding member, optical system) having (i) at least one entering end receiving the excitation light emitted from the excitation light source and (ii) a plurality of emitting ends emitting the excitation light entered via the at least one entering end; and a light emitting section configured to emit light upon irradiation with the excitation light emitted via the plurality of emitting ends, the light emitting section being irradiated with the beams of the excitation light that are emitted from the plurality of emitting ends so that each of a part of the beams of the excitation light having a strongest light intensity in its light intensity distribution is emitted on portions on the light emitting section different from that of other beams.

According to the configuration, the excitation light emitted from the excitation light source enters the entering end of the light guiding section and is emitted via the plurality of emitting ends of the light guiding section. Upon irradiation of the light emitting section with this excitation light, the light emitting section emits light. At this time, each of the excitation light emitted from the plurality of emitting ends is emitted to the light emitting section in such a manner that each of a part of the beams of the excitation light having a strongest light intensity in its light intensity distribution is emitted on portions on the light emitting section different from that of other beams. In other words, the excitation light emitted from the plurality of emitting ends are emitted toward the light emitting part in a dispersed manner.

This allows for reducing the possibility that the light emitting section remarkably deteriorates caused by the light emitting section being irradiated with the excitation light at one focused position, and thus can achieve a long life light source without reducing a luminous flux of the emitted light. Moreover, there is no need to reduce the intensity of the excitation light with which the light emitting section is irradiated; hence, it is possible to increase the luminance and luminous flux of the light emitting device. Accordingly, a small and high-luminance light emitting device can be achieved.

Moreover, the light emitting section may further have a light receiving plane for receiving the excitation light from the excitation light source, and includes a supporting section configured to support the plurality of emitting ends in a predetermined pattern with respect to the light receiving plane.

According to the configuration, the supporting section supports the plurality of emitting ends provided in the light guiding section to be in a predetermined pattern with respect to the light receiving plane of the light emitting section. Hence, it is possible to determine a position of the plurality of emitting ends in a predetermined pattern with respect to the plane of the light emitting section, even if a relative position of the emitting ends and the light emitting part are variable for reasons such as that the light guiding section is flexible.

As a result, a plurality of shadow images formed on the light receiving plane by the light emitted via the plurality of emitting ends form a predetermined pattern. By setting this predetermined pattern as appropriate in accordance with a purpose of the light emitting device, it is possible to cause the light emitting section to emit light in a preferable state. For instance, this allows for causing the entire light emitting part to evenly emit light, or allows for causing the light emitting section to emit light stronger in one part of the light emitting section than other parts of the light emitting section.

Moreover, the light receiving plane has a long axis, and at least a part of the plurality of emitting ends may be arranged along the long axis.

A light distribution pattern of a vehicle headlamp is narrow in the vertical direction and long in the horizontal direction. According to the configuration, the light emitting section having the long axis is excited by the plurality of emitting ends arranged along the long axis; this thus achieves the light distribution pattern. The setting of the light distribution pattern is carried out in accordance with the shape of the light emitting section and the disposition of the plurality of emitting ends. As a result, it is possible to more easily achieve the light distribution pattern as compared to the conventional technique.

Moreover, a density of the emitting ends disposed with respect to the light receiving plane may be lopsided on the light receiving plane.

According to the configuration, it is possible to cause the light emitting section to emit light stronger in one part than other parts of the light emitting section. This allows for increasing luminosity of one part of the pencil of rays emitted from the light emitting device. For instance, in a case where the present invention is applied to a headlamp for a car, it is possible to improve illumination intensity of a part of a region which is irradiated by the headlamp.

Moreover, the light guiding section may be flexible.

According to the configuration, the light guiding section is a flexible member, for example, optical fiber. This allows for easy modification of positional relationship between the entering end and the emitting ends, and further easy modification of the positional relationship between the excitation light source and the light emitting section. As a result, it is possible to increase freedom in design of the light emitting device.

Moreover, an illuminating device according to the present invention may include: the light emitting device; and a reflecting mirror which forms a pencil of rays traveling within a predetermined solid angle as a result of the reflecting mirror reflecting the light emitted from the light emitting section.

According to the configuration, the light emitted from the light emitting section is reflected off the reflecting mirror, so as to form a pencil of rays that travels within a predetermined solid angle. Hence, it is possible to achieve a small-sized illuminating device with high-luminance and long life, suitable for vehicle headlamps and searchlights.

Moreover, a vehicle headlamp according to the present invention may include: the light emitting device; and a reflecting mirror which forms a pencil of rays traveling within a predetermined solid angle as a result of the reflecting mirror reflecting the light emitted from the light emitting section.

According to the configuration, the light emitted from the light emitting section is reflected off the reflecting mirror, so as to form a pencil of rays that travels within a predetermined solid angle. Hence, it is possible to achieve a small-sized vehicle headlamp having a high-luminance and a long life.

Moreover, a light emitting device of the present invention may include: an excitation light source group emitting a plurality of beams of excitation light; a light emitting section emitting light upon irradiation with the plurality of beams of excitation light emitted from the excitation light source group; a first optical system (optical system) configured to guide the beams of excitation light emitted from the excitation light source group to a vicinity of the light emitting section; and a second optical system (optical system) configured to irradiate the beams of excitation light guided by the first optical system to a predetermined light irradiation region (light receiving plane) on the light emitting section in a dispersed manner.

According to the configuration, the excitation light source group emits a plurality of beams of excitation light. This allows for increasing a luminous flux of the excitation light source group as compared to using a single excitation light source.

Moreover, the light emitting section emits light upon irradiation with the beams of excitation light that are emitted from the excitation light source group. Accordingly, the light emitting section includes at least fluorescent material which emits light upon irradiation with the beams of the excitation light.

Moreover, the first optical system guides the beams of excitation light emitted from the excitation light source group to the vicinity of the light emitting section.

By thus adjusting a distance in the first optical system from where the beams of excitation light enter to where the beams of excitation light are guided, the excitation light source group is spatially separated apart from the light emitting section with an arbitrary interval provided therebetween. This allows for preventing deterioration of the light emitting section due to the light emitting section being effected by heat generated by the excitation light source group.

Moreover, according to the configuration, the second optical system irradiates a predetermined light irradiation region of the light emitting section with the beams of excitation light guided by the first optical system, in a dispersed manner.

Since the light irradiation region of the light emitting section is irradiated with the beams of excitation light in a dispersed manner, electrons in a low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single excitation light source.

Moreover, according to the configuration, the light emitting section is not irradiated with the beams of excitation light by being focused on one point, but the light irradiation region is irradiated with the beams of excitation light in a dispersed manner via the first optical system and the second optical system. Hence, it is possible to prevent the light emitting section from deteriorating caused by the light emitting section being irradiated with the beams of excitation light so that the beams of excitation light are focused on a single point.

According to the above, it is possible to provide a light emitting device and like device which can achieve a high luminance and a long life.

In the present invention, the "first optical system" may be for example made up of a single optical component which guides the beams of excitation light entered via one end of the single optical component to the other end of the single optical component, or may be made up of a plurality of optical components such as, for example a combination of a first optical component and a second optical component, in which the beams of excitation light entered via one end of the first optical component is guided to the other end of the first optical component and thereafter the guided beams of excitation light are emitted from the other end of the first optical component, and the beams of excitation light that is emitted from the other end of the first optical component and which is entered via one end of the second optical component is guided to the other end of the second optical component.

Moreover, the "second optical system" may be any optical system as long as the "second optical system" is a member that irradiates the light irradiation region with the beams of excitation light in a dispersed manner, which beams of excitation light is guided by the first optical system. For instance, the second optical system may be a single optical component which is capable of irradiating the light irradiation region with the beams of excitation light in a dispersed manner, which beams of excitation light are guided by the first optical system, or the second optical system may be made up of a plurality of optical components such as an optical system in which the light irradiation region is irradiated with the beams of excitation light in a dispersed manner by use of two lenses, which beams of excitation light is guided by the first optical system.

Moreover, as in the example described above, the first optical system and the second optical system may be made up of two or more independent optical components, or may be made up of one integrated optical component such as a "light guiding member" later described.

The "excitation light source group" may be a member in which a plurality of excitation light sources are provided spatially separate from each other, or may be a member in which a plurality of excitation light sources are integrated as one.

Moreover, the excitation light sources included in the excitation light source group may be one which emits a coherent laser beam such as an LD, or alternatively may be one which emits incoherent excitation light such as an LED.

The excitation light source group may include just either of the LDs or LEDs, or may include a mixture of the LDs and LEDs.

As described above, the "light emitting section" at least includes fluorescent material. The "light emitting section" can be made up of just a single type of fluorescent material or may be made up of plurality types of fluorescent material. Alternatively, the light emitting section may be made up by dispersing a single type or a plurality of types of fluorescent material in an appropriate dispersion medium.

The "fluorescent material" is a substance which emits fluorescence that has a different wavelength from that of the excitation light. The fluorescence is emitted upon transition of electrons in a high-energy state to a low-energy state, which electrons are excited to the high-energy state from the low-energy state upon irradiation with the excitation light.

Moreover, "irradiate in a dispersed manner" denotes irradiating an entire light irradiation region with the excitation light and not irradiating by focusing on a specific one point of the light irradiation region.

In other words, "irradiate in a dispersed manner" denotes irradiating the entire light irradiation region so that the light emitting section is not caused to be excited at a pinpoint, with excitation light having an intensity that does not cause deterioration of the light emitting section. As long as the intensity is of a degree that does not cause deterioration the light emitting section, the strength of the light intensity distribution when the excitation light is emitted may be of a certain degree.

At times, the "dispersion of light" may denote a separation of a beam to a plurality of beams having a plurality of hues, by use of a prism or the like. However, in the specification of the present application, "dispersion" is not used to express this meaning.

Moreover, the term "irradiate in a dispersed manner" encompasses any of the following cases: (i) a case where the light irradiation region is irradiated with the excitation light while a light irradiated area is kept substantially constant, (ii) a case where the light irradiation region is irradiated with the excitation light while the light irradiated area is expanded, and (iii) a case where the light irradiation region is irradiated with the excitation light while the light irradiated area is reduced.

Moreover, the light emitting device of the present invention may be configured in such a manner that the first optical system has a surrounded structure in which the first optical system is configured so as to be surrounded by a light reflecting lateral surface, the surrounded structure allowing the beams of excitation light entered via one end of the first optical system to be guided toward the other end of the first optical system, which the other end of the first optical system has a cross section smaller than that of the one end of the first optical system.

According to the configuration, the structure surrounded by the light reflecting lateral surface allows for guiding the beams of excitation light entered via one end of the first optical system to the other end of the first optical system having a cross section smaller than that of the one end. Namely, the surrounded structure allows for converging the beams of excitation light to the other end of the first optical system which has the cross section smaller than that of the one end.

Hence, reduction of both the cross sectional area of the other end of the first optical system and the size of the light emitting section (light irradiation region) allows for reducing the size of the light emitting section which emits light having a high luminance and high luminous flux in accordance with the number of excitation light sources included in the excitation light source group.

In the specification, "surrounded" denotes to surround all optical paths of the beams of excitation light emitted from the excitation light group.

Moreover, the "surrounded structure allowing the beams of excitation light to be guided toward the other end of the first optical system" includes any of the following cases: (i) a case where light is reflected just once off the light reflecting lateral surface to be guided toward the other end of the first optical system; (ii) a case where light is reflected several times off the light reflecting lateral surface to be guided toward the other end of the first optical system; and (iii) a case where the light reflecting lateral surface never reflects light to guide the light toward the other end of the first optical system.

Although the lamps disclosed in Patent Literatures 1 and 2 are considered in view of achieving a high luminance by irradiating fluorescent material with beams of excitation light emitted from the plurality of excitation light sources, since the excitation light is guided by use of condenser lenses that are provided per excitation light source, a secondary problem arises that as the number of the excitation light sources increases, the lamp increases in size.

Moreover, with the lamps, holes are opened to the reflecting mirror for each of beams of excitation light, and the fluorescent material is irradiated by having each of the beams of excitation light be passed through a respective one of the holes. Hence, this causes another secondary problem that as the number of the excitation light sources increases, the light reflection efficiency of the reflecting mirror decreases.

In order to solve these secondary problems, a light emitting device of the present invention may be configured in such a manner that the first optical system includes a plurality of optical fibers, and each of the beams of excitation light enters one end of a corresponding one of the optical fibers and is guided to the other end of that optical fiber, and a part of the first optical system to which the beams of excitation light is guided is a part in which the other end of the plurality of optical fibers are arranged.

According to the configuration, each of the beams of excitation light enter a corresponding one of one ends of the plurality of optical fibers and is guided to a part in which the other ends of the plurality of optical fibers are arranged (part of the first optical system to which the excitation light is guided), with a simple configuration in which the first optical system includes the plurality of optical fibers.

Moreover, although dependent on the thickness and number of the optical fibers, even if a plurality of optical fibers are bundled together, a total thickness of the bundle generally would not become so thick.

Accordingly, it is possible to irradiate the light irradiation region of the light emitting section of a small size with excitation light originated from a multiple number of excitation light sources, while maintaining the size of the part in which the other end of the plurality of optical fibers are arranged (part of the first optical system to which the beams of excitation light is guided) and the light irradiation region (or light emitting section) small.

Moreover, for example, in a case where the light emitting device of the present invention is used as a headlamp, a hole is opened in a center of the reflecting mirror, and the bundle of the plurality of optical fibers is passed through the hole to irradiate the light emitting section with the beams of excitation light from the part in which the other ends of the plurality of optical fibers are arranged. Hence, even if the number of the excitation light sources included in the excitation light source group increases in number, light reflection efficiency of the reflecting mirror will not deteriorate as with the lamps disclosed in Patent Literatures 1 and 2.

Moreover, the light emitting device of the present invention may be configured in such a manner that the light irradiation region is shaped long in the horizontal direction, and the second optical system includes at least a convex lens having a convex plane whose axis runs in the vertical direction.

Even if the spreading of the beams of excitation light in the horizontal direction is wider than the width of the light irradiation region in the horizontal direction, it is possible to irradiate the light irradiation region with the beams of excitation light in a dispersed manner in the horizontal direction, in accordance with the width of the light irradiation region in the horizontal direction, by configuring the second optical system with the convex lens having a convex plane whose axis runs in the vertical direction.

Hence, it is possible to irradiate the light irradiation region with the beams of excitation light in a dispersed manner, in accordance with the shape of the light irradiation region which is long in the horizontal direction.

Examples of the "convex lens having a convex plane whose axis runs in the vertical direction" include, for example, a biconvex lens, a planoconvex lens, a convex meniscus lens and like lens, each of which has an axis thereof running in the vertical direction.

Moreover, the light emitting device of the present invention may be configured in such a manner that the light irradiation region is shaped so that a diameter of the light irradiation region in the vertical direction is linearly changeable with respect to the horizontal direction, and the second optical system is a combination of a convex lens having a convex plane whose axis runs in the vertical direction and a convex lens having a convex plane whose axis runs in the horizontal direction.

Even if the shape of the light irradiation region is of a shape whose diameter in the vertical direction is linearly changeable with respect to the horizontal direction, it is possible to irradiate the light irradiation region with the beams of excitation light in such a manner that the beams of excitation light are dispersed so as to suit the size of the light irradiation region in the horizontal direction and the vertical direction, by configuring the second optical system as a combination of (i) the convex lens having a convex plane whose axis runs in the vertical direction and (ii) a convex lens having a convex plane whose axis runs in the horizontal direction.

Examples of the "convex lens having a convex plane whose axis runs in the horizontal direction" include, for example, a biconvex lens, a planoconvex lens, a convex meniscus lens or like lens, which lens has an axis running in the horizontal direction.

In a case where the convex lens having the convex plane whose axis runs in the vertical direction and the convex lens having the convex plane whose axis runs in the horizontal direction are separate convex lenses, the "combination of convex lenses" may be a combination in which optical axes of these convex lenses coincide each other. Alternatively, the convex lens having the convex plane whose axis runs in the vertical direction and the convex lens having the convex plane whose axis runs in the horizontal direction may be integrated as one so that the lenses cannot be separated from each other.

Moreover, the light emitting device of the present invention may be configured in such a manner that the first optical system and the second optical system are integrated as one to serve as a light guiding member, the plurality of beams of excitation light emitted from the excitation light source group and entering one end of the light guiding member of the first optical system are guided to the other end of the light guiding member of the second optical system, the other end of the light guiding member of the second optical system having a light dispersing section configured to irradiate the light irradiation region with the guided plurality of beams of excitation light in a dispersed manner.

According to the configuration, the light guiding member is one which the first optical system and the second optical system are integrated as one member. Hence, it is possible to reduce the number of components in the optical system and reduce the size of the entire optical system.

Moreover, the beams of excitation light emitted from the excitation light source group and entering one end of the light guiding member of the first optical system is guided to the other end of the light guiding member of the second optical system.

Furthermore, the other end of the second optical system has the light dispersing section formed, which light dispersing section irradiates the light irradiation region with the guided beams of excitation light in a dispersed manner.

By thus adjusting the size of the light guiding member from one end thereof to the other end thereof, the excitation light source group is spatially separated apart from the light emitting section with an arbitrary interval provided therebetween. This allows for preventing deterioration of the light emitting section due to the light emitting section being effected by heat generated by the excitation light source group.

Moreover, since the light irradiation region of the light emitting section is irradiated with the beams of excitation light from the light dispersing section in a dispersed manner, electrons in a low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single excitation light source.

Moreover, according to the configuration, the light irradiation region is not irradiated with the beams of excitation light by being focused on one point, but is irradiated with the beams of excitation light in a dispersed manner via the light guiding member. Hence, it is possible to prevent the light emitting section from deteriorating caused by the light emitting section being irradiated with the beams of excitation light so that the beams of excitation light are focused on a single point.

According to the above, it is possible to provide a light emitting device and like device which can achieve a high luminance and a long life.

A light emitting device of the present invention may include: a laser beam source group emitting a plurality of laser beams; a light emitting section emitting light upon irradiation with the laser beams emitted from the laser beam source group; a first optical system (optical system) guiding the laser beams emitted from the laser beam source group to a vicinity of the light emitting section; and a second optical system irradiating a predetermined light irradiation region of the light emitting section with the laser beams guided by the first optical system, the second optical system (optical system) including a concave lens at least having a concave plane on a side facing the light irradiation region.

According to the configuration, the laser beam source group emits a plurality of laser beams. This allows for increasing the luminous flux of the laser beam source group as compared to a case where a single laser beam source is used.

Moreover, the light emitting section emits light upon irradiation with the laser beams emitted from the laser beam source group. Accordingly, the light emitting section at least includes fluorescent material which emits light upon irradiation with the laser beams.

Moreover, the first optical system guides the laser beams emitted from the laser beam source group to the vicinity of the light emitting section.

By thus adjusting a distance in the first optical system from where the laser beams enter to where the laser beams are guided, the laser beam source group is spatially separated apart from the light emitting section with an arbitrary interval provided therebetween. This allows for preventing deterioration of the light emitting section due to the light emitting section being effected by heat generated by the laser beam source group.

Moreover, according to the configuration, the second optical system irradiates a predetermined light irradiation region of the light emitting section with the laser beams guided by the first optical system, in a dispersed manner.

Since the light irradiation region of the light emitting section is irradiated with the laser beams in a dispersed manner, electrons in a low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single laser beam source.

Moreover, according to the configuration, the light emitting section is not irradiated with the laser beams by being focused on one point, but is irradiated with the laser beams in a dispersed manner via the first optical system and the second optical system. Hence, it is possible to prevent the light emitting section from deteriorating caused by the light emitting section being irradiated with the laser beams so that the laser beams are focused on a single point.

According to the above, it is possible to provide a light emitting device and like device which can achieve a high luminance and a long life.

For example, in a case where LD is disposed horizontally (see (b) of FIG. 6 and (a) of FIG. 16) as the laser beam source, the laser beam emitted from the LD usually exhibits a light emitting tendency of an elliptic truncated conic shape which is long in length (vertical direction) and short in width (horizontal direction).

Namely, the laser beam emitted from the LD has an extremely high aspect ratio (e.g., 5 degrees in the horizontal direction and 30 degrees in the vertical direction).

Hence, the laser beams emitted from a part to which the laser beams are guided of the first optical system are usually effected by the feature that the aspect ratio of the laser beams emitted from the LD is high.

Although dependent on the disposition direction of the LD and the shape of the light emitting section, this causes a case where the laser beams emitted from the part to which the laser beams are guided of the first optical system spreads smaller than the size of the light irradiation region of the light emitting section.

Such a case causes a secondary issue that the light emitting section decreases in luminous efficiency, since some parts of the light irradiation region are not irradiated with the laser beams.

In order to solve such a secondary issue, the light emitting device of the present invention may employ a configuration in which the second optical system includes a concave lens having a concave plane at least on a side facing the light irradiation region.

According to the configuration, for example in a case where the concave lens having a concave plane on a side facing the light irradiation region is shaped so that a concave plane shape of the concave section is configured as a curved plane having a predetermined axis, the concave lens functions to expand the spreading of the emitted light in a direction which intersects at right angles with the axis with respect to the light emitting section.

Accordingly, even if the spreading of the emitted light is smaller than the size of the light irradiation region of the light emitting section, as long as the second optical system includes the concave lens, the spreading of the emitted light can be expanded to a size around the size of the light irradiation region of the light emitting section with the concave lens by appropriately setting an axis of the concave plane shape of the concave section.

Moreover, the light emitting device of the present invention may be configured in such a manner that the first optical system includes a light converging member having a surrounded structure in which the light converging member is configured so as to be surrounded by a light reflecting lateral surface, the surrounded structure allowing the laser beams entered via one end of the light converging member to be guided to the other end of the light converging member, and the other end of the light converging member having a cross section smaller than that of the one end of the light converging member.

According to the configuration, the surrounded structure of the light reflecting lateral surface of the light converging member allows for guiding the laser beams entered via one end of the light converging member to the other end of the light converging member having a cross section smaller than that of the one end. Namely, the light converging member allows for converging the laser beams to the other end of the light converging member which has a cross section smaller than that of the one end of the light converging member.

Hence, reduction of both the cross sectional area of the other end of the light converging member and the size of the light emitting section (light irradiation region) allows for reducing the size of the light emitting section which emits light having a high luminance and high luminous flux in accordance with the number of laser beam sources included in the laser beam source group.

Moreover, the light emitting device of the present invention may be configured in such a manner that the first optical system includes: an optical fiber bundle including a plurality of optical fibers; and the light converging member, each of the laser beams emitted from the laser beam source group entering one end of a corresponding one of optical fibers and is guided to the other end of that optical fiber, a part of the optical fiber bundle to which the laser beams are guided is a part in which the other ends of the plurality of optical fibers are arranged, and the laser beams emitted via the part in which the other ends of the plurality of optical fibers are arranged enter one end of the light converging member.

Although the lamps disclosed in Patent Literatures 1 and 2 are considered in view of achieving a high luminance by irradiating fluorescent material with laser beams emitted from the plurality of laser beam sources, since the laser beams are guided by use of condenser lenses that are provided per laser beam source, a secondary problem arises that as the number of the laser beam sources increases, the lamp increases in size.

Moreover, with the lamps, holes are opened to the reflecting mirror for each of the laser beams, and the fluorescent material is irradiated by having each of the laser beams be passed through a respective one of the holes. Hence, this causes another secondary problem that as the number of the laser beam sources increases, the light reflection efficiency of the reflecting mirror decreases.

In order to solve these secondary problems, the light emitting device of the present invention may be configured in such a manner that the first optical system includes an optical fiber bundle at least including a plurality of optical fibers.

According to the configuration, each of the laser beams enter one end of a corresponding one of the plurality of optical fibers and is guided to the part in which the other ends of the plurality of optical fibers are arranged, with a simple configuration in which the first optical system includes the plurality of optical fibers.

Moreover, although dependent on the thickness and number of the optical fibers, even if a plurality of optical fibers are bundled together, a total thickness of the bundle generally would not become so thick.

Accordingly, it is possible to irradiate the light irradiation region of the light emitting section of a small size with laser beams originated from a multiple number of laser beam sources, while maintaining the size of a part in which the other end of the plurality of optical fibers are arranged and the size of the light irradiation region (or light emitting section) small.

Moreover, for example, in a case where the light emitting device of the present invention is used as a headlamp, a hole is opened in a center of the reflecting mirror, and the bundle of the plurality of optical fibers is passed through the hole to irradiate the light emitting section with the laser beam emitted from the part in which the other end of the plurality of optical fibers are arranged. Hence, even if the number of the laser beam sources included in the laser beam source group increases in number, light reflection efficiency of the reflecting mirror will not deteriorate as with the lamps disclosed in Patent Literatures 1 and 2.

Moreover, according to the configuration, the first optical system further includes the light converging member, and the laser beams emitted from the part in which the other ends of the plurality of optical fibers are arranged enter one end of the light converging member.

Hence, even in a case where the number of optical fibers included in the optical fiber bundle increases in number, and the size of the part in which the other ends of the plurality of optical fibers are arranged increases to a size larger than that of the light irradiation region of the light emitting section, the laser beams are guided (converged) to the other end of the light converging member by the surrounded structure of the light converging member. As a result, it is possible to reduce the spreading of the light emitted from the other end of the light converging member as compared to a case where no light converging member is used.

Moreover, the light emitting device of the present invention may be configured in such a manner that the light irradiation region is shaped long in the horizontal direction, and the concave lens has a concave plane whose axis runs in the vertical direction.

Even if the spreading of the laser beams in the horizontal direction is narrower than the width of the light irradiation region in the horizontal direction, it is possible to irradiate the light irradiation region with the laser beams in a dispersed manner in the horizontal direction in accordance with the width of the light irradiation region in the horizontal direction, by configuring the second optical system with the concave lens having a concave plane whose axis runs in the vertical direction.

Hence, it is possible to irradiate the light irradiation region with the laser beams in a dispersed manner, in accordance with the shape of the light irradiation region which is long in the horizontal direction.

Examples of the "concave lens having a concave plane whose axis runs in the vertical direction" include, for example, a biconcave lens, a planoconcave lens, a concave meniscus lens and like lens, each of which has an axis thereof running in the vertical direction.

Moreover, in addition to the configuration, the light emitting device of the present invention may be configured in such a manner that the light irradiation region is shaped long in the horizontal direction and short in the vertical direction, the concave lens has a concave plane whose axis runs in the vertical direction, and the second optical system is a combination of the concave lens and a convex lens having a convex plane whose axis runs in the horizontal direction.

According to the configuration, the shape of the light irradiation region is long in the horizontal direction and short in the vertical direction.

This causes a case where the spreading of the laser beam in the horizontal direction becomes smaller than the width of the light irradiation region in the horizontal direction and the spreading of the laser beam in the vertical direction becomes greater than the width of the light irradiation region in the vertical direction.

Even if the shape of the light irradiation region is long in the horizontal direction and short in the vertical direction, it is possible to irradiate the light irradiation region with the laser beams in a dispersed manner, in accordance with the size of the light irradiation region in the horizontal direction and in the vertical direction, by configuring the second optical system with a combination of the concave lens having a concave plane whose axis runs in the vertical direction and a convex lens having a convex plane whose axis runs in the horizontal direction.

Examples of the "convex lens having a convex plane whose axis runs in the horizontal direction" include, for example, a biconvex lens, a planoconvex lens, a convex meniscus lens and like lens, each of which has an axis thereof run in the horizontal direction.

In a case where the concave lens having a concave plane whose axis runs in the vertical direction and the convex lens having a convex plane whose axis runs in the horizontal direction are separate lenses, the "combination of a concave lens and a convex lens" may be one in which optical axes of these lens coincide each other. Moreover, the concave lens having a concave plane whose axis runs in the vertical direction and the convex lens having a convex plane whose axis runs in the horizontal direction may be integrated as one so that the lenses cannot be separated from each other.

The light emitting device of the present invention may be configured in such a manner that the second optical system has a saddle-shaped concave plane on a side facing the light irradiation region, in which the concave plane of the concave plane and the convex plane of the convex lens are integrated as one, and the saddle-shaped concave plane is a curved plane having a saddle point.

According to the configuration, the light irradiation region side of the saddle point has a focus point of the concave plane, and the one end side of the first optical system of the saddle point has a focus point of the convex plane.

Hence, the spreading of the emitted light from the saddle-shaped concave plane is accelerated at the concave plane, while is held down at the convex plane.

Hence, even with the light irradiation region being shaped long in the horizontal direction and short in the vertical direction, it is possible to irradiate the light irradiation region with the laser beams in a dispersed manner so that the laser beams suits the shape of the light irradiation region and suits the size in the horizontal direction and vertical direction of the light irradiation region, by use of the single lens having the saddle-shaped concave plane.

As a result, even if the shape of the light irradiation region is long in the horizontal direction and short in the vertical direction, it is possible to reduce the number of components in the optical system of the entire light emitting device of the present invention and hold down the size of the entire optical system since the second optical system is configured with a single lens, as compared to a configuration in which the second optical system is made up of a combination of separate lenses, of a concave lens having a concave plane whose axis runs in the vertical direction and a convex lens having a convex plane whose axis runs in the horizontal direction.

The "saddle point" is a point where a minimal point of the concave plane of the concave lens coincides with a maximal point of the convex plane of the convex lens. For example, a "hyperbolic paraboloid" is a typical example of a curved plane having the saddle point.

Moreover, in addition to the configuration, the light emitting device of the present invention may be configured in such a manner that the first optical system and the second optical system are integrated as one to serve as a light guiding member, the laser beams emitted from the laser beam source group and entering one end of the light guiding member on the first optical system side are guided to the other end of the light guiding member on the second optical system side, the other end of the light guiding member on the second optical system side having a light dispersing section configured to irradiate the light irradiation region with the guided laser beams in a dispersed manner.

According to the configuration, the light guiding member is one which the first optical system and the second optical system are integrated as one member. Hence, it is possible to reduce the number of components in the optical system and reduce the size of the entire optical system.

Moreover, the laser beams emitted from the laser beam source group and entering one end of the light guiding member on the first optical system side is guided to the other end of the light guiding member on the second optical system side.

Furthermore, the other end on the second optical system side has the light dispersing section formed, which light dispersing section irradiates the light irradiation region with the guided laser beams in a dispersed manner.

By thus adjusting the size of the light guiding member from one end thereof to the other end thereof, the laser beam source group is spatially separated apart from the light emitting section with an arbitrary interval provided therebetween. This allows for preventing deterioration of the light emitting section due to the light emitting section being effected by heat generated by the laser beam source group.

Moreover, since the light irradiation region of the light emitting section is irradiated with the laser beams from the light dispersing section in a dispersed manner, electrons in a low energy state are efficiently excited to a high energy state throughout the entire fluorescent material included in the light emitting section.

As a result, illumination light is emitted evenly from the light emitting section, thereby allowing for achievement of a high luminance with the light emitting device of the present invention as compared to using a single laser beam source.

Moreover, according to the configuration, the light irradiation region is not irradiated with the laser beams by being focused on one point, but the light irradiation region is irradiated with the laser beams in a dispersed manner via the light guiding member. Hence, it is possible to prevent the light emitting section from deteriorating caused by the light emitting section being irradiated with the laser beams so that the laser beams are focused on a single point.

According to the above, it is possible to provide a light emitting device and like device which can achieve a high luminance and a long life.

Moreover, an illuminating device of the present invention preferably includes any one of the light emitting devices.

This allows for providing an illuminating device having a high-luminance and a long life.

Moreover, a vehicle headlamp of the present invention may include: the light emitting device; and a reflecting mirror reflecting light emitted from the light emitting section and forming a pencil of rays that travels within a predetermined solid angle.

According to the configuration, light emitted from the light emitting section is reflected off the reflecting mirror, thereby forming a pencil of rays that travels within a predetermined solid angle. Hence, it is possible to provide a vehicle headlamp with a high-luminance and a long life.

INDUSTRIAL APPLICABILITY

The present invention is applicable to a light emitting device, an illuminating device, a lamp, and illuminating equipment, each of which has a high luminance and a long life. Particularly, the present invention is applicable to a headlamp for a vehicle and the like.

REFERENCE SIGNS LIST 1 headlamp (light emitting device, illuminating device, vehicle headlamp)
2 laser diode array (excitation light source)
3 laser diode (excitation light source)
3g laser diode group (excitation light source)
4 aspherical lens (optical system)
5 optical fiber (optical system, light guiding member)
5a emitting end
5b entering end
6 ferrule (supporting section)
8 reflecting mirror
13 LED pilot lamp (excitation light source)
20 first light guide section (optical system)
21A truncated pyramid light converging section (optical system, first optical system, light guiding member)
21B truncated pyramid optical member (optical system, first optical system, second optical system, light guiding member)
22 optical fiber bundle (optical system, first optical system, a plurality of optical fibers, light guiding member)
30 saddle-shaped concave lens (optical system, second optical system, concave lens, convex lens)
31 convex cylindrical lens (optical system, second optical system, convex lens)
32 compound cylindrical lens (optical system, second optical system)
33 concave cylindrical lens (optical system, second optical system, concave lens)
40 light emitting body (light emitting section)
40a laser beam irradiation plane (light receiving plane)
50 rod-shaped lens (optical system)
90 reflecting mirror
101 LD chip (excitation light source)
102 light emitting point (excitation light source)
110A,110B headlamp (light emitting device, illuminating device, vehicle headlamp)
120A to 120D headlamp (light emitting device, illuminating device, vehicle headlamp)
130 LED chip (excitation light source)
140A,140B headlamp (illuminating device, vehicle headlamp)
201 light entering part (one end of first optical system)
202 light emitting part (the other end of first optical system)
211A light entering plane (one end of first optical system)
211B light entering plane (one end of first optical system, one end on first optical system side)
212A light emitting plane (the other end of first optical system)
212B light dispersing plane (light dispersed section, the other end on second optical system side)
213A,213B truncated pyramid lateral surface (light reflecting lateral surface, surrounded structure)
221 entering end (one end of first optical system)
222 emitting end (the other end of first optical system, part in which the other end of optical fibers are arranged)
223 optical fiber (optical system, light guiding member)
321 vertical axis cylindrical lens (optical system, convex lens having convex plane whose axis runs in a vertical direction)
322 horizontal axis cylindrical lens (optical system, convex lens having convex plane whose axis runs in a horizontal direction)
400A to 400C laser downlight (light emitting device, illuminating device)
L0 laser beam (excitation light)
L1 emitted light (excitation light)
L2 irradiation light (excitation light)
L3 illumination light (light)
R1 to R5 light irradiation region
H saddle section point
S laser beam source group (excitation light source)

The invention claimed is:

1. A light emitting device comprising:
a single or a plurality of excitation light source(s), configured to emit excitation light;
a single light emitting section configured to emit light upon irradiation with the excitation light; and
an optical system configured to guide to a vicinity of the light emitting section a single beam or a plurality of beams of the excitation light emitted from the single or the plurality of excitation light source(s) and configured to irradiate a predetermined light receiving plane of the light emitting section with the single beam or the plurality of beams of the excitation light, in a dispersed manner,
wherein the optical system comprises a light guiding member that includes a single or a plurality of entering end(s) configured to receive the excitation light emitted from the single or the plurality of excitation light source(s) and includes a plurality of emitting ends configured to emit the excitation light entered via the single or the plurality of entering end(s),
the light receiving plane is irradiated with beams of the excitation light that are emitted from the plurality of emitting ends so that each of a part of the beams of the excitation light having a strongest light intensity in its light intensity distribution is emitted on portions on the light receiving plane different from that of other beams, and
the beams of the excitation light that are emitted from the plurality of emitting ends are directed to the single light emitting section.

2. The light emitting device according to claim 1, further comprising a supporting section configured to support the plurality of emitting ends in a predetermined pattern with respect to the light receiving plane.

3. The light emitting device according to claim 2, wherein the light receiving plane has a long axis, and at least some of the plurality of emitting ends are arranged along the long axis.

4. The light emitting device according to claim 2, wherein the plurality of emitting ends are disposed with respect to the light receiving plane so that the plurality of emitting ends are disposed with an unbalanced density with respect to the light receiving plane.

5. The light emitting device according to claim 1, wherein the light guiding member is flexible.

6. An illuminating device comprising:
a light emitting device as set forth in claim 1; and a reflecting mirror configured to reflect light emitted from the light emitting section, to form a pencil of rays traveling within a predetermined solid angle.

7. A vehicle headlamp comprising:
a light emitting device as set forth in claim 1; and
a reflecting mirror configured to reflect light emitted from the light emitting section, to form a pencil of rays traveling within a predetermined solid angle.

8. A light emitting device comprising:
a single or a plurality of excitation light source(s), configured to emit excitation light;
a single light emitting section configured to emit light upon irradiation with the excitation light; and
an optical system configured to guide to a vicinity of the light emitting section a single beam or a plurality of beams of the excitation light emitted from the single or the plurality of excitation light source(s) and configured to irradiate a predetermined light receiving plane of the light emitting section with the single beam or the plurality of beams of the excitation light, in a dispersed manner,
wherein the optical system includes:
a first optical system configured to guide, to the vicinity of the light emitting section, the single beam or the plurality of beams of the excitation light emitted from the single or plurality of excitation light source(s); and
a second optical system configured to irradiate the light receiving plane of the light emitting section with the single beam or the plurality of beams of the excitation light guided by the first optical system, and
wherein the beams of the excitation light that are emitted from the plurality of emitting ends are directed to the single light emitting section.

9. The light emitting device according to claim 8, wherein the first optical system comprises a light guiding member having a surrounded structure in which the light guiding member is configured so as to be surrounded by a light reflecting lateral surface, the surrounded structure allowing the single beam or plurality of beams of the excitation light entered via one end of the light guiding member to be guided toward the other end of the light guiding member, the other end of light guiding member having a cross section smaller than that of the one end.

10. The light emitting device according to claim 9, wherein:
the first optical system comprises: an optical fiber bundle including a plurality of optical fibers; and the light guiding member,
each of the plurality of beams of the excitation light emitted from the plurality of excitation light sources is entered via one end of a corresponding one of the optical fibers and is guided to the other end of that optical fiber,
each of the plurality of beams of the excitation light is guided to a part of the optical fiber bundle in which the other ends of each of the plurality of optical fibers are arranged, and
each of the plurality of beams of the excitation light emitted via the part in which the other ends of each of the plurality of optical fibers are arranged, enters one end of the light guiding member.

11. The light emitting device according to claim 8, wherein:
the first optical system includes a plurality of optical fibers,
each of the plurality of beams of the excitation light is entered via one end of a corresponding one of the optical fibers and is guided to the other end of that optical fiber, and
each of the plurality of beams of the excitation light is guided to a part of the first optical system in which the other ends of each of the plurality of optical fibers are arranged.

12. The light emitting device according to claim 8, wherein:
the light receiving plane is shaped long in a horizontal direction, and the second optical system comprises a convex lens at least having a convex plane whose axis runs in a vertical direction.

13. The light emitting device according to claim 8, wherein:
the light receiving plane is shaped so that a diameter of the light receiving plane in a vertical direction is linearly changeable with respect to a horizontal direction, and
the second optical system is made up of a combination of (i) a convex lens having a convex plane whose axis runs in the vertical direction and (ii) a convex lens having a convex plane whose axis runs in the horizontal direction.

14. The light emitting device according to claim 8, wherein:
the first optical system and the second optical system are integrated into one to serve as a light guiding member,
the single beam or the plurality of beams of the excitation light emitted from the single or the plurality of excitation light source(s) is entered via one end of the light guiding member on the first optical system side and is guided to the other end of the light guiding member on the second optical system side, and
the light guiding member has a light dispersing section provided on the other end of the light guiding member on the second optical system side, configured to irradiate the light receiving plane with the guided single beam or plurality of beams of the excitation light, in a dispersed manner.

15. The light emitting device according to claim 8, wherein the second optical system comprises a concave lens having a concave plane on at least a side facing the light receiving plane.

16. The light emitting device according to claim 15, wherein the light receiving plane is shaped long in a horizontal direction, and the concave lens has a concave plane whose axis runs in a vertical direction.

17. The light emitting device according to claim 15, wherein:
the light receiving plane is shaped long in a horizontal direction and short in a vertical direction,
the concave lens has a concave plane whose axis runs in the vertical direction, and
the second optical system is made up of a combination of (i) the concave lens and (ii) a convex lens having a convex plane whose axis runs in the horizontal direction.

18. The light emitting device according to claim 17, wherein the second optical system has a saddle-shaped concave plane formed on its side facing the light receiving plane, the saddle-shaped concave plane being a plane in which the concave plane of the concave lens and the convex plane of the convex lens are integrated into one plane and is a curved plane having a saddle point.

* * * * *